(12) United States Patent
Arisawa et al.

(10) Patent No.: US 11,043,331 B2
(45) Date of Patent: Jun. 22, 2021

(54) POWER RECEIVING DEVICE AND POWER FEEDING SYSTEM

(71) Applicant: SONY CORPORATION, Tokyo (JP)

(72) Inventors: Shigeru Arisawa, Tokyo (JP); Yoichi Uramoto, Kanagawa (JP); Tamotsu Kiyakawauchi, Gifu (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 16/555,039

(22) Filed: Aug. 29, 2019

(65) Prior Publication Data

US 2019/0385788 A1    Dec. 19, 2019

Related U.S. Application Data

(63) Continuation of application No. 13/857,353, filed on Apr. 5, 2013, now Pat. No. 10,438,741.

(30) Foreign Application Priority Data

May 17, 2012    (JP) .............................. JP2012-112996

(51) Int. Cl.
*H01F 38/14*    (2006.01)
*H02J 50/10*    (2016.01)
(Continued)

(52) U.S. Cl.
CPC .............. *H01F 38/14* (2013.01); *H02J 7/025* (2013.01); *H02J 50/10* (2016.02); *H02J 50/12* (2016.02);
(Continued)

(58) Field of Classification Search
None
See application file for complete search history.

(56) References Cited

U.S. PATENT DOCUMENTS

2006/0071632 A1    4/2006    Ghabra et al.
2010/0033178 A1    2/2010    Lee et al.
(Continued)

FOREIGN PATENT DOCUMENTS

CN         101873014 A    10/2010
JP      2010-259172 A    11/2010
(Continued)

OTHER PUBLICATIONS

Non-Final Office Action for U.S. Appl. No. 13/857,353, dated Mar. 10, 2016, 09 pages.
(Continued)

*Primary Examiner* — Daniel Kessie
(74) *Attorney, Agent, or Firm* — Chip Law Group

(57) ABSTRACT

A power receiving coil and a measuring coil are in a power receiving device. The measuring coil is inductively coupled to the power receiving coil. Concentric turns of a wire in the measuring coil are around a common axis. Also around the common axis are concentric turns of a wire in the power receiving coil. At least one of the concentric turns of the wire in the measuring coil is closer to the common axis than each of the concentric turns of the wire in the power receiving coil. A power feeding device receives a control signal from the power receiving device. The control signal instructs the power feeding device to adjust a power level of an electromagnetic wave emission.

16 Claims, 35 Drawing Sheets

(51) Int. Cl.
*H02J 50/40* (2016.01)
*H02J 50/80* (2016.01)
*H02J 50/60* (2016.01)
*H02J 50/12* (2016.01)
*H02J 7/02* (2016.01)

(52) U.S. Cl.
CPC .............. *H02J 50/40* (2016.02); *H02J 50/60* (2016.02); *H02J 50/80* (2016.02)

(56) References Cited

U.S. PATENT DOCUMENTS

| | | | |
|---|---|---|---|
| 2011/0102125 A1 | 5/2011 | Tamura et al. | |
| 2012/0091989 A1* | 4/2012 | Uramoto | H02J 7/00309 324/76.11 |
| 2012/0133215 A1 | 5/2012 | Lai et al. | |
| 2012/0206132 A1 | 8/2012 | Lepage | |
| 2013/0063085 A1* | 3/2013 | Takada | H02J 50/80 320/108 |
| 2013/0187474 A1 | 7/2013 | De Boodt | |
| 2014/0225452 A1* | 8/2014 | Kozaki | H02J 50/40 307/104 |

FOREIGN PATENT DOCUMENTS

| | | |
|---|---|---|
| JP | 2012-016125 A | 1/2012 |
| JP | 2013-219945 A | 10/2013 |
| WO | 2013/145835 A1 | 10/2013 |

OTHER PUBLICATIONS

Non-Final Office Action for U.S. Appl. No. 13/857,353, dated May 19, 2017, 10 pages.
Non-Final Office Action for U.S. Appl. No. 13/857,353, dated Aug. 2, 2018, 13 pages.
Final Office Action for U.S. Appl. No. 13/857,353, dated Aug. 5, 2016, 10 pages.
Final Office Action for U.S. Appl. No. 13/857,353, dated Nov. 3, 2017, 10 pages.
Final Office Action for U.S. Appl. No. 13/857,353, dated Jan. 14, 2019, 14 pages.
Advisory Action for U.S. Appl. No. 13/857,353, dated Oct. 20, 2016, 02 pages.
Advisory Action for U.S. Appl. No. 13/857,353, dated Jan. 17, 2018, 02 pages.
Advisory Action for U.S. Appl. No. 13/857,353, dated Mar. 29, 2019, 02 pages.
Notice of Allowance for U.S. Appl. No. 13/857,353, dated Jun. 5, 2019, 07 pages.

* cited by examiner

F I G . 2
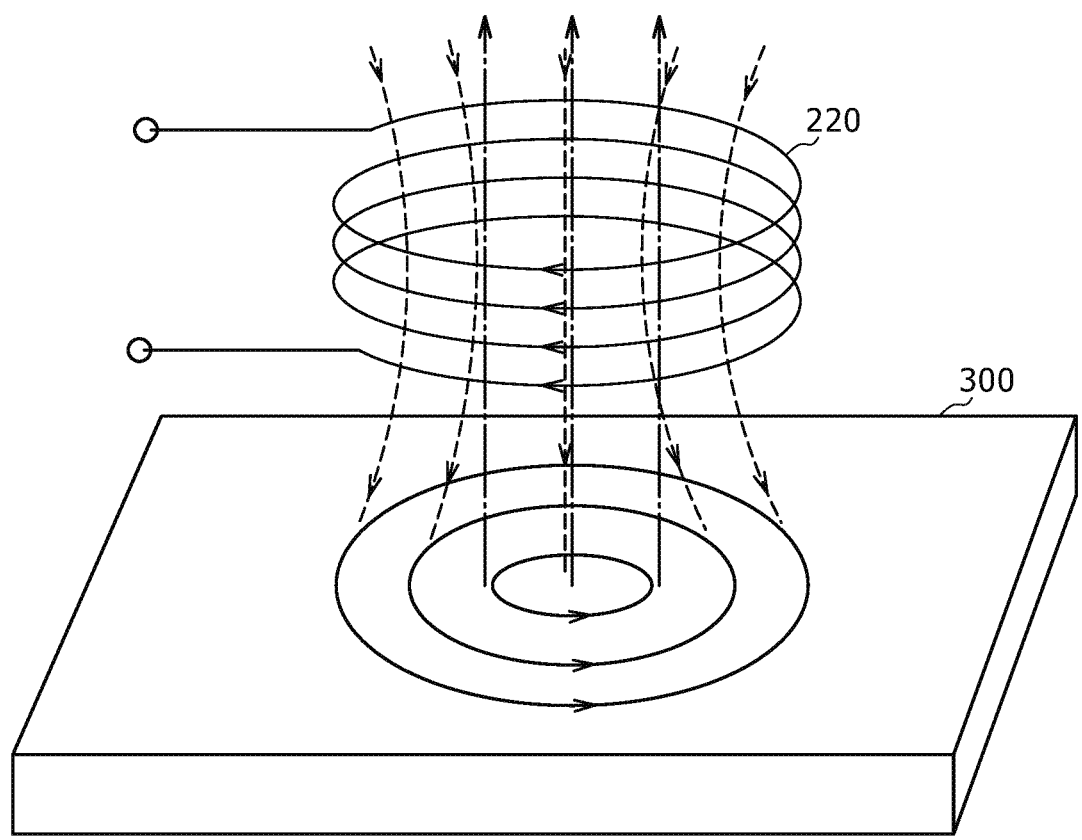

F I G . 5
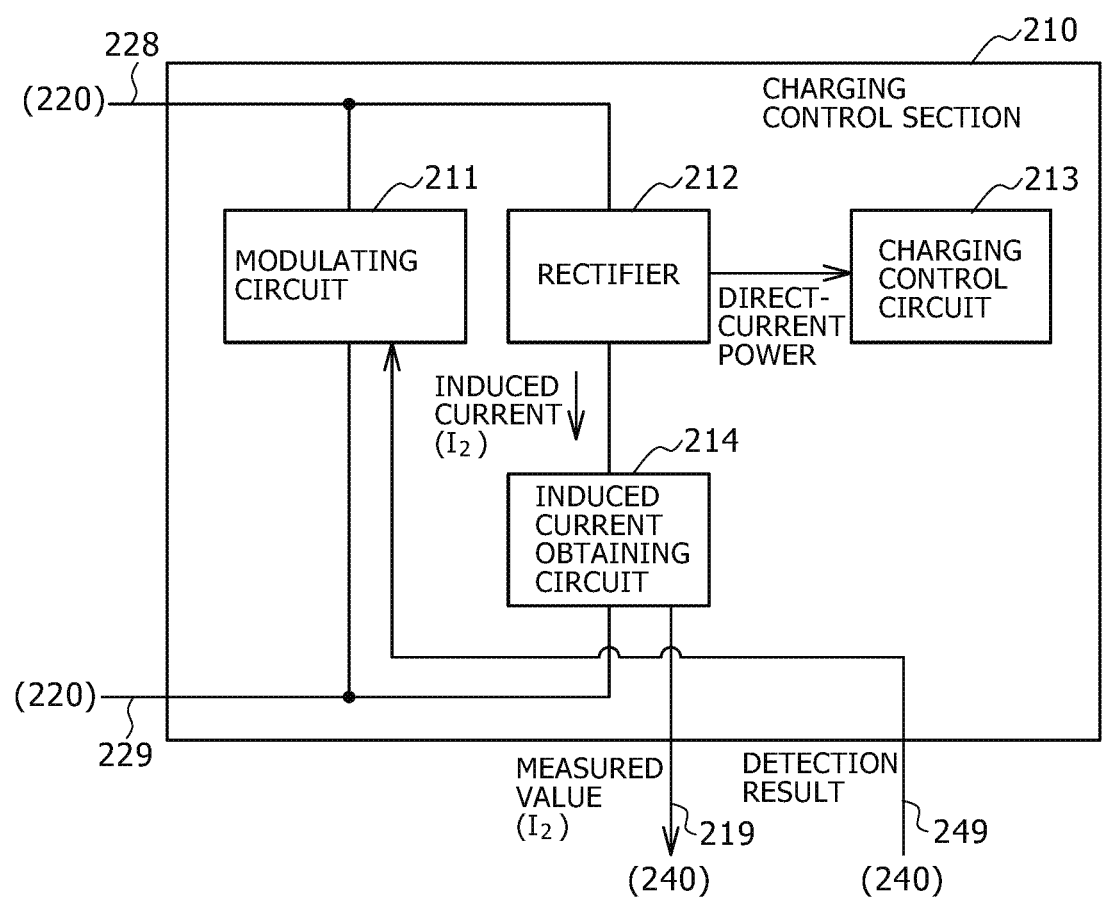

FIG.19

| TIMER VALUE T (0<Ts<Tm<Te) | OPERATION OF POWER FEEDING DEVICE CONTROL PORTION | OPERATION OF ALTERNATING-CURRENT POWER SUPPLY CONTROL PORTION |
|---|---|---|
| 0<T<Ts (WITHIN POWER FEEDING PERIOD) | MAKE POWER FEEDING STARTED WHEN APPLICATION OF ALTERNATING VOLTAGE TO POWER RECEIVING COIL IS STOPPED | — |
| T=Ts (START OF MONITORING PERIOD) | MAKE POWER FEEDING STOPPED | — |
| Ts<T<Tm (WITHIN MONITORING PERIOD) | — | MAKE APPLICATION OF ALTERNATING VOLTAGE TO REFERENCE COIL STARTED WHEN POWER FEEDING IS STOPPED (EN1=1,EN2=0) |
| Tm≦T<Te (WITHIN MONITORING PERIOD) | — | MAKE APPLICATION OF ALTERNATING VOLTAGE TO REFERENCE COIL STOPPED AND MAKE APPLICATION OF ALTERNATING VOLTAGE TO POWER RECEIVING COIL STARTED (EN1=0,EN2=1) |
| T=Te (END OF MONITORING PERIOD) | — | MAKE APPLICATION OF ALTERNATING VOLTAGE TO POWER RECEIVING COIL STOPPED |

POWER RECEIVING DEVICE AND POWER FEEDING SYSTEM

CROSS-REFERENCE TO RELATED APPLICATIONS

The present application is a continuation application of U.S. patent application Ser. No. 13/857,353, filed Apr. 5, 2013, which claims the benefit of priority from Japanese Priority Patent Application JP 2012-112996 filed in the Japan Patent Office on May 17, 2012, the entire contents of which are hereby incorporated by reference.

BACKGROUND

The present technology relates to a power receiving device and a power feeding system, and particularly to a power receiving device in a noncontact power feeding system for feeding power in an electrically noncontact manner, and the power feeding system.

In related art, a noncontact power feeding system for feeding power in an electrically noncontact manner may include a circuit for detecting, as foreign matter, an object got into a magnetic field between a power feeding device and a power receiving device. This is because when foreign matter as a conductor is present in the magnetic field, an eddy current occurs within the foreign matter, and the foreign matter may generate heat due to an effect of a Joule heat caused by the eddy current. A large amount of heat generated by the foreign matter may cause damage to a device or a casing in the noncontact power feeding system. In quick charging, in particular, the intensity of a magnetic field output by the power feeding device is increased, so that the amount of heat generated by the foreign matter is also increased. Thus, the presence of the foreign matter often becomes a problem.

A circuit that determines whether foreign matter is present or not on the basis of whether the amplitude of a voltage induced on a power receiving side is less than a reference value, for example, has been proposed as a circuit for detecting foreign matter (see Japanese Patent Laid-Open No. 2012-16125, for example). When foreign matter is present, the eddy current of the foreign matter causes a power loss, and decreases power transmission efficiency. It is thus determined that foreign matter is present when the amplitude of the voltage on the power receiving side is decreased to less than the reference value.

SUMMARY

However, the above-described related art may not be able to correctly detect the presence of foreign matter. Specifically, the above-described power receiving device may erroneously detect foreign matter when the amplitude of the voltage of a power receiving coil is decreased by a cause other than the presence of foreign matter. A decrease in the amplitude of the voltage is caused not only by the presence of foreign matter but also by a decrease in fed power or power feeding efficiency due to a failure, a secular degradation, or the like of the power feeding device, for example. However, the above-described power receiving device does not obtain an amount of fed power or power transmission efficiency. In addition, the above-described power receiving device does not assume a case in which a power feeding coil and the power receiving coil are displaced from each other. Thus, when the amplitude of the voltage is decreased, whether the decrease is caused by the presence of foreign matter or caused by a decrease in fed power or power transmission efficiency may not be determined. In addition, when the amplitude of the voltage is decreased, whether the decrease is caused by the positional displacement of the power feeding coil and the power receiving coil with respect to each other or caused by the presence of foreign matter may not be determined. As a result, erroneous foreign matter detection may occur when the amplitude of the voltage is decreased by a factor other than the presence of foreign matter.

The present technology has been created in view of such a situation, and it is desirable to provide a power receiving device that can correctly detect foreign matter.

A power receiving coil and a measuring coil are in a power receiving device. The measuring coil is inductively coupled to the power receiving coil. Concentric turns of a wire in the measuring coil are around a common axis. Also around the common axis are concentric turns of a wire in the power receiving coil. At least one of the concentric turns of the wire in the measuring coil is closer to the common axis than each of the concentric turns of the wire in the power receiving coil. A power feeding device receives a control signal from the power receiving device. The control signal instructs the power feeding device to adjust a power level of an electromagnetic wave emission.

A first embodiment of the present technology is a power receiving device including: a power receiving coil configured to receive power fed from a power feeding device via a magnetic field; a measuring coil having a center substantially coinciding with a center of the power receiving coil, and having a part wound on an inside of an outermost circumference of the power receiving coil, a number of turns of the part wound on the inside of the outermost circumference of the power receiving coil being at least one; and a foreign matter detecting section configured to determine whether or not foreign matter is present in the magnetic field on a basis of measured values of the measuring coil and the power receiving coil. This produces an effect of whether or not the foreign matter is present in the magnetic field being determined on the basis of the measured values of the measuring coil and the power receiving coil.

In addition, in the first embodiment, the measuring coil may be a coil through which substantially no current flows. This produces an effect of substantially no current flowing through the measuring coil.

In addition, in the first embodiment, a number of turns of the measuring coil may be different from a number of turns of the power receiving coil. This produces an effect of the number of turns of the measuring coil being different from the number of turns of the power receiving coil.

In addition, in the first embodiment, the power receiving device may further include: a voltage obtaining circuit configured to obtain an induced voltage of the measuring coil, the induced voltage of the measuring coil being generated by the magnetic field, as the measured value of the measuring coil; and a current obtaining circuit configured to obtain an induced current of the power receiving coil, the induced current of the power receiving coil being generated by the magnetic field, as the measured value of the power receiving coil. The foreign matter detecting section may obtain impedance of the power receiving coil from the induced voltage and the induced current, and determine whether or not the foreign matter is present on a basis of a change in the impedance. This produces an effect of whether or not the foreign matter is present being determined on the basis of a change in the impedance of the power receiving coil.

In addition, in the first embodiment, the foreign matter detecting section may determine that the foreign matter is present when an amount of change in the impedance is larger than a predetermined threshold value. This produces an effect of being determined that the foreign matter is present when the amount of change in the impedance is larger than the predetermined threshold value.

In addition, in the first embodiment, the impedance of the power receiving coil may include at least one of resistance and inductance of the power receiving coil. This produces an effect of the impedance including at least one of resistance and reactance.

In addition, in the first embodiment, the power receiving device may further include: a load resistance obtaining circuit configured to obtain resistance of a load connected to the power receiving coil as load resistance; and a storing section configured to store at least two sets each of which includes the induced voltage of the measuring coil, the induced voltage of the measuring coil being generated by the magnetic field, the induced current of the power receiving coil, the induced current of the power receiving coil being generated by the magnetic field, and the load resistance. The foreign matter detecting section may obtain the impedance from the induced voltage, the induced current, and the resistance. This produces an effect of the impedance being obtained from the induced voltage, the induced current, and the load resistance.

In addition, in the first embodiment, the power receiving device may further include a power supply control section configured to control the power feeding device on a basis of a result of detection of the foreign matter. This produces an effect of the power feeding device being controlled on the basis of the result of detection of the foreign matter.

In addition, in the first embodiment, the power receiving device may further include a control amount determining section configured to determine an amount of control for the power on a basis of an amount of increase in the impedance of the power receiving coil when it is determined in detection of the foreign matter that the foreign matter is present. The power supply control section may control the power feeding device according to the amount of control. This produces an effect of the power feeding device being controlled according to the amount of control.

In addition, a second embodiment of the present technology is a power feeding system including: a power feeding device configured to supply power via a magnetic field; a power receiving coil configured to receive the power fed from the power feeding device via the magnetic field; a measuring coil having a center substantially coinciding with a center of the power receiving coil, and having a part wound on an inside of an outermost circumference of the power receiving coil, a number of turns of the part wound on the inside of the outermost circumference of the power receiving coil being at least one; and a foreign matter detecting section configured to determine whether or not foreign matter is present in the magnetic field on a basis of measured values of the measuring coil and the power receiving coil. This produces an effect of whether or not the foreign matter is present in the magnetic field being determined on the basis of the measured values of the measuring coil and the power receiving coil.

In addition, in the first embodiment, the power receiving device may further include a charging control circuit configured to control a charging current according to a result of detection of the foreign matter. This produces an effect of the charging current being controlled according to the result of detection of the foreign matter.

In addition, in the first embodiment, the measuring coil may have a part wound on the outermost circumference of the power receiving coil, a number of turns of the part wound on the outermost circumference of the power receiving coil being at least one. Also, the measuring coil may have a part wound on an outside of the outermost circumference of the power receiving coil, a number of turns of the part wound on the outside of the outermost circumference of the power receiving coil being at least one. This produces an effect of the number of turns of the part wound on the outermost circumference of the power receiving coil or on the outside of the outermost circumference of the power receiving coil being at least one.

In addition, in the first embodiment, the measuring coil may have a part wound on an innermost circumference of the power receiving coil, a number of turns of the part wound on the innermost circumference of the power receiving coil being at least one. Also, the measuring coil may have a part wound on an inside of the innermost circumference of the power receiving coil, a number of turns of the part wound on the inside of the innermost circumference of the power receiving coil being at least one. This produces an effect of the number of turns of the part wound on the innermost circumference of the power receiving coil or on the inside of the innermost circumference of the power receiving coil being at least one.

In addition, in the first embodiment, the measured values may be impedances of the measuring coil and the power receiving coil, and the foreign matter detecting section may determine whether or not the foreign matter is present in the magnetic field on a basis of a ratio of the impedance of the power receiving coil to the impedance of the measuring coil. This produces an effect of whether or not the foreign matter is present in the magnetic field being determined on the basis of the ratio of the impedance of the power receiving coil to the impedance of the measuring coil.

In addition, in the first embodiment, the power receiving device may further include a first alternating voltage applying section configured to apply a first alternating voltage to the measuring coil. The foreign matter detecting section may obtain the impedance of the measuring coil from a current produced in the measuring coil to which the first alternating voltage is applied and the first alternating voltage. This produces an effect of the impedance of the measuring coil being obtained from the current produced in the measuring coil to which the first alternating voltage is applied and the first alternating voltage.

In addition, in the first embodiment, the power receiving device may further include a second alternating voltage applying section configured to apply a second alternating voltage to the power receiving coil, wherein the foreign matter detecting section may obtain the impedance of the power receiving coil from a current produced in the power receiving coil to which the second alternating voltage is applied and the second alternating voltage. This produces an effect of the impedance of the power receiving coil being obtained from the current produced in the power receiving coil to which the second alternating voltage is applied and the second alternating voltage.

In addition, in the first embodiment, the foreign matter detecting section may determine that the foreign matter is present when the ratio is larger than a predetermined threshold value. This produces an effect of being determined that the foreign matter is present when the ratio is larger than the threshold value.

According to the present technology, an excellent effect of being able to detect foreign matter correctly can be produced.

BRIEF DESCRIPTION OF THE DRAWINGS

FIG. 2 is a diagram of assistance in explaining a cause of a change in parameter in a power receiving coil in the first embodiment;

FIG. 5 is a block diagram showing an example of configuration of a charging control section in the first embodiment;

FIG. 19 is a diagram showing an example of the operation of the power control block in the second embodiment;

DETAILED DESCRIPTION OF THE PREFERRED EMBODIMENTS

A mode for carrying out the present technology (which mode will hereinafter be referred to as embodiments) will hereinafter be described. Description will be made in the following order.

1. First Embodiment (Example of Detecting Foreign Matter on Basis of Amount of Change in Resistance and Inductance of Power Receiving Coil)
2. Second Embodiment (Example of Detecting Foreign Matter on Basis of Ratio of Resistance of Measuring Coil to Resistance of Power Receiving Coil)
3. Third Embodiment (Example of Detecting Foreign Matter on Basis of Amount of Change in Resistance of Power Receiving Coil)
4. Fourth Embodiment (Example of Detecting Foreign Matter and Calculating Control Quantity on Basis of Amount of Change in Resistance of Power Receiving Coil)
5. Fifth Embodiment (Example of Obtaining Electromotive Force Ratio)
6. Sixth Embodiment (Example of Changing Load Resistance and Detecting Foreign Matter)

1. First Embodiment

[Example of Configuration of Noncontact Power Feeding System]

Figure 1:
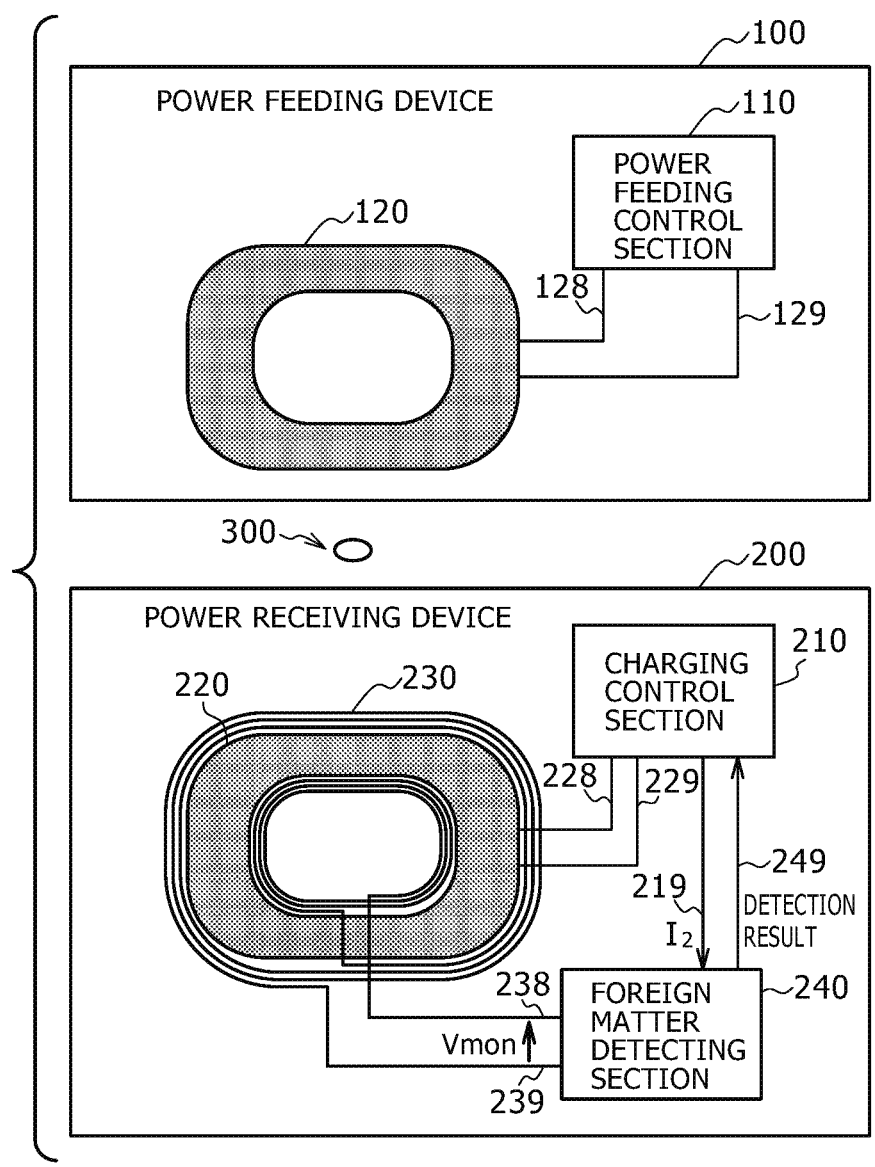
FIG. 1 is a general view of an example of configuration of a noncontact power feeding system in a first embodiment.

FIG. 1 is a general view of an example of configuration of a noncontact power feeding system in an embodiment. This noncontact power feeding system is a system for supplying power to a device in an electrically noncontact state. The noncontact power feeding system includes a power feeding device 100 and a power receiving device 200.

The power feeding device 100 supplies alternating-current power to the power receiving device 200 by electromagnetic wave. This power feeding device 100 includes a power feeding control section 110 and a power feeding coil 120.

The power feeding control section 110 controls an amount of power supplied to the power receiving device 200. The power feeding control section 110 supplies alternating-current power to the power feeding coil 120 via signal lines 128 and 129, and controls the amount of the power. In addition, the power feeding control section 110 receives a control signal for controlling the amount of fed power from the power receiving device 200. When receiving the control signal, the power feeding control section 110 controls the amount of fed power according to the control signal. This control signal includes for example a stop control signal requesting the stopping of power feeding.

When the power feeding coil 120 is supplied with power by the power feeding control section 110, the power feeding coil 120 generates an electromagnetic wave according to Ampere's law. The power receiving device 200 is supplied with power via this electromagnetic wave.

The power receiving device 200 receives the power supplied by the electromagnetic wave. The power receiving device 200 includes a charging control section 210, a power receiving coil 220, a measuring coil 230, and a foreign matter detecting section 240.

The charging control section 210 charges a secondary battery or the like with the power received from the power receiving coil 220 via wiring 228 and 229, and controls a current and a voltage in the charging. Specifically, the charging control section 210 converts the received alternating-current power into a direct current. Then, the charging control section 210 controls the voltage and the current on the basis of the characteristics of the secondary battery, a charging time, and the like.

In addition, the charging control section 210 measures an induced current $I_2$ in the power receiving coil 220, and supplies the measured value to the foreign matter detecting section 240 via a signal line 219. An ampere (A), for example, is used as the unit of the induced current $I_2$. Further, the charging control section 210 receives a detection result in foreign matter detection from the foreign matter detecting section 240 via a signal line 249. Then, the charging control section 210 transmits a control signal based on the detection result to the power feeding device 100. For example, when foreign matter is detected, the charging control section 210 transmits a control signal requesting the stopping of power feeding. Incidentally, the charging control section 210 can also transmit a control signal requesting that the amount of power be decreased by a certain amount when foreign matter is detected. The power feeding is thereby continued even when foreign matter is detected.

The power receiving coil 220 receives the power from the power feeding coil 120 via the electromagnetic wave. The power receiving coil 220 is for example a coil formed by winding a wire a plurality of times into a form of concentric circles in a same plane. The coil formed by thus winding a wire in a spiral form is referred to also as a spiral coil. Incidentally, the wire may be wound a plurality of times into a form of concentric rectangles or the like rather than concentric circles.

The measuring coil 230 is a coil having a center substantially coinciding with the center of the power receiving coil 220. A part of the measuring coil 230 is wound on the inside of an outermost circumference of the power receiving coil 220. The number of turns of the part of the measuring coil 230 that is wound on the inside of the outermost circumference of the power receiving coil 220 is at least one. The magnetic flux of the measuring coil 230 thereby substantially passes through the power receiving coil 220. In the case where the power receiving coil 220 is formed by winding a wire a plurality of times into a form of concentric circles as described above, the larger the number of turns of the power receiving coil 220, and the larger the diameter of the wire of the power receiving coil 220, the larger a difference in area between the annular ring of an outermost circumference of the power receiving coil 220 and the annular ring of an innermost circumference in the power receiving coil 220. The distribution of the magnetic flux passing through the power receiving coil 220 therefore becomes nonuniform. The magnetic flux of a coil is proportional to the area of the coil. Thus, when magnetic flux density is uniform, the closer to the outside of the power receiving coil 220, the larger the magnetic flux per turn, and the closer to the inside of the power receiving coil 220, the smaller the magnetic flux per turn. An average of these magnetic fluxes per turn will hereinafter be used as a magnetic flux passing through the coil. If all the wire of the measuring coil 230 is wound on the outside of the power receiving coil 220, and there is a large difference in area between the annular ring of an outermost circumference and the annular ring of an innermost circumference, there occurs a large difference between the magnetic fluxes passing through the power receiving coil 220 and the measuring coil 230, respectively. However, when the measuring coil 230 is wound once or more on the inside of the power receiving coil 220, the magnetic fluxes (that is, the averages of the magnetic fluxes per turn) passing through the power receiving coil 220 and the measuring coil 230, respectively, become close to the same. Incidentally, the wire of the measuring coil 230 is desirably wound at least once or more on each of the outside of the outermost circumference of the power receiving coil 220 and the inside of the innermost circumference of the power receiving coil 220. This makes the magnetic flux passing through the measuring coil 230 closer to the magnetic flux passing through the power receiving coil 220. In addition, when the passing magnetic fluxes substantially coincide with each other, the measuring coil 230 does not need to be disposed on the same plane as the power receiving coil 220, and the coil surface of the power receiving coil 220 and the coil surface of the measuring coil 230 may be somewhat separated from each other.

In addition, substantially no current flows through the measuring coil 230. "Substantially no current flows" in this case means that the terminals of the measuring coil 230 are opened and that no current flows through the measuring coil 230. Alternatively, "substantially no current flows" in this case means that even if the terminals of the measuring coil 230 are not opened, a high resistance is placed, so that only a very small amount of current flows even when a voltage occurs. However, the opened terminals are connected with the foreign matter detecting section 240 to be described later via signal lines 238 and 239. When the terminals of the measuring coil 230 are opened, a magnetic field from the measuring coil 230 hardly acts on the power receiving coil 220. The power receiving device 200 can thereby detect foreign matter without the charging control section 210 being affected. Incidentally, instead of the terminals of the measuring coil 230 being opened, a resistance of high impedance may be disposed between the terminals.

From the following Equation 1 based on Faraday's law of electromagnetic induction, an induced voltage V generated in a coil is proportional to a change in magnetic flux φ. The unit of the magnetic flux is for example a weber (wb), and the unit of the induced voltage V is for example a volt (V). In Equation 1, N is the number of turns. t is time. The unit of t is for example a second (s).

$$V = -N\frac{d\phi}{dt}$$ [Equation 1]

When the magnetic flux passing through the measuring coil 230 and the magnetic flux passing through the power receiving coil 220 substantially coincide with each other, from Equation 1, a ratio between the induced voltage $V_{31}$ of the measuring coil 230 and the induced voltage $V_{21}$ of the power receiving coil 220 which induced voltages result from a magnetic field from the power feeding coil 120 substantially coincides with a turns ratio between these coils. Hence, when the turns ratio is known, the induced voltage $V_{21}$ of the power receiving coil 220 can be obtained accurately from the induced voltage $V_{31}$ of the measuring coil 230. However, the induced voltage Vmon of the measuring coil 230 includes not only the induced voltage $V_{31}$ resulting from the magnetic field from the power feeding coil 120 but also an induced voltage $V_{32}$ resulting from a magnetic field from the power receiving coil 220. Thus, in order to obtain the induced voltage $V_{31}$, the calculation of the induced voltage $V_{32}$ is necessary in addition to the measurement of the induced voltage Vmon. Details of a method for calculating the induced voltage $V_{21}$ from the induced voltage $V_{32}$ and the induced voltage Vmon will be described later.

Incidentally, it is difficult to directly measure the induced voltage $V_{21}$. This is because a load such as the charging control section 210 or the like is connected to the power receiving coil 220, and the terminal voltage of the power receiving coil 220 is not the induced voltage $V_{21}$ due to the effect of the load. Of course, only a value close to the induced voltage $V_{21}$ can be measured when the load is disconnected and the terminals of the power receiving coil 220 are set in an opened state. However, unless relation to the induced current $I_2$ is known, the impedance of the power receiving coil 220 may not be calculated. When the measuring coil 230 is provided, an accurate induced voltage $V_{21}$ can be obtained from the induced voltage Vmon of the measuring coil 230 during charging.

The foreign matter detecting section 240 determines whether foreign matter is present or not on the basis of a change in impedance of the power receiving coil 220 which impedance is obtained from the parameter of the measuring coil 230. Specifically, the foreign matter detecting section 240 detects the presence or absence of foreign matter obstructing the reception of the electromagnetic wave by estimating the impedance varying in the power receiving coil 220 from the induced voltage Vmon as the parameter of the measuring coil 230 and the induced current $I_2$ of the power receiving coil 220. The impedance varying in the power receiving coil 220 due to foreign matter includes a resistance component and a reactance component or the like. The foreign matter detecting section 240 outputs a detection result obtained by detecting the presence or absence of foreign matter to the charging control section 210 via the signal line 249.

FIG. 2 is a diagram of assistance in explaining a cause of a change in impedance in the power receiving coil 220 in the first embodiment. Suppose that there is conductive foreign matter 300 such as a metal or the like in the electromagnetic field generated by the power receiving coil 220. When the electromagnetic field changes, an eddy current occurs in the foreign matter 300 due to an effect of electromagnetic induction. The foreign matter generates heat due to a Joule heat caused by the eddy current. In addition, a magnetic field generated by the eddy current acts on the power receiving coil 220, changing at least one of a resistance and a reactance in an equivalent circuit of the power receiving coil 220. The power receiving device 200 can therefore determine whether foreign matter is present or not from an amount of change in at least one of the resistance and the reactance in the power receiving coil 220. In FIG. 2, dotted line arrows represent the magnetic field generated by the power receiving coil 220. Solid line arrows represent the eddy current. Arrows of alternate long and short dashed lines represent the magnetic field generated by the eddy current.

Figure 3:
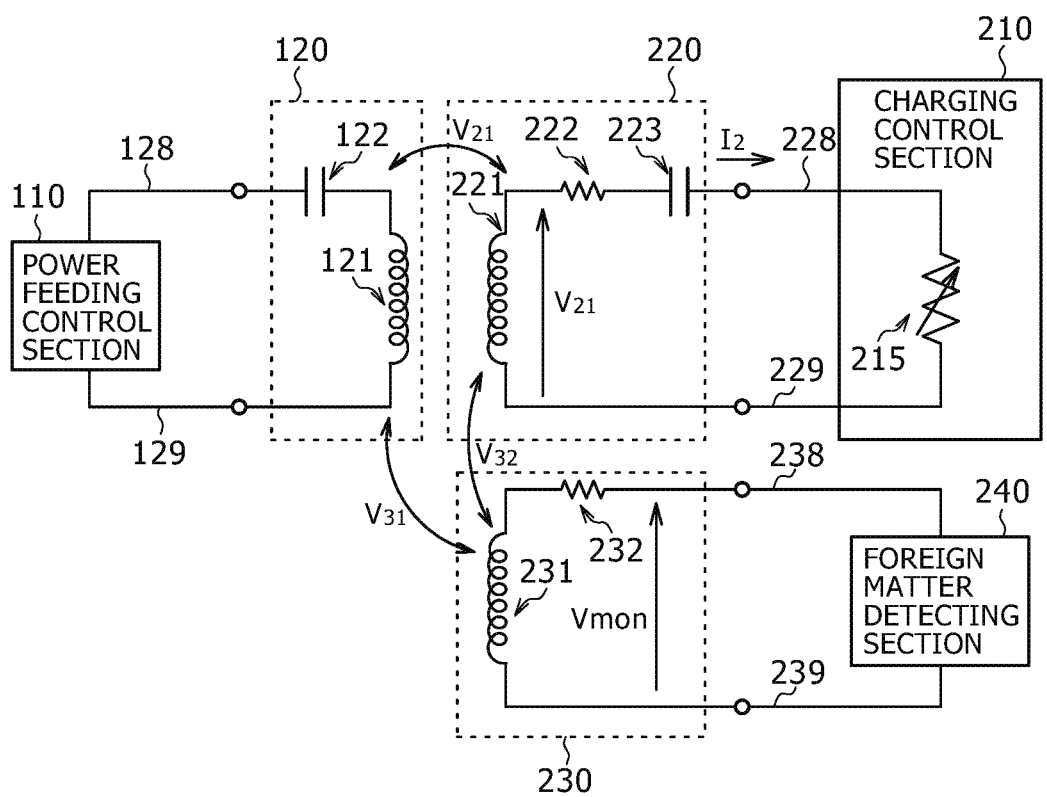
FIG. 3 is a circuit diagram showing an example of an equivalent circuit of the noncontact power feeding system in the first embodiment.

FIG. 3 is a circuit diagram showing an example of an equivalent circuit of the noncontact power feeding system in the first embodiment. The power feeding coil 120 can be replaced by an equivalent circuit including a primary inductance ($L_1$) 121 and a primary capacitance ($C_1$) 122. The power receiving coil 220 is replaced by an equivalent circuit including a secondary inductance ($L_2$) 221, a secondary resistance ($r_2$) 222, and a secondary capacitance ($C_2$) 223. The charging control section 210 is replaced by an equivalent circuit including a load resistance ($R_2$) 215. A rectifier is omitted in the charging control section 210. The measuring coil 230 is replaced by an equivalent circuit including an inductance ($L_3$) 231 and a resistance ($r_3$) 232. As described above, when foreign matter is present, at least one of the secondary resistance $r_2$ and the secondary inductance $L_2$ changes in the equivalent circuit of the power receiving coil 220. Thus, the foreign matter is detected from an amount of change in the secondary resistance $r_2$ and the secondary inductance $L_2$. Incidentally, the resistance of the power feeding coil 120 is omitted in the equivalent circuit.

Suppose that in the equivalent circuit, an induced voltage generated in the secondary inductance 221 of the power receiving coil 220 due to a magnetic field generated by the power feeding coil 120 is $V_{21}$. Also suppose that an induced voltage generated in the measuring coil 230 due to the magnetic field generated by the power feeding coil 120 is $V_{31}$. Suppose that an induced voltage generated in the measuring coil 230 due to a magnetic field generated by the power receiving coil 220 is $V_{32}$. An induced voltage in the measuring coil 230 is thus a voltage obtained by combining these induced voltages $V_{31}$ and $V_{32}$ with each other. The foreign matter detecting section 240 obtains the induced voltage of the measuring coil 230 as monitoring induced voltage Vmon. In addition, the charging control section 210 obtains the induced current $I_2$ flowing through the power receiving coil 220.

[Example of Configuration of Power Feeding Control Section]

Figure 4:
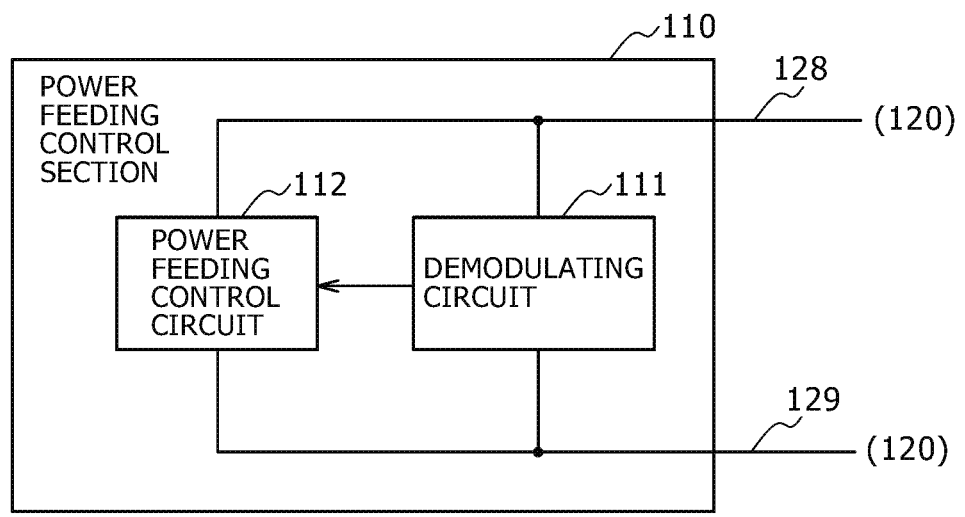
FIG. 4 is a block diagram showing an example of configuration of a power feeding control section in the first embodiment.

FIG. 4 is a block diagram showing an example of configuration of the power feeding control section 110 in the first embodiment. The power feeding control section 110 includes a demodulating circuit 111 and a power feeding control circuit 112.

The demodulating circuit 111 demodulates an alternating-current signal from the power receiving device 200, and extracts a control signal superimposed on the alternating-current signal. The demodulating circuit 111 outputs the control signal to the power feeding control circuit 112. The power feeding control circuit 112 controls the amount of power supplied to the power receiving device 200 according to the control signal.

[Example of Configuration of Charging Control Section]

FIG. 5 is a block diagram showing an example of configuration of the charging control section 210 in the first embodiment. The charging control section 210 includes a modulating circuit 211, a rectifier 212, a charging control circuit 213, and an induced current obtaining circuit 214.

The modulating circuit 211 superimposes the control signal by modulating the amplitude or the like of the alternating-current signal for the power feeding device 100. When receiving a detection result notifying that foreign matter is detected from the foreign matter detecting section 240, the modulating circuit 211 superimposes the control signal requesting the stopping of power feeding, for example, on the alternating-current signal, and transmits the alternating-current signal on which the control signal is superimposed to the power feeding device 100.

The rectifier 212 converts alternating-current power into a direct current, and supplies the direct current to the charging control circuit 213. The charging control circuit 213 controls the voltage and current of the converted direct-current power to charge the secondary battery or the like.

The induced current obtaining circuit 214 obtains the induced current $I_2$ flowing through the power receiving coil 220. The induced current obtaining circuit 214 measures the induced current $I_2$, subjects the measured value to A/D (Analog to Digital) conversion as required, and supplies the measured value to the foreign matter detecting section 240. Incidentally, the induced current obtaining circuit 214 is an example of a current obtaining circuit described in claims. In addition, while the induced current obtaining circuit 214 obtains the alternating induced current, the induced current obtaining circuit 214 may obtain the direct induced current after the conversion by the rectifier 212 in place of the alternating induced current.

[Example of Configuration of Foreign Matter Detecting Section]

Figure 6:
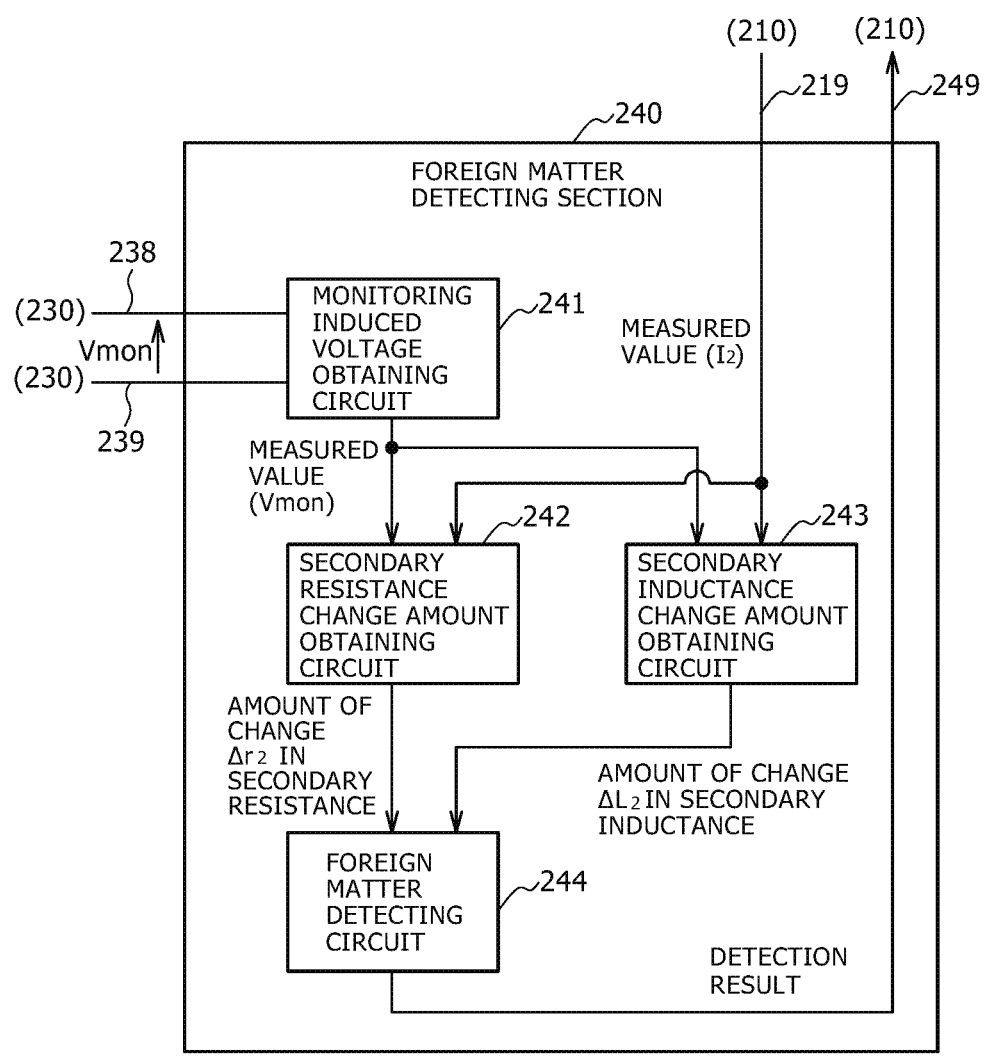
FIG. 6 is a block diagram showing an example of configuration of a foreign matter detecting section in the first embodiment.

FIG. 6 is a block diagram showing an example of configuration of the foreign matter detecting section 240 in the first embodiment. The foreign matter detecting section 240 includes a monitoring induced voltage obtaining circuit 241, a secondary resistance change amount obtaining circuit 242, a secondary inductance change amount obtaining circuit 243, and a foreign matter detecting circuit 244.

The monitoring induced voltage obtaining circuit 241 obtains the monitoring induced voltage Vmon in the measuring coil 230. For example, the monitoring induced voltage obtaining circuit 241 measures the monitoring induced voltage Vmon by an alternating-current voltmeter connected to the terminals of the measuring coil 230. The monitoring induced voltage obtaining circuit 241 subjects the measured value of the monitoring induced voltage Vmon to A/D conversion as required, and supplies the measured value to the secondary resistance change amount obtaining circuit 242 and the secondary inductance change amount obtaining circuit 243. Incidentally, the monitoring induced voltage obtaining circuit 241 is an example of a voltage obtaining circuit described in claims.

The secondary resistance change amount obtaining circuit 242 obtains an amount of change in the resistance in the power receiving coil 220 as an amount of change $\Delta r_2$ in the secondary resistance from the measured values of the monitoring induced voltage Vmon and the induced current $I_2$. The secondary resistance change amount obtaining circuit 242 calculates the secondary resistance $r_2$ using the following Equation 2, for example.

$$r_2 = \text{Re}(\dot{V}_{21}/\dot{I}_2) - R_2 \qquad \text{[Equation 2]}$$
$$= \text{Re}\{(N_2/N_3) \times (\dot{V}_{mon}/\dot{I}_2)\} - R_2$$

In Equation 2, "Re( )" is a function that returns the real part of a complex number in ( ). $V_{21}$ is the alternating induced voltage generated in the power receiving coil 220 due to a change in the magnetic field generated by the power feeding coil 120. A voltage V or a current I having a dot attached to an upper part thereof denotes an alternating voltage or an alternating current represented by a complex number. $R_2$ is the load resistance of a load in the charging control section 210. The unit of $R_2$ is for example an ohm ($\Omega$). $N_2$ is the number of turns of the power receiving coil 220. $N_3$ is the number of turns of the measuring coil 230. A method for deriving Equation 2 will be described later.

The secondary resistance change amount obtaining circuit 242 calculates the amount of change $\Delta r_2$ in the secondary resistance from the calculated secondary resistance $r_2$ using the following Equation 3. The secondary resistance change amount obtaining circuit 242 outputs the calculated amount of change $\Delta r_2$ to the foreign matter detecting circuit 244.

$$\Delta r_2 = r_2 - r_0 \qquad \text{[Equation 3]}$$

In Equation 3, $r_0$ is an original secondary resistance of the power receiving coil 220 measured when there is no foreign matter.

The secondary inductance change amount obtaining circuit 243 obtains an amount of change in the inductance in the equivalent circuit of the power receiving coil 220 as an amount of change $\Delta L_2$ in the secondary inductance from the measured values of the monitoring induced voltage Vmon and the induced current $I_2$. The secondary inductance change amount obtaining circuit 243 calculates the secondary inductance $L_2$ using the following Equation 4, for example.

$$L_2 = 1/\omega\{\text{Im}(\dot{V}_{21}/\dot{I}_2) + 1/(\omega C_2)\} \qquad \text{[Equation 4]}$$
$$= (1/\omega)[(N_2/N_3)\{\text{Im}(\dot{V}_{mon}/\dot{I}_2) + \omega M_{32}\} + 1/(\omega C_2)]$$

In Equation 4, "Im( )" is a function that returns the imaginary part of a complex number in ( ). $\omega$ is an angular frequency, and the unit of $\omega$ is a radian/second (rad/s). $M_{32}$ is a coupling coefficient between the power receiving coil 220 and the measuring coil 230. $C_2$ is the capacitance in the equivalent circuit of the power receiving coil 220. The unit of $C_2$ is a farad (F), for example. A method for deriving Equation 4 will be described later.

The secondary inductance change amount obtaining circuit 243 calculates the amount of change $\Delta L_2$ in the secondary inductance from the calculated secondary inductance $L_2$ using the following Equation 5. The secondary resistance change amount obtaining circuit 242 outputs the calculated amount of change $\Delta L_2$ to the foreign matter detecting circuit 244.

$$\Delta L_2 = L_2 - L_0 \qquad \text{[Equation 5]}$$

In this Equation 5, L0 is an original inductance of the power receiving coil 220 measured when there is no foreign matter.

The foreign matter detecting circuit 244 detects whether foreign matter is present or not from the amount of change $\Delta r_2$ in the secondary resistance and the amount of change $\Delta L_2$ in the secondary inductance. For example, the foreign matter detecting circuit 244 compares the amount of change $\Delta r_2$ and the amount of change $\Delta L_2$ with threshold values Th1 and Th2. The threshold value Th1 is a threshold value to be compared with the amount of change $\Delta r_2$. The threshold value Th2 is a threshold value to be compared with the amount of change $\Delta L_2$. Then, the foreign matter detecting circuit 244 determines that foreign matter is present when the amount of change $\Delta r_2$ is larger than the threshold value Th1 or the amount of change $\Delta L_2$ is larger than the threshold value Th2, for example. The foreign matter detecting circuit 244 outputs a result of the foreign matter detection to the charging control section 210.

Incidentally, the foreign matter detecting section 240 may determine that foreign matter is present when the amount of change $\Delta r_2$ is larger than the threshold value Th1 and the amount of change $\Delta L_2$ is larger than the threshold value Th2. In addition, as will be described later in a second embodiment, the foreign matter detecting section 240 may determine that foreign matter is present when the amount of change $\Delta r_2$ is larger than the threshold value without obtaining the amount of change $\Delta L_2$. Alternatively, the foreign matter detecting section 240 may determine that foreign matter is present when the amount of change $\Delta L_2$ is larger than the threshold value without obtaining the amount of change $\Delta r_2$. Alternatively, the foreign matter detecting section 240 may determine that foreign matter is present when an addition value obtained by adding together the amount of change $\Delta r_2$ and an amount of change $\Delta \omega L_2$ is larger than a threshold value.

The values of the amount of change $\Delta r_2$ and the amount of change $\Delta L_2$ in relation to the supplied voltage differ depending on the size and physical properties of the foreign matter. The kind of the substance is therefore identified by these values. The temperature of the foreign matter rises according to an increase in the amount of change $\Delta r_2$, in particular. Thus, the rise in the temperature is suppressed by controlling the received current such that the temperature is lower than a certain value.

Figure 7:
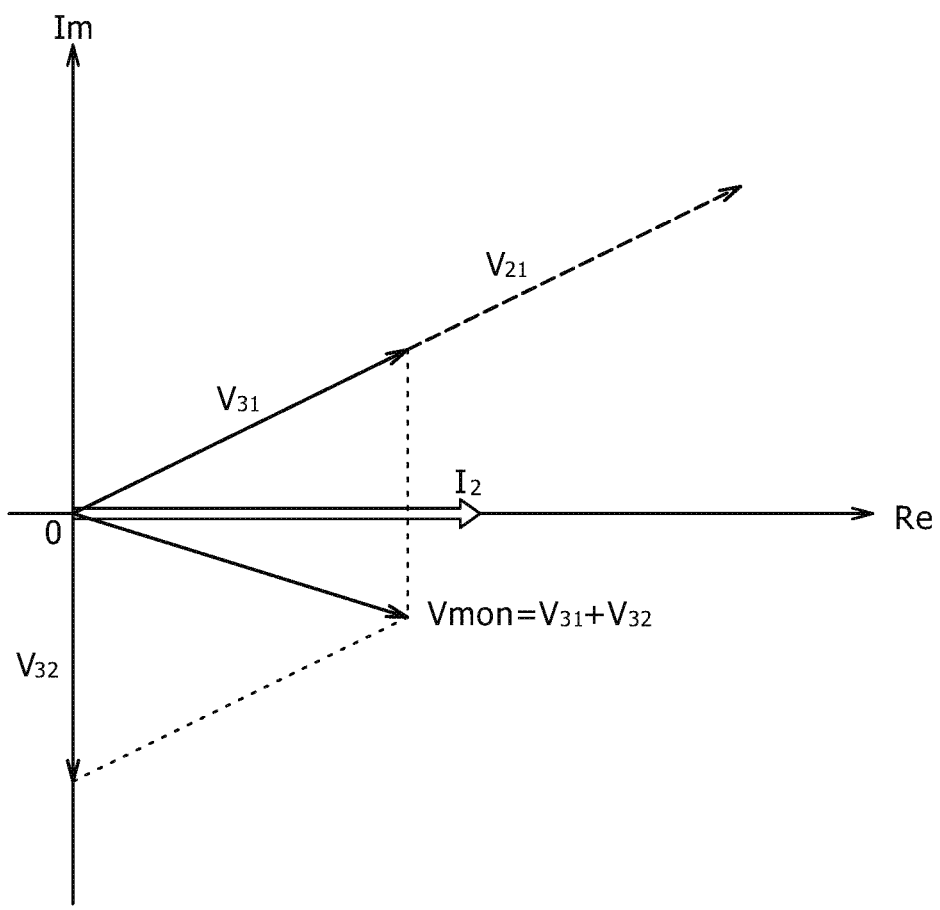
FIG. 7 is a diagram of assistance in explaining a method for calculating an induced voltage in the first embodiment.

FIG. 7 is a diagram of assistance in explaining a method for calculating the induced voltage in the first embodiment. In FIG. 7, an axis of ordinates indicates the imaginary part of alternating voltage expressed by complex representation, and an axis of abscissas indicates the real part thereof. From the equivalent circuits illustrated in FIG. 3, the induced voltage $V_{31}$ resulting from a change in the magnetic field generated by the power feeding coil 120 and the induced voltage $V_{32}$ resulting from a change in the magnetic field generated by the power receiving coil 220 occur in the measuring coil 230. Hence, the monitoring induced voltage Vmon is obtained from the following Equation 6.

$$\dot{V}_{mon} = \dot{V}_{31} + \dot{V}_{32} \qquad \text{[Equation 6]}$$

The induced voltage $V_{32}$ is obtained from the following Equation 7 on the basis of the coupling coefficient $M_{32}$ between the power receiving coil 220 and the measuring coil 230. The value of the coupling coefficient $M_{32}$ measured in advance before foreign matter detection is used in the calculation of the induced voltage $V_{32}$. Incidentally, in order to obtain the value of the coupling coefficient $M_{32}$, it suffices to stop power feeding from the power feeding device 100, supply a current from a power supply within the power receiving device 200 to the power receiving coil 220, and measure the monitoring induced voltage Vmon, in a state of the measuring coil 230 being mounted. In this case, only the induced voltage resulting from the magnetic field from the power receiving coil 220 occurs in the measuring coil 230, and therefore the monitoring induced voltage Vmon is equal to the induced voltage $V_{32}$. The coupling coefficient $M_{32}$ is obtained from relation between the current supplied to the power receiving coil 220 and the monitoring induced voltage Vmon (=$V_{32}$), using Equation 7.

$$\dot{V}_{32} = -j\omega \dot{I}_2 M_{32} \qquad \text{[Equation 7]}$$

The following Equation 8 is obtained from Equation 6 and Equation 7.

$$\dot{V}_{31} = \dot{V}_{mon} + j\omega \dot{I}_2 M_{32} \qquad \text{[Equation 8]}$$

In addition, the induced voltage $V_{21}$ of the power receiving coil 220 is obtained from the number of turns $N_2$ of the coil and the like by the following Equation 9.

$$V_{21} = N_2 \frac{d}{dt} \int\int u \cdot Hd_{21} \cdot n \cdot ds \qquad \text{[Equation 9]}$$

In Equation 9, p is the permeability of the power receiving coil 220. $Hd_{21}$ is the intensity of a magnetic field occurring in the coil surface of the power receiving coil 220. The unit of $Hd_{21}$ is for example an ampere/meter (A/m). n is a normal vector.

Meanwhile, the induced voltage $V_{31}$ of the measuring coil 230 is obtained from the number of turns $N_3$ of the coil and the like by the following Equation 10.

$$V_{31} = N_3 \frac{d}{dt} \int\int u \cdot Hd_{31} \cdot n \cdot ds \qquad \text{[Equation 10]}$$

In Equation 10, $Hd_{31}$ is the intensity of a magnetic field occurring in the coil surface of the measuring coil 230.

As described above, the measuring coil 230 is a coil having a center substantially coinciding with the center of the power receiving coil 220. A part of the measuring coil 230 is wound on the inside of an outermost circumference of the power receiving coil 220, the number of turns of the part the measuring coil 230 that is wound on the inside of the outermost circumference of the power receiving coil 220 is at least one. The area and the magnetic field intensity of the measuring coil 230 are therefore substantially equal to those of the power receiving coil 220. Hence, the following Equation 11 holds.

$$\frac{d}{dt}\int\int u \cdot Hd_{21} \cdot n \cdot ds \approx \frac{d}{dt}\int\int u \cdot Hd_{31} \cdot n \cdot ds \qquad \text{[Equation 11]}$$

This Equation 11 shows that the magnetic flux passing through the measuring coil 230 and the magnetic flux passing through the power receiving coil 220 substantially coincide with each other.

The following Equation 12 is obtained from Equation 9, Equation 10, and Equation 11.

$$\dot{V}_{21} = (N_2/N_3) \times \dot{V}_{31} \qquad \text{[Equation 12]}$$

The following Equation 13 is obtained from Equation 8 and Equation 12.

$$\dot{V}_{21} = (N_2/N_3) \times (\dot{V}_{mon} + j\omega \dot{I}_2 M_{32}) \qquad \text{[Equation 13]}$$

In addition, the following Equation 14 is obtained from the equivalent circuit illustrated in FIG. 3.

$$\dot{V}_{21} = (1/j\omega C_2 + R_2 + j\omega L_2 + r_2) \cdot \dot{I}_2$$

Equation 2 is derived by substituting the right side of Equation 13 into Equation 14 and obtaining the real parts of both sides. In addition, Equation 4 is derived by substituting the right side of Equation 13 into Equation 14 and obtaining the imaginary parts of both sides.

[Example of Operation of Power Feeding Device]

Figure 8:
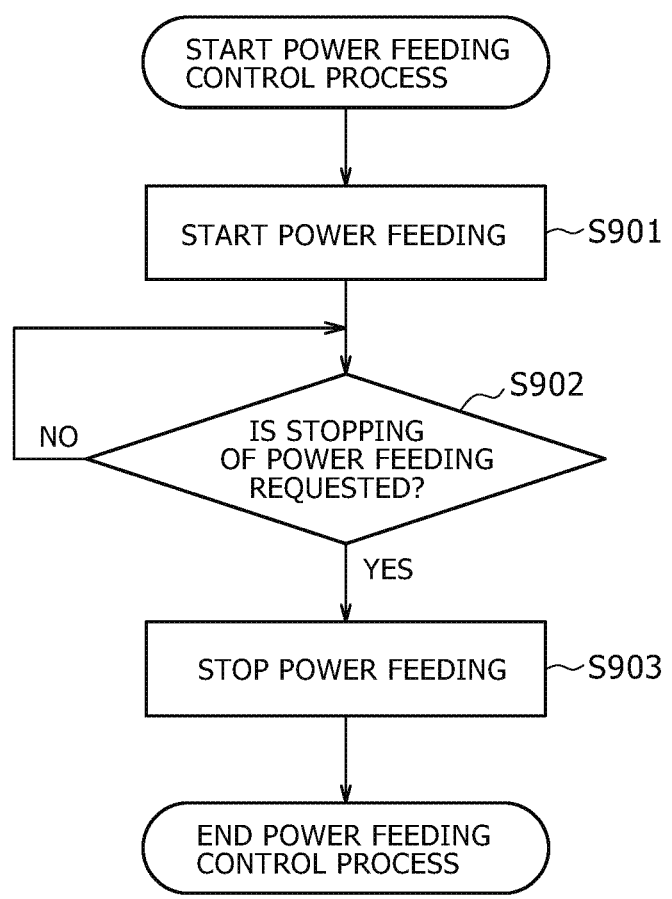
FIG. 8 is a flowchart of an example of a power feeding control process in the first embodiment.

FIG. 8 is a flowchart of an example of a power feeding control process in the first embodiment. This power feeding control process is started by the power feeding device 100 when the power feeding device 100 is turned on, for example.

The power feeding device 100 starts feeding alternating-current power (step S901). The power feeding device 100 determines whether the stopping of the power feeding is requested on the basis of a control signal (step S902). When the stopping of the power feeding is not requested (step S902: No), the power feeding device 100 returns to step S902 to continue the power feeding. When the stopping of the power feeding is requested (step S902: Yes), the power feeding device 100 stops the power feeding (step S903). After step S903, the power feeding device 100 ends the power feeding control process.

[Example of Operation of Power Receiving Device]

Figure 9:
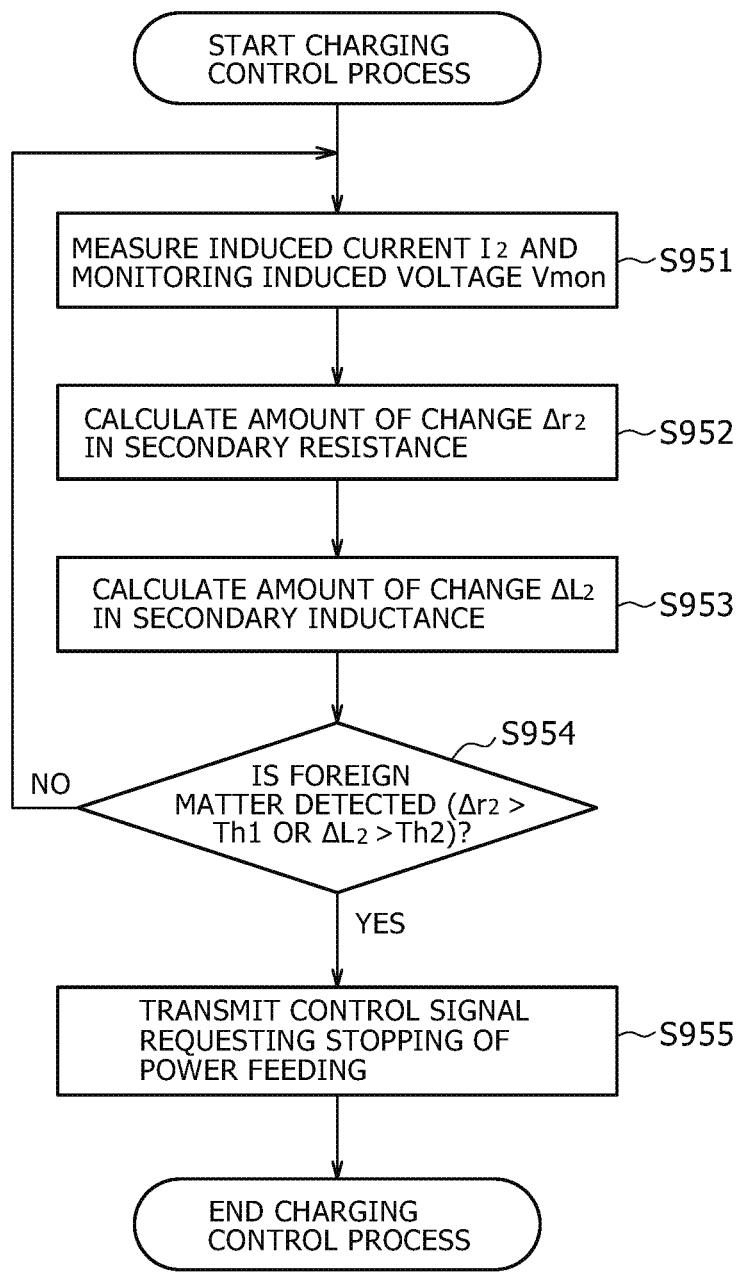
FIG. 9 is a flowchart of an example of a charging control process in the first embodiment.

FIG. 9 is a flowchart of an example of a charging control process in the first embodiment. This charging control process is started by the power receiving device 200 when power supply from the power feeding device 100 is started, for example.

The power receiving device 200 measures the induced current $I_2$ and the monitoring induced voltage Vmon (step S951). The power receiving device 200 calculates the amount of change $r_2$ in the secondary resistance by substituting the induced current $I_2$ and the monitoring induced voltage Vmon into Equation 2 and Equation 3 (step S952). In addition, the power receiving device 200 calculates the amount of change $\Delta L_2$ in the secondary inductance by substituting the induced current I2 and the monitoring induced voltage Vmon into Equation 4 and Equation 5 (step S953).

The power receiving device 200 determines whether foreign matter is detected on the basis of whether the condition that the amount of change $\Delta r_2$ be larger than the threshold value Th1 or the condition that the amount of change $\Delta L_2$ be larger than the threshold value Th2 is satisfied (step S954). When no foreign matter is detected (step S954: No), the power receiving device 200 returns to step S951. When foreign matter is detected (step S954: Yes), the power receiving device 200 transmits a control signal requesting the stopping of power feeding to the power feeding device 100 (step S955). After step S955, the power receiving device 200 ends the charging control process. Incidentally, the power receiving device 200 may control (for example stop) the supply of a charging current to the secondary battery or the like when foreign matter is detected. In this case, the power receiving device 200 does not need to transmit the control signal to the power feeding device 100 when foreign matter is detected. The power receiving device 200 may also control the supply of the charging current and transmit the control signal to the power feeding device 100 when foreign matter is detected.

Figure 10:
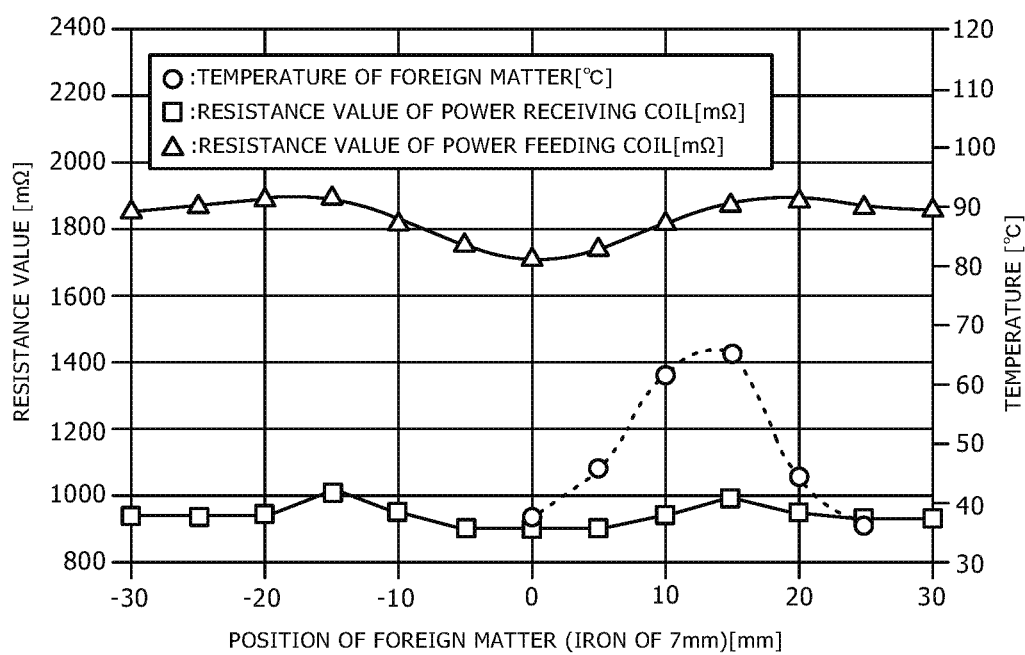
FIG. 10 is a graph showing an example of relation between the temperature of an iron of 7 mm and the resistance value of the power receiving coil in the first embodiment.
Figure 11:
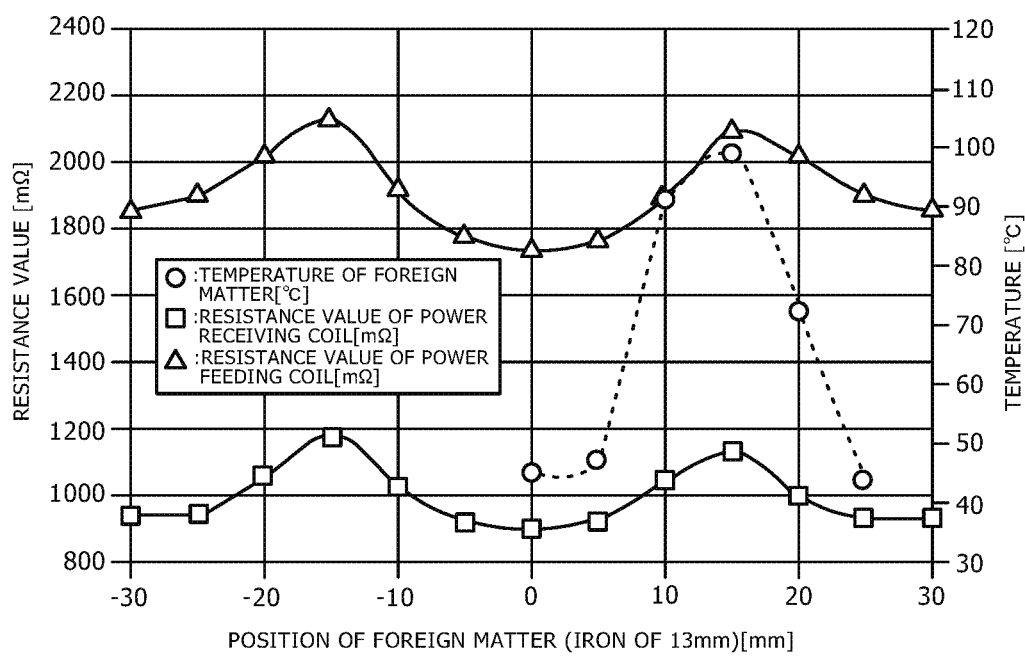
FIG. 11 is a graph showing an example of relation between the temperature of an iron of 13 mm and the resistance value of the power receiving coil in the first embodiment.
Figure 12:
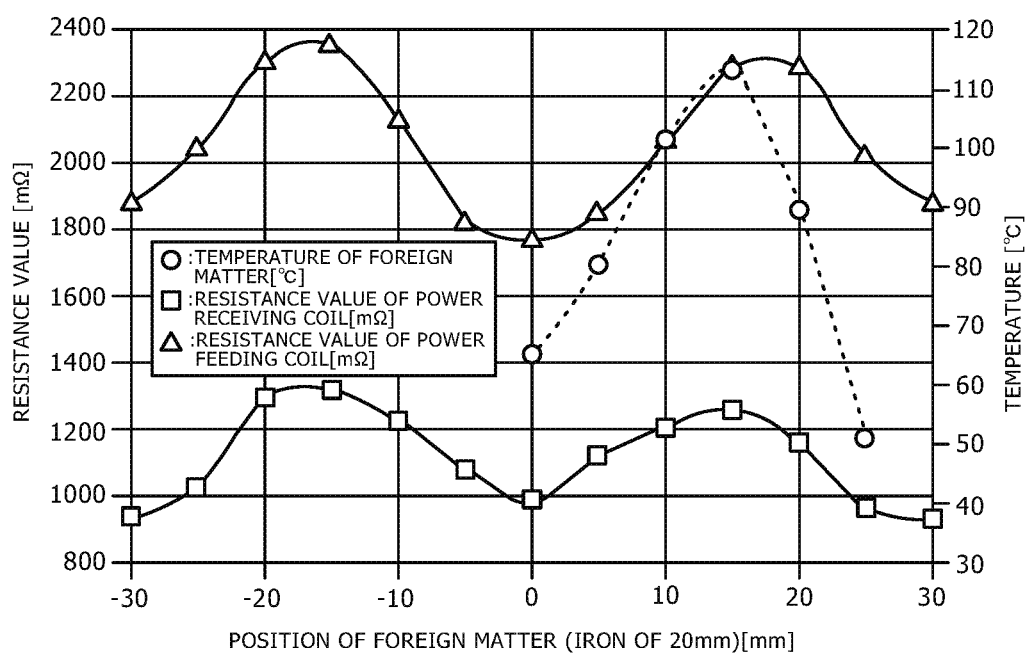
FIG. 12 is a graph showing an example of relation between the temperature of an iron of 20 mm and the resistance value of the power receiving coil in the first embodiment.

FIGS. 10 to 12 are graphs showing an example of relations between the temperature of foreign matter and the resistance values of coils in the first embodiment. An axis of ordinates in FIGS. 10 to 12 indicates the temperature of foreign matter or the resistance values of the coils. An axis of abscissas in FIGS. 10 to 12 indicates the position of foreign matter. The unit of the temperature is a degree (° C.). The unit of the resistance values is a milliohm (mΩ). The unit of the position is a millimeter (mm). On the axis of abscissas, with the center of the coils as an origin, a position on a predetermined straight line parallel to the coil surfaces of the coils which straight line includes the center of the coils is measured as the position of foreign matter. In addition, results of measurement of the temperature of foreign matter are plotted as circular marks in FIGS. 10 to 12. Results of measurement of the resistance value of the power receiving coil 220 are plotted as square marks in FIGS. 10 to 12. Results of measurement of the resistance value of the power feeding coil 120 are plotted as triangular marks in FIGS. 10 to 12.

As illustrated in FIGS. 10 to 12, when foreign matter is placed at a position slightly away from the center of the coils, the temperature of the foreign matter increases, and the resistance values of the coils (120 and 220) also rise. On the other hand, when the foreign matter is placed around the center, the temperature of the foreign matter decreases, and the resistance values of the coils also decrease. This is because, as described above, a Joule heat is generated by an eddy current within the foreign matter, and the impedance such as the resistance values and the like of the coils is changed by the action of a magnetic field generated by the eddy current.

Incidentally, in FIGS. 10 to 12, the temperature when the position is negative numbers is not measured. This is because temperature changes when the position is negative numbers are estimated to be similar to changes when the position is positive numbers.

Thus, according to the first embodiment of the present technology, magnetic fields can be measured by the measuring coil 230 having a center substantially coinciding with the center of the power receiving coil 220 and having a part wound on the inside of an outermost circumference of the power receiving coil 220, the number of turns of the part wound on the inside of the outermost circumference of the power receiving coil 220 being at least one. The power receiving device 200 can therefore detect whether foreign matter is present or not by obtaining the impedance (at least one of the resistance and the inductance) varying depending on the presence of foreign matter from the induced voltage of the measuring coil 230 and the induced current of the power receiving coil 220 that are generated by the electromagnetic fields. The values of the resistance and inductance of the power receiving coil 220 are constant irrespective of power feeding efficiency when no foreign matter is present, but vary when foreign matter is present between the coils. Hence, the foreign matter is detected correctly from at least one of the amounts of changes in the resistance and the inductance.

Incidentally, the noncontact power feeding system in the first embodiment uses the power feeding coil 120 and the power receiving coil 220 to feed power and transmit and receive control signals. However, the noncontact power feeding system may be provided with coils for transmitting and receiving control signals separately from the power feeding coil 120 and the power receiving coil 220, and the power feeding device 100 and the power receiving device 200 may transmit and receive control signals using the coils.

[Example of Modification]

Figure 13A:
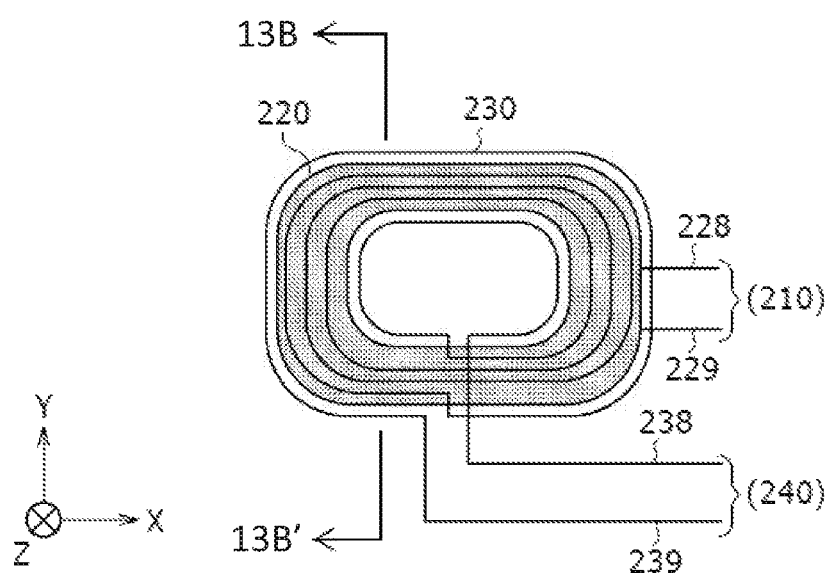
FIGS. 13A and 13B are diagrams showing an example of a measuring coil in an example of modification of the first embodiment.
Figure 13B:
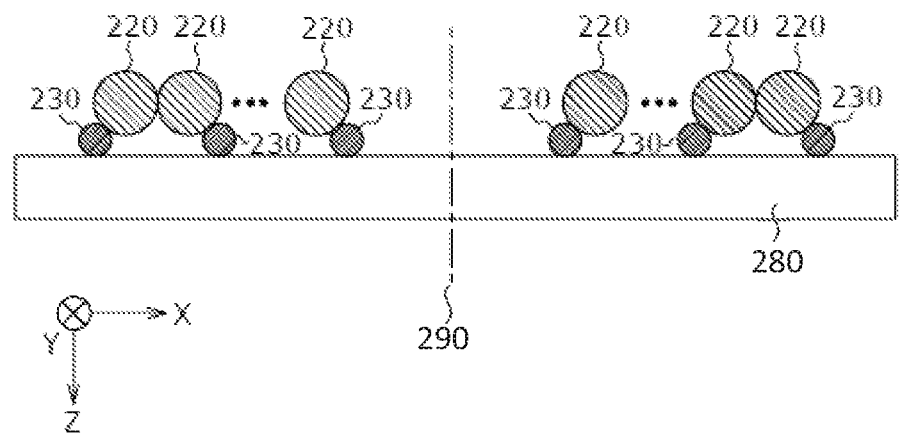

FIGS. 13A and 13B are diagrams showing an example of a measuring coil 230 in an example of modification of the first embodiment. In the first embodiment, the wire of the measuring coil 230 is wound on the inside and the outside of the power receiving coil 220. However, the wire of the measuring coil 230 may be wound between the innermost circumference and the outermost circumference of the power receiving coil 220. The measuring coil 230 in the modification example is different from that of the first embodiment in that the wire of the measuring coil 230 in the modification example is wound between the innermost circumference and the outermost circumference of the power receiving coil 220.

FIG. 13A is an example of a top view of the measuring coil 230 in the modification example. FIG. 13B is an example of a side view of the measuring coil 230 along line 13B-13B' in FIG. 13A. Shown in FIGS. 13A and 13B are orthogonal axes X, Y, and Z. Axis X extends along a direction that is perpendicular to both axis Y and axis Z. Axis Y extends along a direction that is perpendicular to both axis X and axis Z. Axis Z extends along a direction that is perpendicular to both axis Y and axis Y. In the modification example, the wire of the measuring coil 230 is wound along the wire of the power receiving coil 220 between the innermost circumference and the outermost circumference of the power receiving coil 220. As shown in FIG. 13B, the measuring coil 230 is between the power receiving coil 220 and a substrate 280. The substrate 280 is an insulating material. This insulating material for the substrate 280 being a glass, a resin, or any electrical insulating material is within the scope of the invention. Also shown in FIGS. 13A and 13B, at least one of the concentric turns of the wire of the measuring coil 230 is closer to the common axis 290 than each of the concentric turns of the wire of the power receiving coil 220. Incidentally, a method of winding the measuring coil 230 is arbitrary as long as the number of turns in a part the measuring coil 230 that is wound on the inside of the outermost circumference of the power receiving coil 220 is at least one. For example, all of the wire of the measuring coil 230 may be wound on the inside of the outermost circumference of the power receiving coil 220. In addition, all of the wire of the measuring coil 230 may be wound in a position on the inside of the outermost circumference of the power receiving coil 220 and on the outside of the innermost circumference of the power receiving coil 220.

When the wire of the measuring coil 230 is wound along the wire of the power receiving coil 220, the distribution of the magnetic field of the measuring coil 230 can be more approximated to the distribution of the magnetic field of the power receiving coil 220. Therefore, even when the distribution of the magnetic field of the power receiving coil 220 varies due to a positional displacement between the power receiving coil 220 and the power feeding coil 120, the electromotive force ratio of $V_{21}/V_{31}$ in Equation 12 is close to a constant value according to the turns ratio ($N_2/N_3$) or the thickness of the coils. As a result, even when a positional displacement occurs between the power receiving coil 220 and the power feeding coil 120, foreign matter is detected correctly. However, the more the number of turns of the measuring coil 230 is increased and approximated to the number of turns of the power receiving coil 220, the lower the accuracy of foreign matter detection becomes. Therefore, the number of turns of the measuring coil 230 is desirably smaller than that of the power receiving coil 220.

Thus, according to the modification example, the magnetic field distributions of the power receiving coil 220 and the measuring coil 230 can be approximated to each other by winding the measuring coil 230 between the innermost circumference and the outermost circumference of the power receiving coil 220. The electromotive force ratio of $V_{21}/V_{31}$ in Equation 12 thereby approximates to a constant value. Therefore, even when a positional displacement occurs, foreign matter can be detected correctly on the basis of the constant electromotive force ratio.

2. Second Embodiment

[Example of Configuration of Noncontact Power Feeding System]

Figure 14:
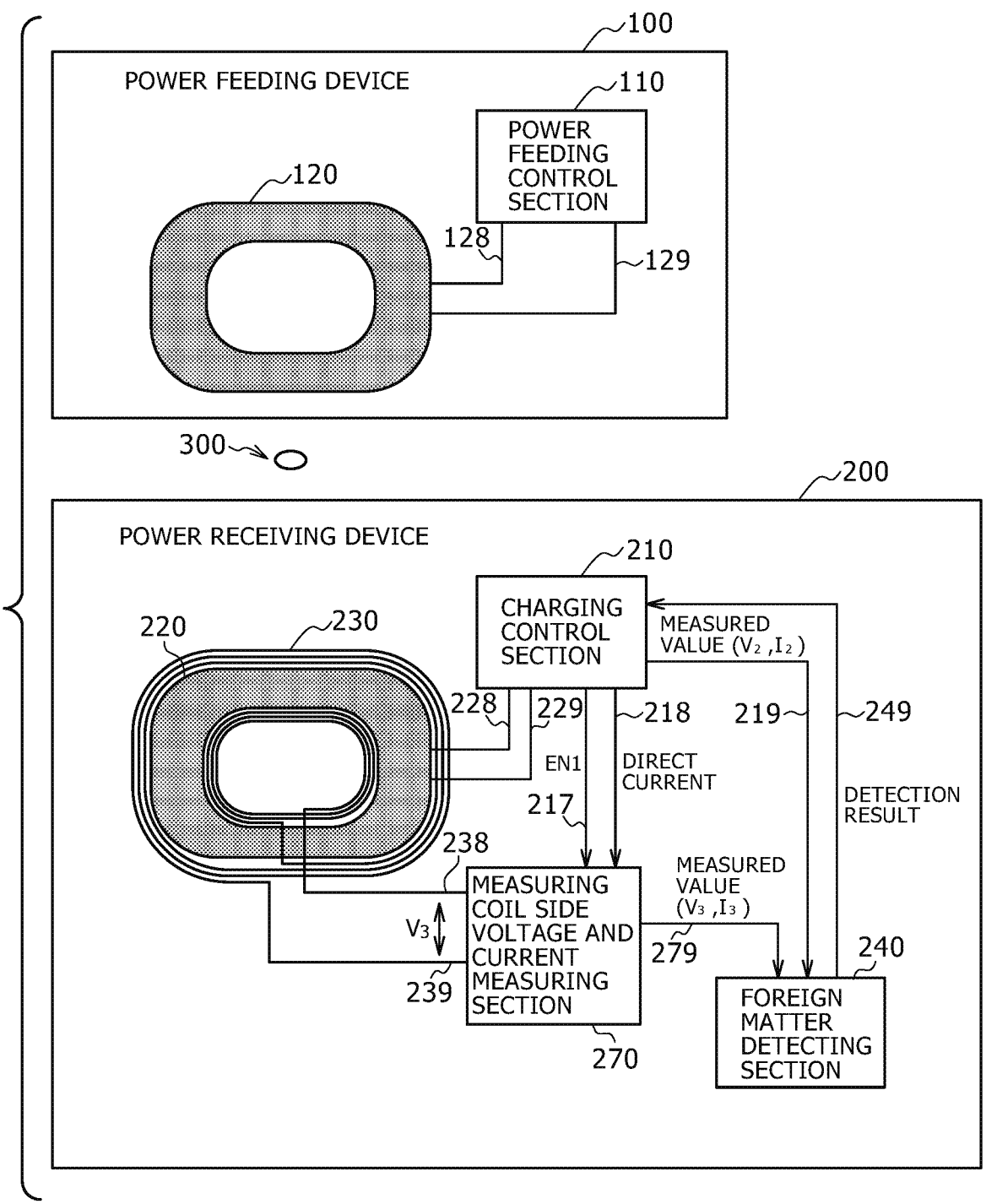
FIG. 14 is a general view of an example of configuration of a noncontact power feeding system in a second embodiment.

FIG. 14 is a general view of an example of configuration of a noncontact power feeding system in a second embodiment. The noncontact power feeding system according to the second embodiment is different from the first embodiment in that the noncontact power feeding system according to the second embodiment detects foreign matter on the basis of an impedance ratio between a power receiving coil 220 and a measuring coil 230. Specifically, the noncontact power feeding system according to the second embodiment is different from the first embodiment in that the noncontact power feeding system according to the second embodiment further includes a measuring coil side voltage and current measuring section 270.

A charging control section 210 in the second embodiment alternately repeats an operation of monitoring for foreign matter while making a power feeding device 100 stop power feeding and an operation of making the power feeding device 100 feed power to a power receiving device 200 by controlling the power feeding device 100. Suppose that times during which the respective operations are performed are fixed. The period for monitoring for foreign matter will hereinafter be referred to as a "monitoring period." The period for making the power feeding device 100 feed power will hereinafter be referred to as a "power feeding period." The power feeding device 100 is made to stop feeding power in the monitoring period because alternating voltages need to be applied to the power receiving coil 220 and the measuring coil 230 in order for foreign matter detection, and this applying operation may not be performed during the power feeding from the power feeding device 100. These alternating voltages are applied to obtain impedances in the equivalent circuits of the power receiving coil 220 and the measuring coil 230. Suppose in the following that the alternating voltage applied to the power receiving coil 220 is an alternating voltage $V_2$, and that the alternating voltage applied to the measuring coil 230 is an alternating voltage $V_3$. The amplitudes and phases of these alternating voltages may be the same, or may be different values.

The charging control section 210 makes the power feeding stopped by transmitting a control signal to stop the power feeding to the power feeding device 100 at a time of a start of the monitoring period. After the power feeding is stopped, the charging control section 210 supplies a direct current from the secondary battery charged to a certain degree or the like to the measuring coil side voltage and current measuring section 270 via a signal line 218. Then, the charging control section 210 makes the measuring coil side voltage and current measuring section 270 apply the alternating voltage $V_3$ to the measuring coil 230 for a fixed time. The application of the alternating voltage $V_3$ by the measuring coil side voltage and current measuring section 270 is controlled by an enable signal EN1 supplied from the charging control section 210 via a signal line 217. Then, the charging control section 210 applies the alternating voltage $V_2$ to the power receiving coil 220 during a period from the stopping of the application of the alternating voltage $V_3$ by the measuring coil side voltage and current measuring section 270 to an end of the monitoring period. The charging control section 210 supplies the measured value of a current $I_2$ generated in the power receiving coil 220 by the application of the alternating voltage $V_2$ to a foreign matter detecting section 240 via a signal line 219 together with the measured value of the alternating voltage $V_2$. Then, the charging control section 210 receives a detection result as a result of determining whether foreign matter is present between the power feeding device 100 and the power receiving device 200 from the foreign matter detecting section 240 via a signal line 249.

After the passage of the monitoring period, the charging control section 210 stops the application of the alternating voltage $V_2$ to the power receiving coil 220. After stopping the application of the alternating voltage $V_2$, the charging control section 210 controls the power feeding device 100 to make the power feeding device 100 resume power feeding. However, when foreign matter is present, the charging control section 210 stops or decreases a charging current. When the charging control section 210 decreases the charging current, the power receiving device 200 decreases magnetic field intensity according to the decrease in the charging current. The decrease in the magnetic field intensity reduces an eddy current occurring in the foreign matter within a magnetic field, so that a rise in temperature of the foreign matter is suppressed. When a rise in temperature of the foreign matter may not be suppressed by controlling the charging current, or for example when the charging current may not be decreased further, the charging control section 210 does not transmit a control signal to the power feeding device 100. This prevents the power feeding from being resumed when a power feeding period is started. Incidentally, while the charging control section 210 is configured not to transmit a control signal to start power feeding when foreign matter is detected, the charging control section 210 can transmit a control signal to start feeding an amount of power smaller by a certain amount than before when the monitoring period has passed. This makes power feeding continued even when foreign matter is detected.

The number of turns of the measuring coil 230 in the second embodiment is desirably smaller than the number of turns of the power receiving coil 220. Thus, an amount of increase in impedance in the equivalent circuit of the measuring coil 230 due to foreign matter is smaller than in the power receiving coil 220. An amount of increase in impedance due to foreign matter in this case is obtained by subtracting the impedance of the power receiving coil 220 or the measuring coil 230 in a case where no foreign matter is present between the power feeding coil 120 and the power receiving coil 220 from the impedance of the power receiving coil 220 or the measuring coil 230 in a case where foreign matter is present between the power feeding coil 120 and the power receiving coil 220. Because of a small amount of increase in impedance of the measuring coil 230 due to foreign matter, the impedance of the measuring coil 230 in the second embodiment is used as a reference value in obtaining an amount of increase in impedance of the power receiving coil 220 due to foreign matter.

Incidentally, the impedance of the power receiving coil 220 in a case where no foreign matter is present is not necessarily an appropriate value as a reference value. This is because the impedance of the power receiving coil 220 may be a different value from a value at a time of factory shipment or at a time of a test due to a displacement of the mounting positions of the coils within a casing after the factory shipment or an effect of a member such as a cover or the like covering coil surfaces. On the other hand, the measuring coil 230 is disposed in such a position as to be linked by a same magnetic flux as a magnetic flux linking the power receiving coil 220. Thus, when the impedance of the power receiving coil 220 changes due to the above-described factors, the impedance of the measuring coil 230 also changes according to an amount of change in impedance of the power receiving coil 220. An impedance ratio between the power receiving coil 220 and the measuring coil 230 in a case where no foreign matter is present is therefore substantially constant. For this reason, the value of the impedance of the measuring coil 230 is desirably set as a reference value.

The measuring coil side voltage and current measuring section 270 applies the alternating voltage $V_3$ to the measuring coil 230 via signal lines 238 and 239 under control of the charging control section 210, and measures a current $I_3$ produced by the application of the alternating voltage $V_3$. The measuring coil side voltage and current measuring section 270 includes an alternating-current power supply, for example. The measuring coil side voltage and current measuring section 270 applies the alternating voltage generated by the alternating-current power supply to the measuring coil 230. The measuring coil side voltage and current measuring section 270 measures the terminal voltage of the alternating-current power supply as alternating voltage $V_3$ together with the current $I_3$, and supplies the measured values of the alternating voltage $V_3$ and the current $I_3$ to the foreign matter detecting section 240 via a signal line 279.

The foreign matter detecting section 240 in the second embodiment detects foreign matter on the basis of the ratio of the impedance of the power receiving coil 220 to the impedance of the measuring coil 230. For example, the foreign matter detecting section 240 determines that foreign matter is present when the ratio of the impedance of the power receiving coil 220 to the impedance of the measuring coil 230 exceeds a predetermined threshold value.

Figure 15:
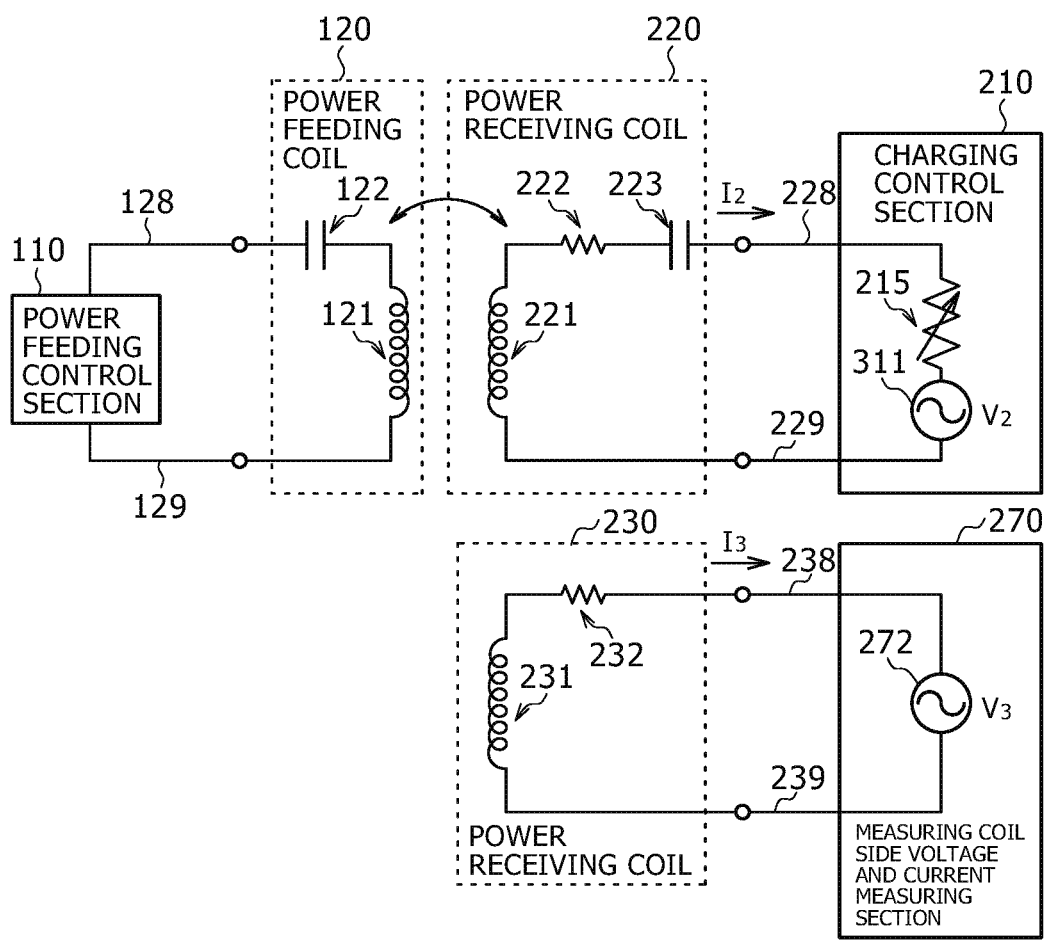
FIG. 15 is a circuit diagram showing an example of an equivalent circuit of the noncontact power feeding system in the second embodiment.

FIG. 15 is a circuit diagram showing an example of an equivalent circuit of the noncontact power feeding system in the second embodiment. The charging control section 210 in the second embodiment is replaced by an equivalent circuit including a load resistance ($R_2$) 215 and an alternating-current power supply 311 for supplying an alternating voltage ($V_2$). The measuring coil side voltage and current measuring section 270 is replaced by an equivalent circuit including an alternating-current power supply 272 for supplying an alternating voltage ($V_3$).

The power receiving device 200 applies the alternating voltages $V_2$ and $V_3$ in order, and measures the alternating voltages $V_2$ and $V_3$ and the currents $I_2$ and $I_3$ produced by the application of the alternating voltages $V_2$ and $V_3$. The power receiving device 200 can obtain the impedance ratio between the power receiving coil 220 and the measuring coil 230 ($r_2/r_3$ or $L_2/L_3$) from the measured values of the alternating voltages $V_2$ and $V_3$ and the currents $I_2$ and $I_3$. As described above, an amount of increase in impedance ($r_3$ and $L_3$) of the measuring coil 230 due to the presence of foreign matter is smaller than that of the power receiving coil 220. The power receiving device 200 can therefore detect foreign matter by determining whether the impedance ratio between the measuring coil 230 and the power receiving coil 220 which ratio is obtained from the alternating voltages $V_2$ and $V_3$ and the currents $I_2$ and $I_3$ is larger than a predetermined threshold value.

Figure 16:
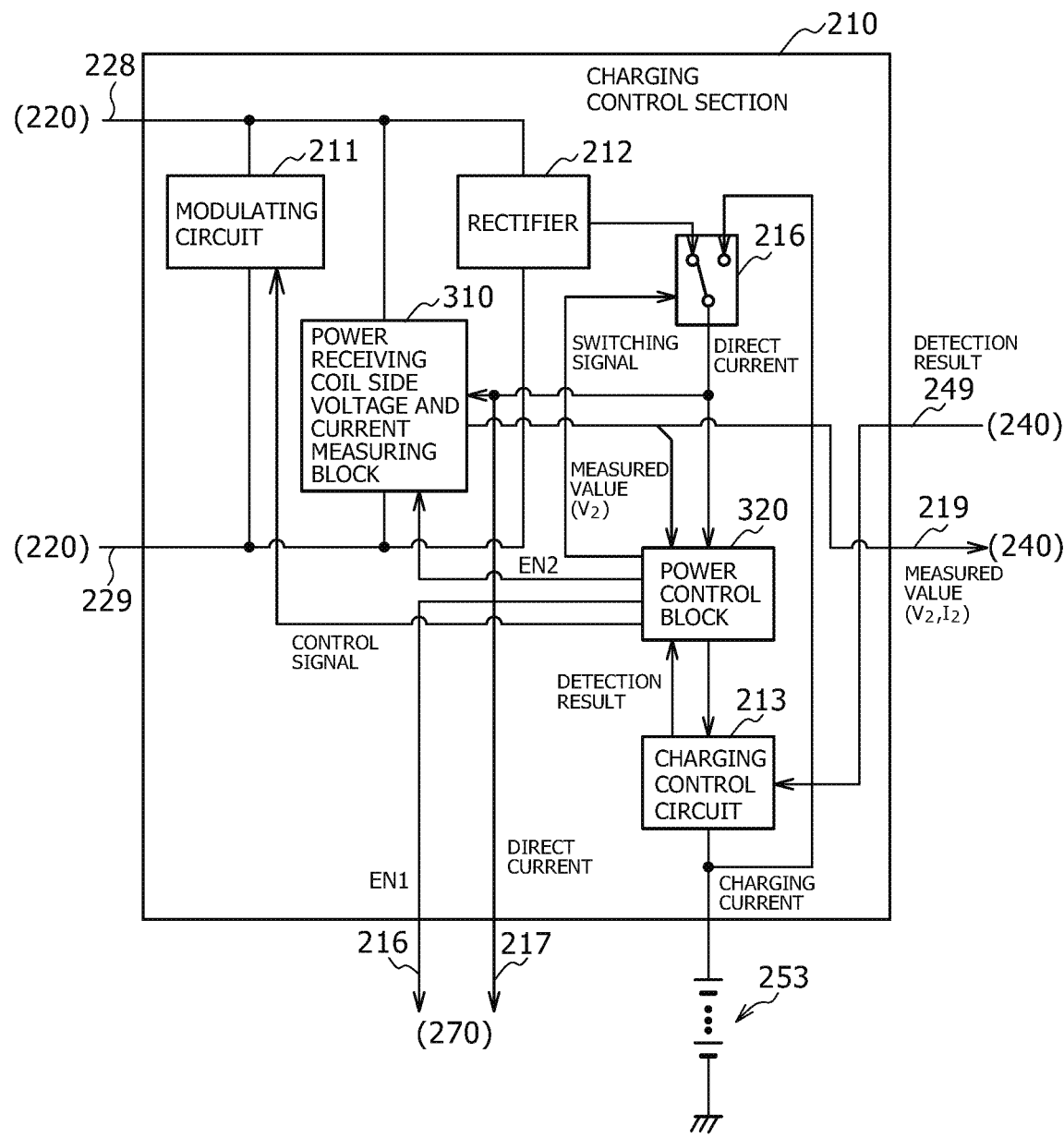
FIG. 16 is a block diagram showing an example of configuration of a charging control section in the second embodiment.

FIG. 16 is a block diagram showing an example of configuration of the charging control section 210 in the second embodiment. The charging control section 210 in the second embodiment is different from that of the first embodiment in that the charging control section 210 in the second embodiment further includes a switch 216, a power receiving coil side voltage and current measuring block 310, and a power control block 320. In addition, the charging control section 210 is connected to a secondary battery 253 when the secondary battery 253 is mounted in the power receiving device 200. Incidentally, the secondary battery 253 may be a battery incorporated in the power receiving device 200.

The switch 216 changes a source of supply of direct current under control of the power control block 320. The switch 216 has two input terminals, one output terminal, and a control terminal. One of the input terminals is connected to a rectifier 212. The other input terminal is connected to a terminal on a high potential side of the secondary battery 253. The output terminal is connected to the power receiving coil side voltage and current measuring block 310, the power control block 320, and the measuring coil side voltage and current measuring section 270. A switching signal is input to the control terminal. The switch 216 for example changes the source of supply of direct-current power to the rectifier 212 when the switching signal is set to a low level, and changes the source of supply of direct current to the secondary battery 253 when the switching signal is set to a high level.

The power receiving coil side voltage and current measuring block 310 applies the alternating voltage $V_2$ to the power receiving coil under control of the power control block 320, and measures the current $I_2$ produced by the alternating voltage $V_2$ together with the alternating voltage $V_2$. Specifically, the power receiving coil side voltage and current measuring block 310 starts the application of the alternating voltage and the measurement of the current and the voltage when an enable signal EN2 from the power control block 320 is set to a high level, and stops these operations when the enable signal EN2 is set to a low level. The power receiving coil side voltage and current measuring block 310 supplies the measured values to the foreign matter detecting section 240.

The power control block 320 controls the power feeding device 100, the switch 216, the power receiving coil side voltage and current measuring block 310, and the measuring coil side voltage and current measuring section 270 on the basis of a result of foreign matter detection. The power control block 320 controls the power feeding device 100 by transmitting a control signal to the power feeding device 100 via a modulating circuit 211. In addition, the power control block 320 controls the switch 216 by outputting the switching signal to the switch 216. Further, the power control block 320 controls the power receiving coil side voltage and current measuring block 310 and the measuring coil side voltage and current measuring section 270 by outputting the enable signals EN2 and EN1 to the power receiving coil side voltage and current measuring block 310 and the measuring coil side voltage and current measuring section 270. Details of the operation of the power control block 320 will be described later.

The charging control circuit 213 in the second embodiment controls (for example stops) the supply of the charging current to the secondary battery 253 when foreign matter is detected. A decrease in the charging current suppresses a rise in temperature of the foreign matter due to a magnetic field from the power receiving device 200. When a rise in temperature of the foreign matter may not be suppressed by controlling the charging current, the charging control circuit 213 supplies a result of foreign matter detection to the power control block 320. Incidentally, the power receiving device 200 may transmit a result of control of the charging current to the power feeding device 100 via the modulating circuit 211 when foreign matter is detected.

[Example of Configuration of Power Receiving Coil Side Voltage and Current Measuring Block]

Figure 17:
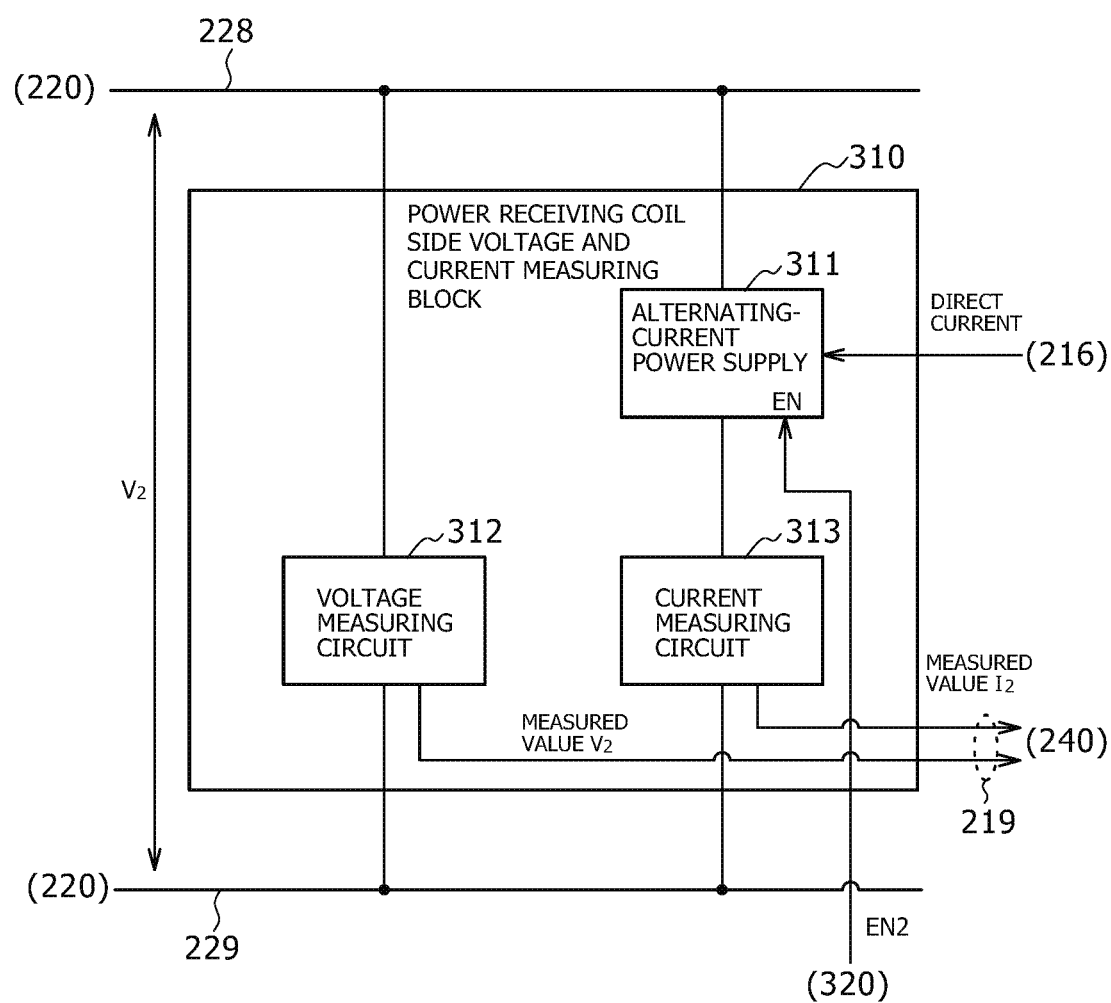
FIG. 17 is a block diagram showing an example of configuration of a power receiving coil side voltage and current measuring block in the second embodiment.

FIG. 17 is a block diagram showing an example of configuration of the power receiving coil side voltage and current measuring block 310 in the second embodiment. The power receiving coil side voltage and current measuring block 310 includes the alternating-current power supply 311, a voltage measuring circuit 312, and a current measuring circuit 313.

The alternating-current power supply 311 converts the direct current from the secondary battery 253 into an alternating-current power and supplies the alternating-current power to the power receiving coil 220 under control of the power control block 320. In supplying the alternating-current power, the frequency and the amplitude of the alternating voltage are desirably a fixed value. An inverter, for example, is used as the alternating-current power supply 311. The alternating-current power supply 311 has an input terminal, an output terminal, and an enable terminal EN. The input terminal is connected to the secondary battery 253 via the switch 216. The output terminal is connected to the power receiving coil 220. The enable terminal EN is connected to the power control block 320. The enable signal EN2 for enabling or disabling the alternating-current power supply 311 is input to the enable terminal EN. When the alternating-current power supply 311 is made to supply the alternating-current power (enabled), the enable signal EN2 is for example set to a high level. When the alternating-current power supply 311 is not made to supply the alternating-current power (disabled), on the other hand, the enable signal EN2 is for example set to a low level. When the alternating-current power supply 311 is disabled, the impedance of the alternating-current power supply 311 is raised to such an extent that the current does not flow in a reverse direction from the output terminal to the inside of the alternating-current power supply 311. Incidentally, the alternating-current power supply 311 is an example of a second alternating voltage applying section described in claims.

The voltage measuring circuit 312 measures a voltage between the output terminals of the alternating-current power supply 311 as alternating voltage $V_2$. The voltage measuring circuit 312 subjects the measured value to A/D (Analog to Digital) conversion as required, and supplies the measured value to the foreign matter detecting section 240 and the power control block 320. The current measuring circuit 313 measures the alternating current $I_2$ produced in the power receiving coil 220 by the application of the alternating voltage $V_2$. The current measuring circuit 313 subjects the measured value to A/D conversion as required, and supplies the measured value to the foreign matter detecting section 240 and the power control block 320. Incidentally, the current measuring circuit 313 can also measure the current of a direct-current circuit inserted in series with the charging control section 210 in place of the alternating current.

[Example of Configuration of Power Control Section]

Figure 18:
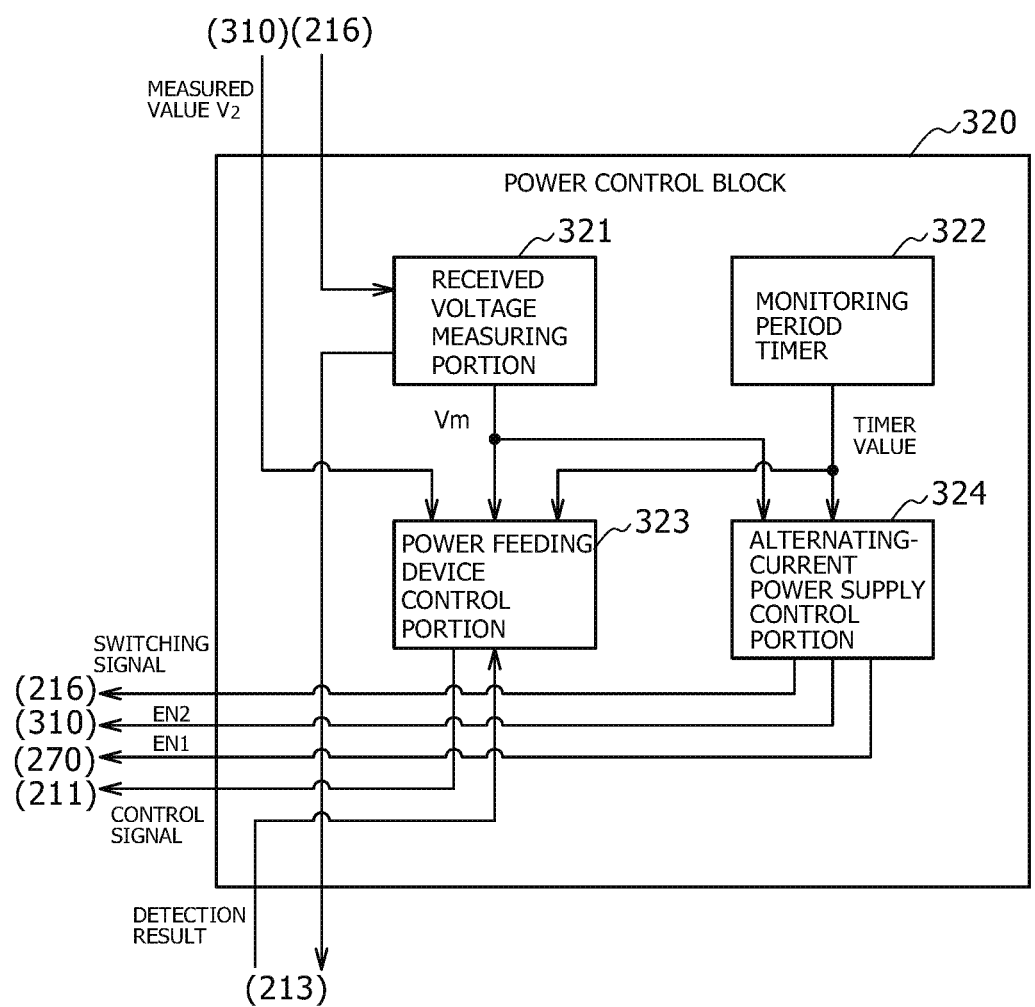
FIG. 18 is a block diagram showing an example of configuration of a power control block in the second embodiment.

FIG. 18 is a block diagram showing an example of configuration of the power control block 320 in the second embodiment. The power control block 320 includes a received voltage measuring portion 321, a monitoring period timer 322, a power feeding device control portion 323, and an alternating-current power supply control portion 324.

The received voltage measuring portion 321 measures the voltage of the power converted into direct current by the rectifier 212 as received voltage Vm. The received voltage measuring portion 321 subjects the measured value to A/D conversion as required, and supplies the measured value to the power feeding device control portion 323 and the alternating-current power supply control portion 324.

The monitoring period timer 322 clocks an elapsed time in a power feeding period and a monitoring period. The monitoring period timer 322 supplies a timer value to the power feeding device control portion 323 and the alternating-current power supply control portion 324.

The power feeding device control portion 323 controls the power feeding device 100 to make the power feeding device 100 supply alternating-current power to the power receiving device 200. When the timer value is within a monitoring period, the power feeding device control portion 323 generates a stop control signal to stop power feeding, and transmits the stop control signal to the power feeding device 100 via the modulating circuit 211. In addition, the power feeding device control portion 323 receives a detection result from the charging control circuit 213.

When the timer value is within a power feeding period, on the other hand, the power feeding device control portion 323 obtains the measured value of the alternating voltage $V_2$. Then, the power feeding device control portion 323 determines whether the application of the alternating voltage $V_2$ is stopped or not on the basis of whether the alternating voltage $V_2$ is equal to or lower than a predetermined value. When the application of the alternating voltage $V_2$ is stopped, the power feeding device control portion 323 generates a start control signal to start power feeding, and transmits the start control signal to the power feeding device 100. However, when foreign matter is detected, the power feeding device control portion 323 does not transmit the start control signal to the power feeding device 100. During a period from a start of power feeding to a start of a monitoring period, the power feeding device control portion 323 transmits a fed power amount control signal for controlling an amount of fed power on the basis of the value of the received voltage Vm. For example, the power feeding device control portion 323 transmits the fed power amount control signal to increase or decrease the amount of fed power so that the received voltage Vm falls within a certain range.

Incidentally, while the power feeding device control portion 323 determines whether the application of the alternating voltage $V_2$ is stopped or not on the basis of the measured value of the alternating voltage $V_2$, the power feeding device control portion 323 can determine whether the application of the alternating voltage $V_2$ is stopped or not by another method. For example, the power feeding device control portion 323 can also determine that the application of the alternating voltage $V_2$ is stopped when a certain period has passed from the time of an end of a monitoring period.

The alternating-current power supply control portion 324 controls the alternating-current power supplies in the power receiving coil side voltage and current measuring block 310 and the measuring coil side voltage and current measuring section 270 to make the alternating voltages applied. When the timer value is within a monitoring period, the alternating-current power supply control portion 324 obtains the measured value of the received voltage Vm. The alternating-current power supply control portion 324 then determines whether power feeding is stopped or not on the basis of whether the received voltage Vm is equal to or lower than a predetermined value. When power feeding is stopped, the alternating-current power supply control portion 324 sets the switching signal to a high level and outputs the switching signal to the switch 216, and sets the enable signal EN1 to a high level for a certain period to make the alternating-current power supply within the measuring coil side voltage and current measuring section 270 apply the alternating voltage $V_3$. During a period from the setting of the enable signal EN1 to a low level to the expiration of the monitoring period, the alternating-current power supply control portion 324 sets the enable signal EN2 to a high level to make the alternating-current power supply within the power receiving coil side voltage and current measuring block 310 apply the alternating voltage $V_2$. When the timer value is within a power feeding period, on the other hand, the alternating-current power supply control portion 324 sets the switching signal to a low level, and sets the enable signal EN2 to a low level to make the application of the alternating voltage $V_2$ stopped.

Incidentally, while the alternating-current power supply control portion 324 determines whether power feeding is stopped or not on the basis of the measured value of the received voltage Vm, the alternating-current power supply control portion 324 can determine whether power feeding is stopped or not by another method. For example, the alternating-current power supply control portion 324 can also determine whether power feeding is stopped or not when a certain period has passed from the time of a start of a monitoring period.

FIG. 19 is a diagram showing an example of the operation of the power feeding device control portion 323 and the alternating-current power supply control portion 324 in the second embodiment. Suppose that the monitoring period timer 322 repeatedly counts a timer value T from 0 to Te. In addition, suppose that a period in which the timer value T is 0 to Ts−1 (Ts is a value greater than 0 and less than Te) is a power feeding period, and that a period of Ts to Te is a monitoring period. In the monitoring period, suppose that a period of Ts to Tm−1 (Tm is a value greater than Ts and less than Te) is a period for measuring the voltage and the current of the measuring coil 230, and that a period from Tm to Te−1 is a period for measuring the voltage and the current of the power receiving coil 220.

When the application of the alternating voltage $V_2$ is stopped in the power feeding period, the power feeding device control portion 323 controls the power feeding device 100 to make the power feeding device 100 start power feeding by a start control signal. However, when foreign matter is detected and may not be dealt with by the control of the charging current by the charging control circuit 213, the power feeding device control portion 323 does not transmit the start control signal to the power feeding device 100. After power feeding is started, the power feeding device control portion 323 controls an amount of fed power on the basis of the value of the received voltage Vm. Then, at the time of a start of the monitoring period (T=Ts), the power feeding device control portion 323 controls the power feeding device 100 to make the power feeding device 100 stop the power feeding.

In the monitoring period, when the power feeding is stopped, the alternating-current power supply control portion 324 sets the enable signal EN1 to a high level to make the application of the alternating voltage $V_3$ to the measuring coil 230 started. Then, at the time of Tm, the alternating-current power supply control portion 324 sets the enable signal EN1 to a low level to make the application of the alternating voltage $V_3$ to the measuring coil 230 stopped, and sets the enable signal EN2 to a high level to make the application of the alternating voltage $V_2$ to the power receiving coil 220 started. At the time of an end of the monitoring period (T=Te), the alternating-current power supply control portion 324 sets the enable signal EN2 to a low level to make the application of the alternating voltage $V_2$ stopped.

Incidentally, while the power control block 320 is configured to make the application of the alternating voltages started each time the monitoring period is started even after foreign matter is detected, the power control block 320 can be configured not to make the alternating voltages applied after foreign matter is detected. Alternatively, the power control block 320 may be configured to decrease monitoring frequency when foreign matter is detected.

In addition, the power control block 320 makes the application of the alternating voltage to the power receiving coil 220 started after the application of the measuring coil 230 in the monitoring period. However, the power control block 320 may conversely make the application of the alternating voltage to the measuring coil 230 started after the application of the alternating voltage to the power receiving coil 220. In addition, while the power control block 320 is configured to make the applications of the alternating voltages to the measuring coil 230 and the power receiving coil 220 performed in order, the power control block 320 may be configured to make the applications of the alternating voltages to these coils performed simultaneously.

In addition, while the power feeding period is started first, the monitoring period may be started first. In addition, while the power control block 320 is configured to clock the monitoring period repeatedly, the power control block 320 may be configured to clock the monitoring period once. It suffices for the power control block 320 in this configuration to hold power feeding stopped when foreign matter is detected, or make power feeding resumed when no foreign matter is present.

In addition, when power feeding can be controlled, the control signals are not limited to signals for making power feeding started or ended. For example, the power receiving device 200 may transmit a control signal for making power feeding stopped for a certain period or a control signal for making the resumption of power feeding cancelled. It suffices for the power receiving device 200 in this configuration to transmit a control signal for making power feeding stopped for a certain period at the time of a start of the monitoring period, and transmit a control signal for making the resumption of power feeding cancelled when foreign matter is present.

Further, while the power receiving device 200 is configured to control the power feeding device 100, the power feeding device 100 may be configured to control the power receiving device 200. In this configuration, the power feeding device 100 includes a monitoring period timer, stops power feeding at the time of a start of a monitoring period, and then transmits a control signal for giving an instruction to start the application of the alternating voltages to the power receiving device 200. The power receiving device 200 transmits a signal indicating a result of foreign matter detection to the power feeding device 100 in the monitoring period. At the time of an end of the monitoring period, the power feeding device 100 transmits a control signal for giving an instruction to stop the application of the alternating voltages to the power receiving device 200. The power feeding device 100 starts power feeding in a power feeding period when no foreign matter is present, or does not start power feeding when foreign matter is present.

[Example of Configuration of Measuring Coil Side Voltage and Current Measuring Section]

Figure 20:
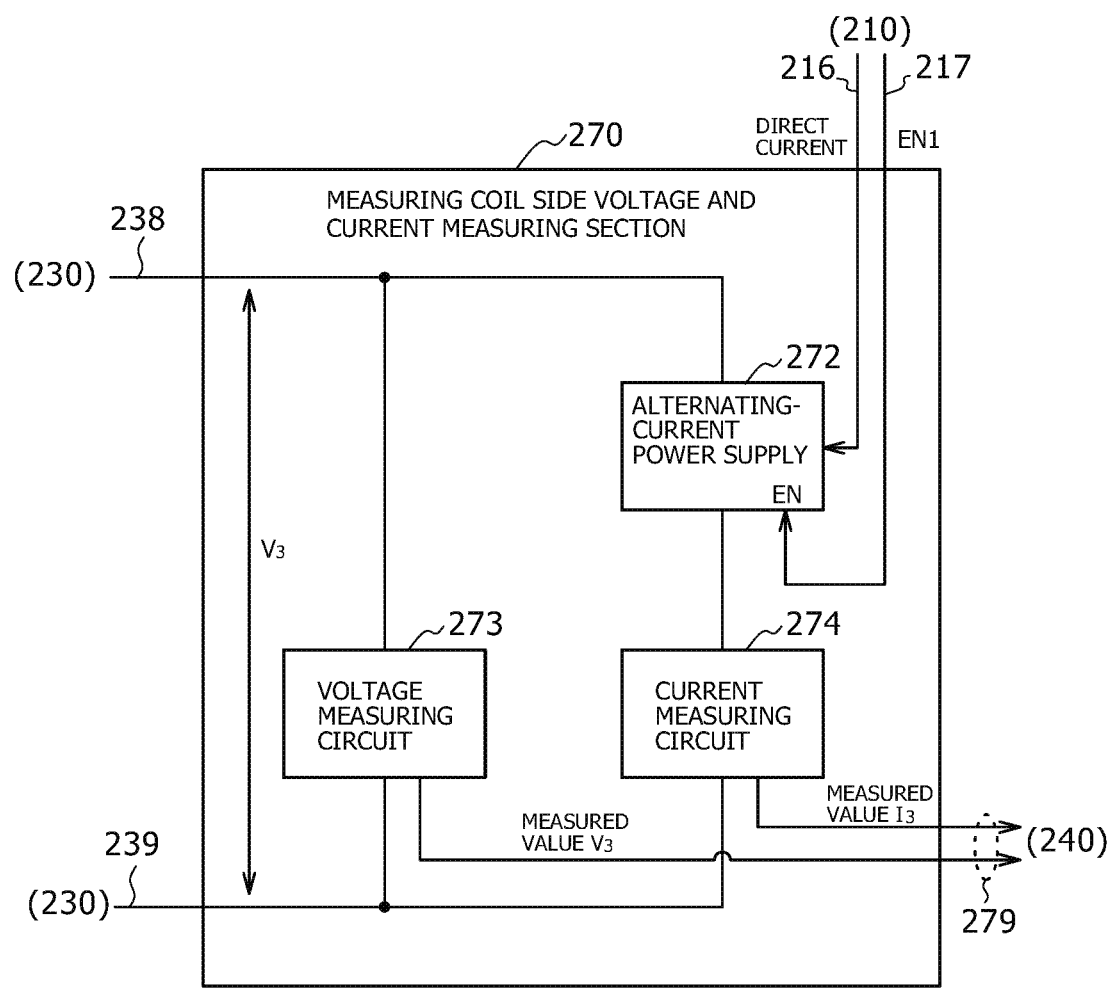
FIG. 20 is a block diagram showing an example of configuration of a measuring coil side voltage and current measuring section in the second embodiment.

FIG. 20 is a block diagram showing an example of configuration of the measuring coil side voltage and current measuring section 270 in the second embodiment. The measuring coil side voltage and current measuring section 270 includes an alternating-current power supply 272, a voltage measuring circuit 273, and a current measuring circuit 274.

The alternating-current power supply 272 converts direct-current power from the secondary battery 253 into an alternating current and supplies the alternating current to the measuring coil 230 under control of the power control block 320. The configuration of the alternating-current power supply 272 is similar to that of the alternating-current power supply 311 in the power receiving coil side voltage and current measuring block 310 except that the alternating-current power supply 272 operates according to the enable signal EN1 and applies the alternating voltage to the measuring coil 230. Incidentally, while the alternating-current power supply (311) for supplying power to the power receiving coil 220 and the alternating-current power supply (272) for supplying power to the measuring coil 230 are provided separately from each other, the present technology is not limited to this configuration. For example, one of the alternating-current power supplies may be provided, and the alternating-current power supply may be configured to supply power to the power receiving coil 220 and the measuring coil 230 in order. In addition, the alternating-current power supply 311 is an example of a second alternating voltage applying section described in claims.

The voltage measuring circuit 273 measures a voltage between the output terminals of the alternating-current power supply 272 as alternating voltage $V_3$. The voltage measuring circuit 273 subjects the measured value to A/D conversion as required, and supplies the measured value to the foreign matter detecting section 240. The current measuring circuit 274 measures the alternating current $I_3$ produced in the measuring coil 230 by the application of the alternating voltage $V_3$. The current measuring circuit 274 subjects the measured value to A/D conversion as required, and supplies the measured value to the foreign matter detecting section 240.

[Example of Configuration of Foreign Matter Detecting Section]

Figure 21:
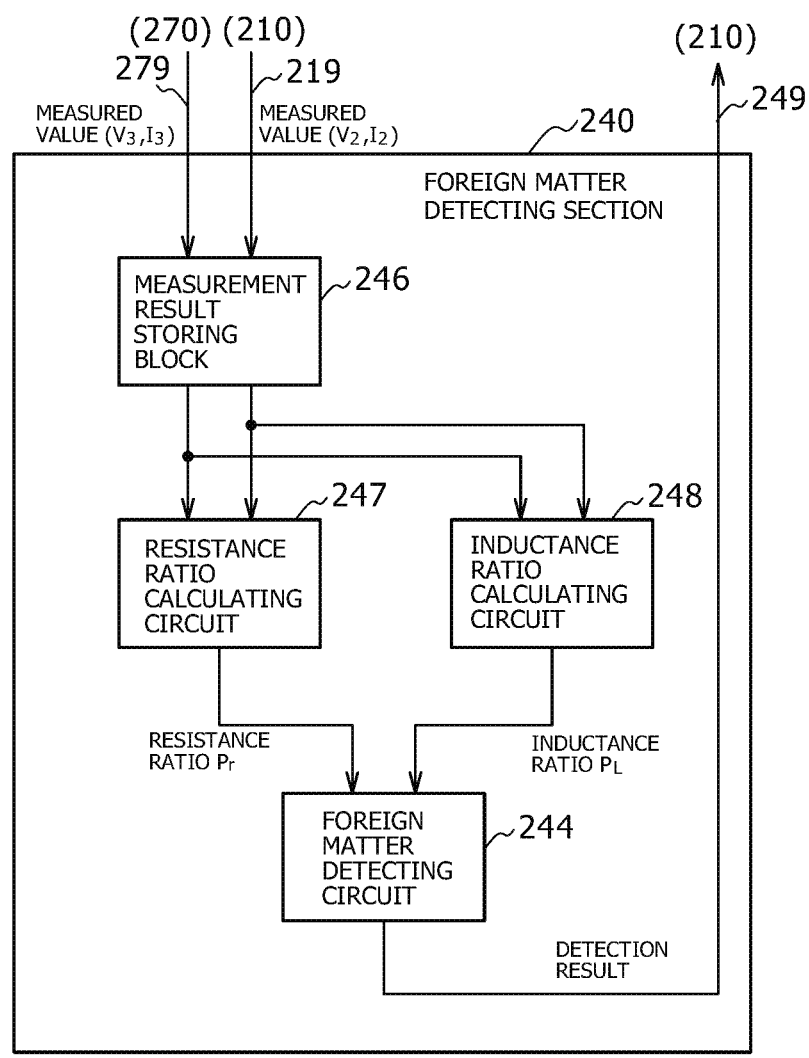
FIG. 21 is a block diagram showing an example of configuration of a foreign matter detecting section in the second embodiment.

FIG. 21 is a block diagram showing an example of configuration of the foreign matter detecting section 240 in the second embodiment. The foreign matter detecting section 240 in the second embodiment does not include the induced voltage obtaining circuit 241, the secondary resistance change amount obtaining circuit 242, and the secondary inductance change amount obtaining circuit 243. The foreign matter detecting section 240 in the second embodiment includes a measurement result storing block 246, a resistance ratio calculating circuit 247, and an inductance ratio calculating circuit 248 in place of the induced voltage obtaining circuit 241, the secondary resistance change amount obtaining circuit 242, and the secondary inductance change amount obtaining circuit 243.

The measurement result storing block 246 retains the measured values of the alternating voltage $V_2$, the current $I_2$, the alternating voltage $V_3$, and the current $I_3$.

The resistance ratio calculating circuit 247 obtains a resistance ratio between the measuring coil 230 and the power receiving coil 220 as a resistance ratio $P_r$ from the retained measured values of the alternating voltage $V_2$, the current $I_2$, the alternating voltage $V_3$, and the current $I_3$. The resistance ratio calculating circuit 247 calculates the resistance ratio $P_r$ using the following Equations 15 to 17, for example, and supplies the resistance ratio $P_r$ to the foreign matter detecting circuit 244. A method for deriving Equation 16 and Equation 17 will be described later.

$$P_r = r_2/r_3 \quad \text{[Equation 15]}$$

$$r_2 = \text{Re}(\dot{V}_2/\dot{I}_2) - R_2 \quad \text{[Equation 16]}$$

$$r_2 = \text{Re}(\dot{V}_3/\dot{I}_3) \quad \text{[Equation 17]}$$

The inductance ratio calculating circuit 248 obtains an inductance ratio between the measuring coil 230 and the power receiving coil 220 as an inductance ratio from the retained measured values of the alternating voltage $V_2$, the current $I_2$, the alternating voltage $V_3$, and the current $I_3$. The inductance ratio calculating circuit 248 calculates the inductance ratio $P_L$ using the following Equations 18 to 20, for example, and supplies the inductance ratio $P_L$ to the foreign matter detecting circuit 244.

$$P_L = L_2/L_3 \quad \text{[Equation 18]}$$

$$L_2 = 1/\omega\{\text{Im}(\dot{V}_2/\dot{I}_2) + 1/\omega C_2\} \quad \text{[Equation 19]}$$

$$L_3 = 1/\omega\{\text{Im}(\dot{V}_3/\dot{I}_3)\} \quad \text{[Equation 20]}$$

A method for deriving Equation 16, Equation 17, Equation 19, and Equation 20 will be described in the following. An impedance $Z_2$ in the equivalent circuit composed of the power receiving coil 220 and the charging control section 210 illustrated in FIG. 15 is obtained from the following Equation 21.

$$\dot{Z}_2 = j\omega L_2 + r_2 + R_2 + 1/(j\omega C_2) \quad \text{[Equation 21]}$$

When the alternating voltage $V_2$ is applied to the power receiving coil 220, the following Equation 22 is obtained from Equation 21 and the current $I_2$.

$$\dot{V}_2 = \dot{Z}_2 \cdot \dot{I}_2 \quad \text{[Equation 22]}$$
$$= \{j\omega L_2 + r_2 + R_2 + 1/(j\omega C_2)\}\dot{I}_2$$

Equation 16 is derived by obtaining the real parts of both sides of Equation 22. In addition, Equation 19 is derived by obtaining the imaginary parts of both sides of Equation 22.

Similarly, an impedance $Z_3$ in the equivalent circuit composed of the measuring coil 230 and the measuring coil side voltage and current measuring section 270 illustrated in FIG. 15 is obtained from the following Equation 23.

$$\dot{Z}_3 = j\omega L_3 + r_3 \quad \text{[Equation 23]}$$

When the alternating voltage $V_3$ is applied to the measuring coil 230, the following Equation 24 is obtained from Equation 23 and the current $I_3$.

$$\dot{V}_3 = \dot{Z}_3 \cdot \dot{I}_3 \quad \text{[Equation 24]}$$
$$= \{j\omega L_3 + r_3\}\dot{I}_3$$

Equation 17 is derived by obtaining the real parts of both sides of Equation 24. In addition, Equation 20 is derived by obtaining the imaginary parts of both sides of Equation 24.

The foreign matter detecting circuit 244 in the second embodiment detects whether foreign matter is present or not from the resistance ratio $P_r$ and the inductance ratio $P_L$. For example, the foreign matter detecting circuit 244 compares the resistance ratio $P_r$ and the inductance ratio $P_L$ with threshold values Th3 and Th4. The threshold value Th3 is a threshold value to be compared with the resistance ratio $P_r$. The threshold value Th4 is a threshold value to be compared with the inductance ratio $P_L$. Then, the foreign matter detecting circuit 244 determines that foreign matter is present when the resistance ratio $P_r$ is larger than the threshold value Th3 or the inductance ratio $P_L$ is larger than the threshold value Th4, for example. The foreign matter detecting circuit 244 outputs a result of the foreign matter detection to the charging control section 210.

Incidentally, the foreign matter detecting section 240 may determine that foreign matter is present when the resistance ratio $P_r$ is larger than the threshold value Th3 and the inductance ratio $P_L$ is larger than the threshold value Th4. In addition, the foreign matter detecting section 240 may determine that foreign matter is present when the resistance ratio $P_r$ is larger than the threshold value Th3 without obtaining the inductance ratio $P_L$. Alternatively, the foreign matter detecting section 240 may determine that foreign matter is present when the inductance ratio $P_L$ is larger than the threshold value Th4 without obtaining the resistance ratio $P_r$. Alternatively, the foreign matter detecting section 240 may determine that foreign matter is present when an addition value obtained by adding together the resistance ratio $P_r$ and the inductance ratio $P_L$ is larger than a threshold value.

In addition, in place of the ratio of the impedance of the power receiving coil 220 to the impedance (reference value) of the measuring coil 230, the foreign matter detecting section 240 may calculate a difference of the impedance of the power receiving coil 220 from the reference value. In this case, whether foreign matter is present or not is determined on the basis of whether the difference is larger than a threshold value.

[Example of Operation of Power Feeding Device]

Figure 22:
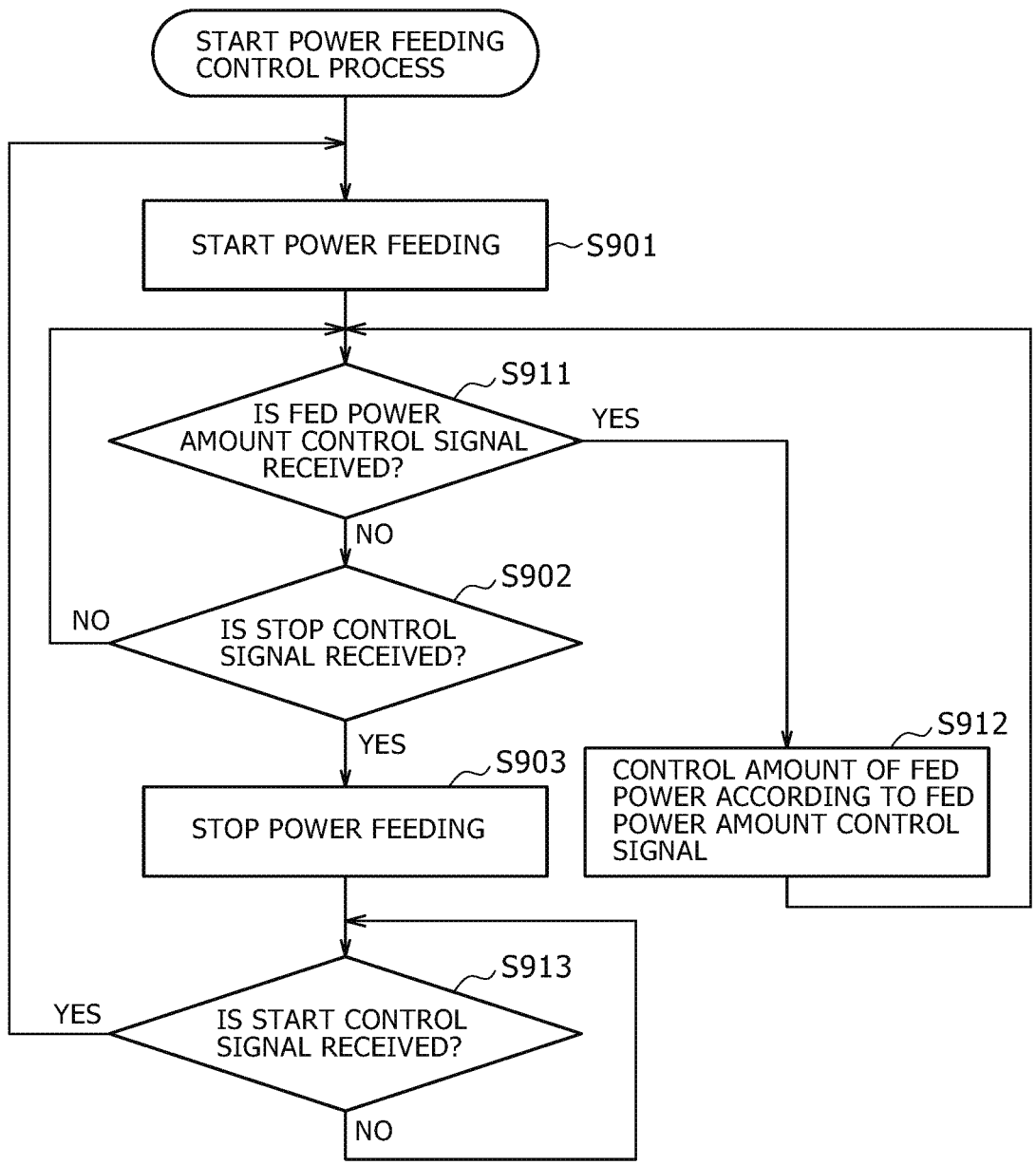
FIG. 22 is a flowchart of an example of operation of a power feeding control section in the second embodiment.

FIG. 22 is a flowchart of an example of a power feeding control process in the second embodiment. The power feeding control process in the second embodiment is different from that of the first embodiment in that the power feeding control process in the second embodiment further performs steps S911 to S913.

The power feeding device 100 starts feeding alternating-current power (step S901). The power feeding device 100 then determines whether a control signal for controlling the amount of the fed power is received (step S911). When the fed power amount control signal for controlling the amount of fed power is received (step S911: Yes), the power feeding device 100 controls the amount of fed power according to the fed power amount control signal (step S912), and returns to step S911. When the fed power amount control signal for controlling the amount of fed power is not received (step S911: No), on the other hand, the power feeding device 100 determines whether a stop control signal for stopping the power feeding is received (step S902). When the stop control signal is not received (step S902: No), the power feeding device 100 returns to step S911. When the stop control signal is received (step S902: Yes), the power feeding device 100 stops the power feeding (step S903).

After stopping the power feeding, the power feeding device 100 determines whether a start control signal for starting power feeding is received (step S913). When the start control signal is not received (step S913: No), the power feeding device 100 returns to step S913. When the start control signal is received (step S913: Yes), the power feeding device 100 returns to step S901.

[Example of Operation of Power Receiving Device]

Figure 23:
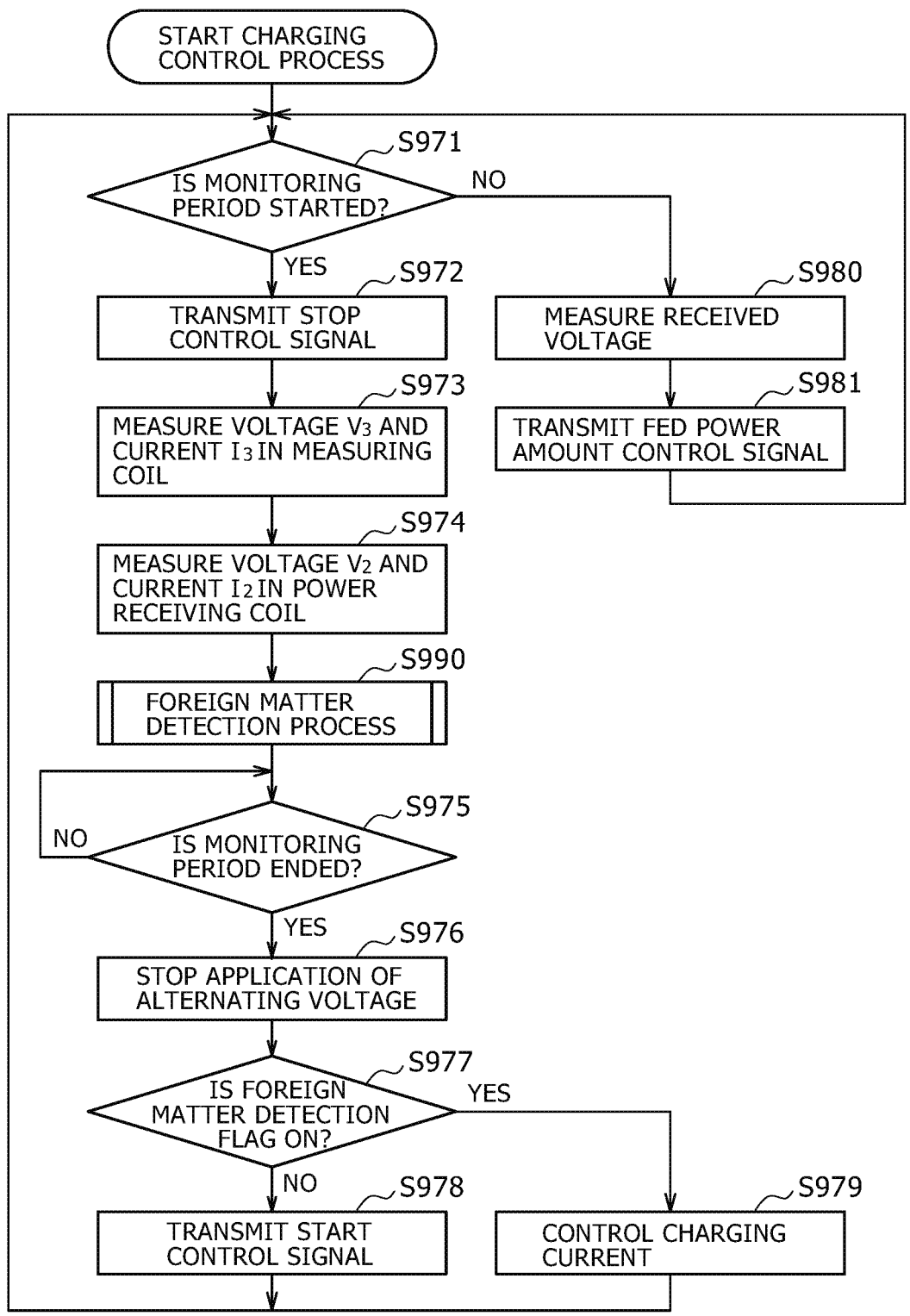
FIG. 23 is a flowchart of an example of operation of the charging control section in the second embodiment.

FIG. 23 is a flowchart of an example of a charging control process in the second embodiment. This charging control process is started by the power receiving device 200 when power supply from the power feeding device 100 is started, for example.

The power receiving device 200 determines whether a monitoring period is started (step S971). When the monitoring period is started (step S971: Yes), the power receiving device 200 transmits a stop control signal to the power feeding device 100 (step S972). Then, after power feeding is stopped, the power receiving device 200 applies the alternating voltage $V_3$ to the measuring coil 230, and measures the alternating voltage $V_3$ and the current $I_3$ (step S973). Next, the power receiving device 200 stops the application of the alternating voltage $V_3$ to the measuring coil 230, applies the alternating voltage $V_2$ to the power receiving coil 220, and measures the alternating voltage $V_2$ and the current $I_2$ (step S974). The power receiving device 200 performs a foreign matter detection process for detecting foreign matter (step S990).

The power receiving device 200 determines whether the monitoring period is ended (step S975). When the monitoring period is not ended (step S975: No), the power receiving device 200 returns to step S975. When the monitoring period is ended (step S975: Yes), on the other hand, the power receiving device 200 stops the application of the alternating voltage $V_2$ to the power receiving coil 220 (step S976). The power receiving device 200 determines whether a foreign matter detection flag is on (step S977). The foreign matter detection flag is a variable indicating a result of foreign matter detection. For example, the foreign matter detection flag is on when foreign matter is detected, and the foreign matter detection flag is off when no foreign matter is detected. When the foreign matter detection flag is off (step S977: No), the power receiving device 200 transmits a start control signal to the power feeding device 100 (step S978). When the foreign matter detection flag is on (step S977: Yes), the power receiving device 200 controls the charging current. Then, the power receiving device 200 transmits a start control signal as required (step S979). After step S978 or step S979, the power receiving device 200 returns to step S971.

When the monitoring period is not started (step S971: No), the power receiving device 200 measures the received voltage Vm (step S980). The power receiving device 200 then transmits a fed power amount control signal for increasing or decreasing the amount of fed power on the basis of the received voltage Vm to the power feeding device 100 (step S981). After step S981, the power receiving device 200 returns to step S971.

Figure 24:
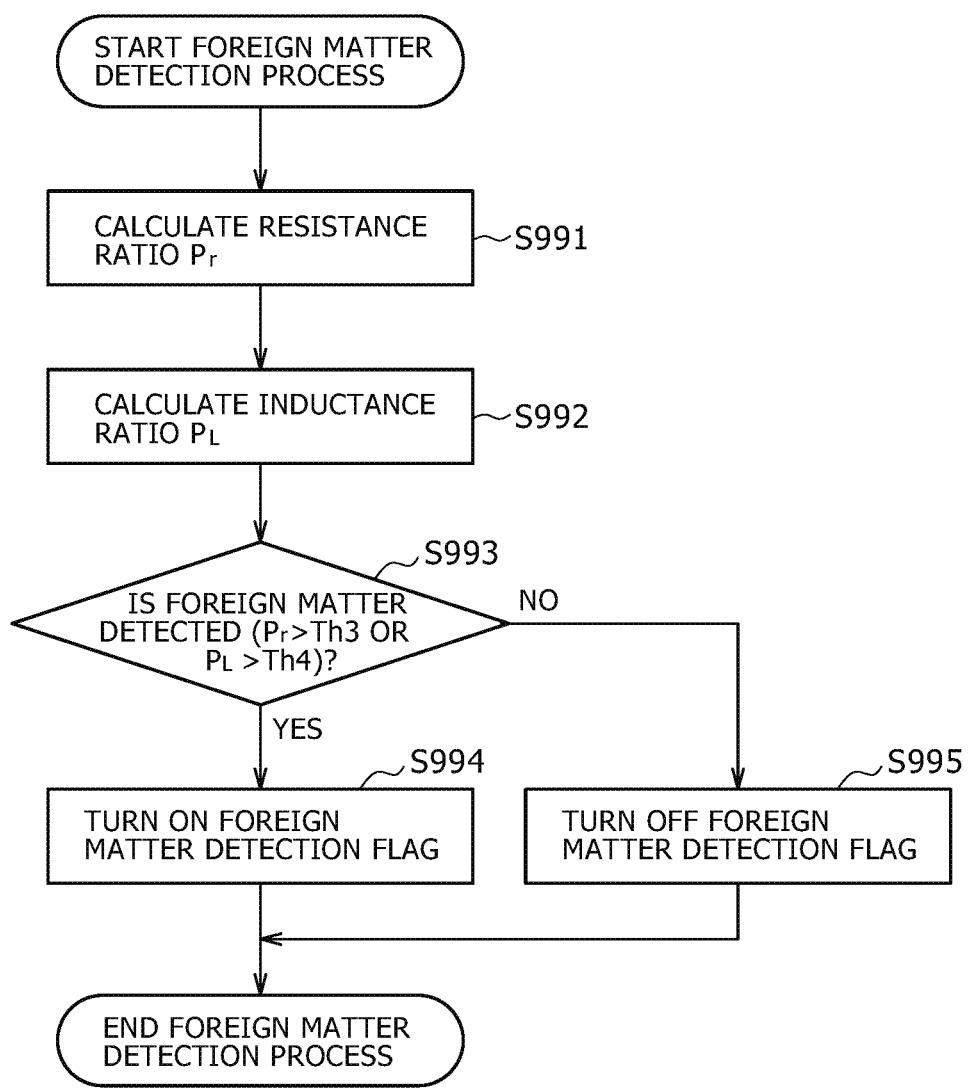
FIG. 24 is a flowchart of an example of a foreign matter detection process in the second embodiment.

FIG. 24 is a flowchart of an example of a foreign matter detection process in the second embodiment. The power receiving device 200 calculates the resistance ratio $P_r$ using Equations 15 to 17 (step S991). In addition, the power receiving device 200 calculates the inductance ratio $P_L$ using Equations 18 to 20 (step S992).

The power receiving device 200 determines whether foreign matter is detected on the basis of a result of comparison of the resistance ratio $P_r$ and the inductance ratio $P_L$ with the threshold values Th3 and Th4 (step S993). When foreign matter is detected (step S993: Yes), the power receiving device 200 turns on the foreign matter detection flag (step S994). When no foreign matter is detected (step S993: No), the power receiving device 200 turns off the foreign matter detection flag (step S995). After step S994 or S995, the power receiving device 200 ends the foreign matter detection process.

Figure 25:
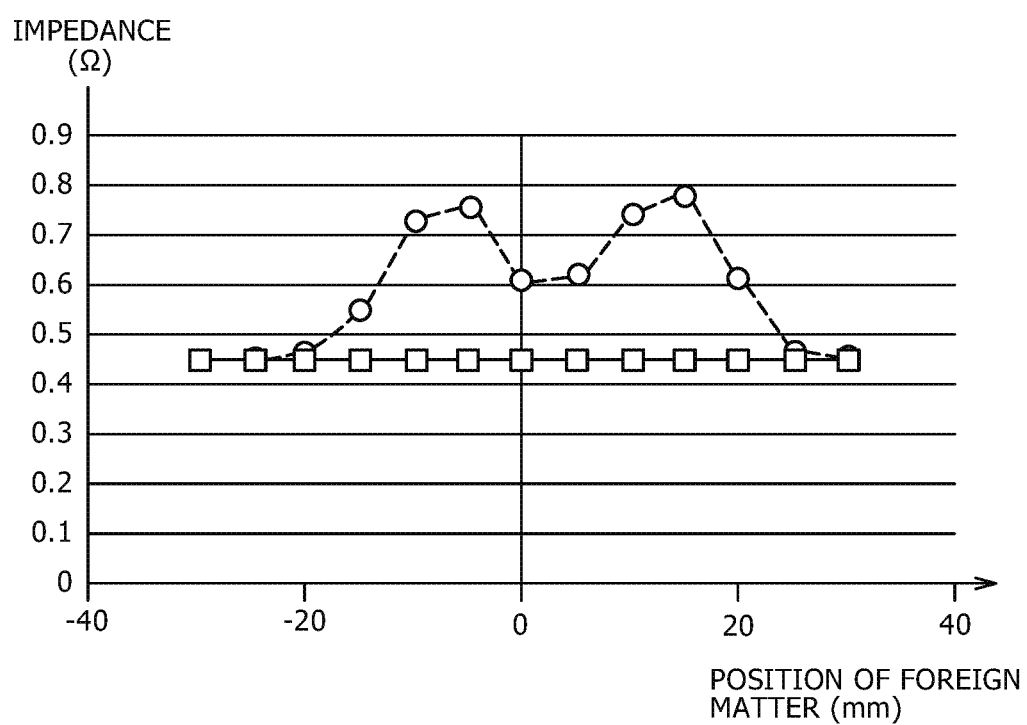
FIG. 25 is a diagram showing an example of increases in impedance of coils in the second embodiment.

FIG. 25 is a diagram showing an example of increases in impedance of the coils in the second embodiment. An axis of ordinates indicates the resistance value of the power receiving coil 220 or the measuring coil 230. An axis of abscissas indicates the position of foreign matter. The unit of the resistance value is an ohm ($\Omega$). The unit of the position is a millimeter (mm). On the axis of abscissas, with the center of the coils as an origin, a position on a predetermined straight line parallel to the coil surfaces of the coils which straight line includes the center of the coils is measured as the position of the foreign matter. Results of measurement of the resistance value of the power receiving coil 220 are plotted as circular marks. Results of measurement of the resistance value of the measuring coil 230 are plotted as square marks.

As illustrated in FIG. 25, the resistance value of the power receiving coil 220 rises when the foreign matter is placed at a position slightly away from the center of the coils, and the resistance value of the power receiving coil 220 decreases when the foreign matter is placed around the center of the coils. On the other hand, the resistance value of the measuring coil 230 is substantially constant irrespective of the position of the foreign matter. This is because the number of turns of the measuring coil 230 is smaller than that of the power receiving coil 220, as described above. An amount of increase in the resistance value of the power receiving coil 220 due to foreign matter is obtained by setting, as a reference value, the resistance value of the measuring coil 230 which resistance value varies less due to the presence of foreign matter.

Thus, according to the second embodiment, the power receiving device 200 can detect foreign matter on the basis of the ratio of the impedance of the power receiving coil 220 to the impedance of the measuring coil 230. By setting the impedance of the measuring coil 230 which impedance increases by a smaller amount due to foreign matter as a reference value, the power receiving device 200 can accurately determine an amount of increase in impedance of the power receiving coil 220 due to foreign matter. Thus, foreign matter is detected correctly.

3. Third Embodiment

[Example of Configuration of Foreign Matter Detecting Section]

Figure 26:
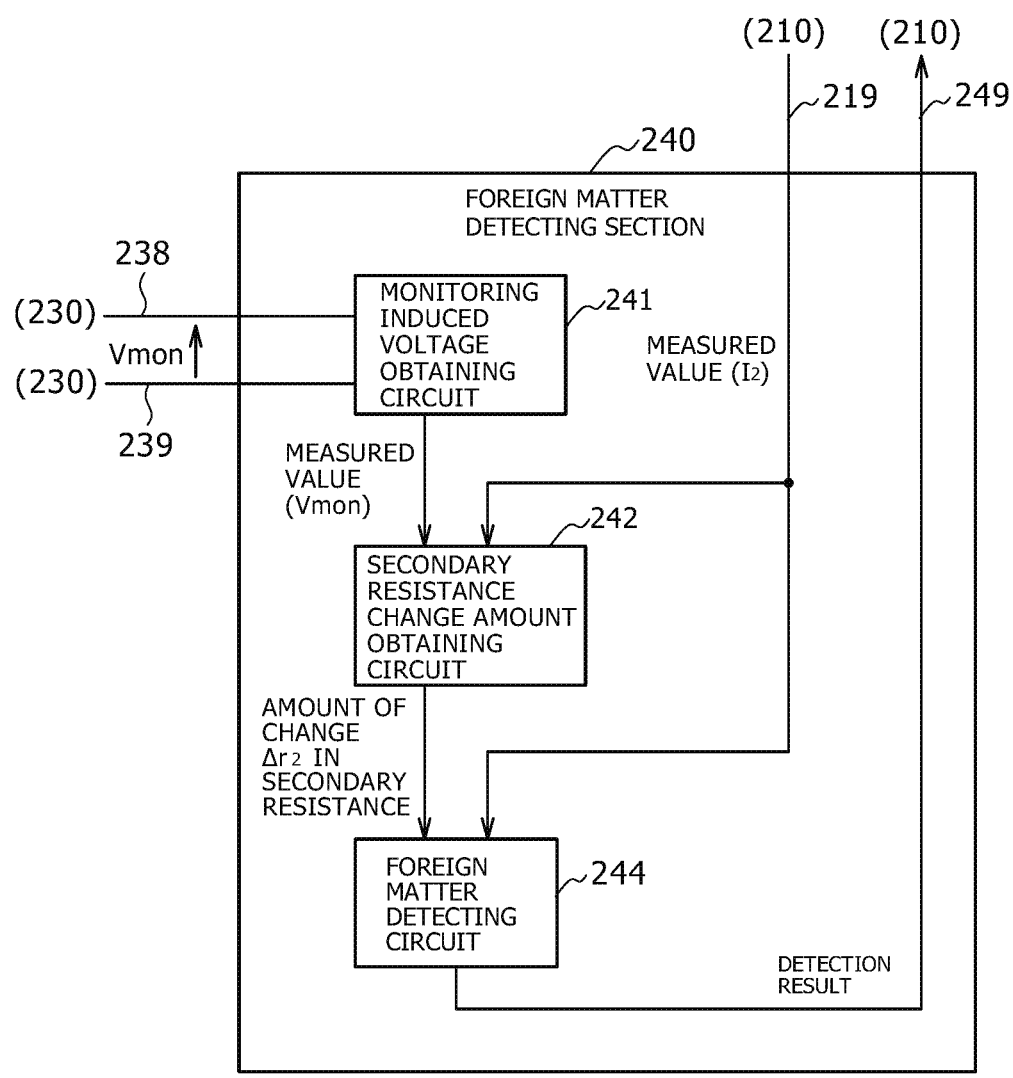
FIG. 26 is a block diagram showing an example of configuration of a foreign matter detecting section in a third embodiment.

FIG. 26 is a block diagram showing an example of configuration of a foreign matter detecting section 240 in a third embodiment. The foreign matter detecting section 240 in the third embodiment is different from that of the first embodiment in that the foreign matter detecting section 240 in the third embodiment does not obtain an amount of change $\Delta L_2$ in secondary inductance, but detects whether foreign matter is present or not from only an amount of change $\Delta r_2$ in secondary resistance. Specifically, the foreign matter detecting section 240 in the third embodiment is different from that of the first embodiment in that the foreign matter detecting section 240 in the third embodiment does not include the secondary inductance change amount obtaining circuit 243.

A foreign matter detecting circuit 244 in the third embodiment detects foreign matter from an amount of change $\Delta r_2$ in secondary resistance and an induced current $I_2$. For example, the foreign matter detecting circuit 244 calculates $\Delta r_2 \times I_2 \times I_2$, and determines that foreign matter is present when the value of $\Delta r_2 \times I_2 \times I_2$ is larger than a threshold value Th1'. This is because an amount of Joule heat generated by an eddy current is proportional to $\Delta r_2 \times I_2 \times I_2$.

[Example of Operation of Power Receiving Device]

Figure 27:
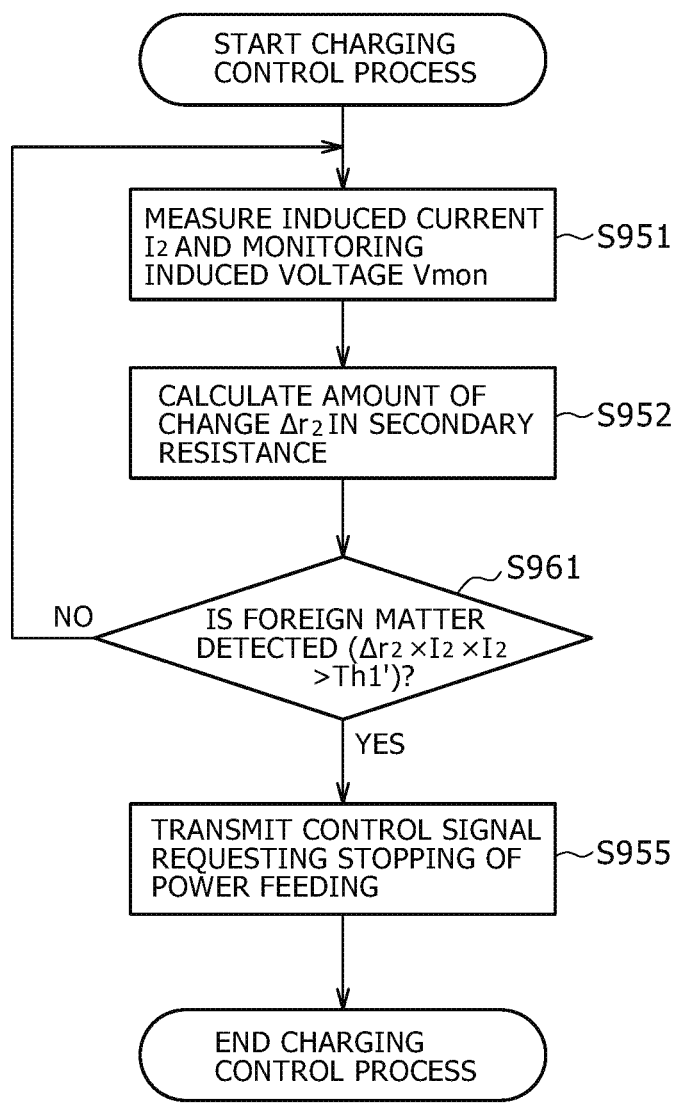
FIG. 27 is a flowchart of an example of a charging control process in the third embodiment.

FIG. 27 is a flowchart of an example of a charging control process in the third embodiment. The charging control process in the third embodiment is different from that of the first embodiment in that the charging control process in the third embodiment performs step S961 in place of steps S953 and S954.

After the power receiving device 200 calculates the amount of change $\Delta r_2$ in the secondary resistance (step S952), the power receiving device 200 determines whether foreign matter is detected on the basis of whether $\Delta r_2 \times I_2 \times I_2$ is larger than the threshold value Th1' (step S961). When no foreign matter is detected (step S961: No), the power receiving device 200 returns to step S951. When foreign matter is detected (step S961: Yes), the power receiving device 200 transmits a control signal requesting the stopping of power feeding to a power feeding device 100 (step S955).

Thus, according to the third embodiment of the present technology, the power receiving device 200 can detect foreign matter that can generate heat, from the amount of change Ore in the secondary resistance and the induced current $I_2$. The noncontact power feeding system can therefore prevent the heat generation of the foreign matter by controlling an amount of fed power when the foreign matter is detected.

4. Fourth Embodiment

[Example of Configuration of Foreign Matter Detecting Section]

Figure 28:
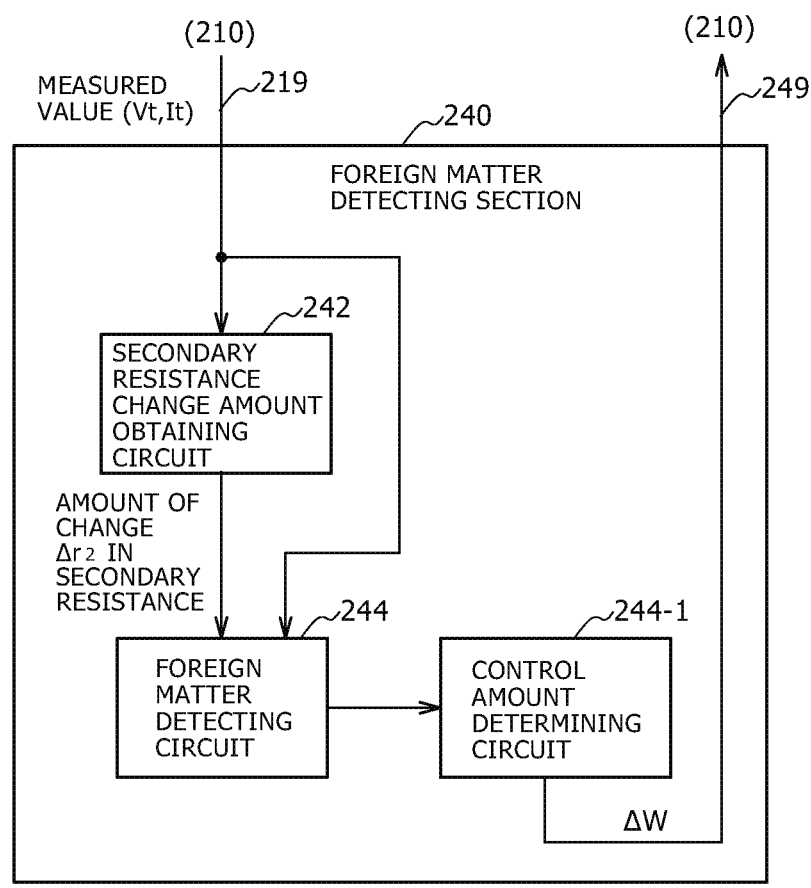
FIG. 28 is a block diagram showing an example of configuration of a foreign matter detecting section in a fourth embodiment.

FIG. 28 is a block diagram showing an example of configuration of a foreign matter detecting section 240 in a fourth embodiment. The foreign matter detecting section 240 in the fourth embodiment is different from that of the second embodiment in that the foreign matter detecting section 240 in the fourth embodiment further includes a control amount determining circuit 244-1. The control amount determining circuit 244-1 calculates an amount of control 1W for an amount of fed power when foreign matter is present. On the other hand, the control amount determining circuit 244-1 sets a value of "0" to the amount of control $\Delta W$ when no foreign matter is present. The control amount determining circuit 244-1 outputs the amount of control $\Delta W$ as a detection result to a charging control section 210. Incidentally, the control amount determining circuit 244-1 is an example of a control amount determining section described in claims.

An amount of rise $\Delta T$ in temperature of foreign matter is generally obtained by the following Equation 25 from the thermal resistance $R_t$ of the foreign matter. The unit of the thermal resistance $R_t$ is for example a degree/watt (° C./W).

$$\Delta T \approx \Delta r_2 \times I_2 \times I_2 / R_t \quad \text{[Equation 25]}$$

In Equation 25, $I_2$ without a dot attached thereto denotes the absolute value of an alternating induced current $I_2$.

Suppose that the value of the induced current of a power receiving coil 220 in a case where there is an amount of rise $\Delta T$ to such a degree as not to cause damage to the device or the like is $I_{2L}$ in Equation 25. Letting n be power feeding efficiency, a supply power $W_{1L}$ necessary to generate the induced current $I_{2L}$ is calculated from the following Equation 26.

$$W_{1L} = \eta \times W_{2L} \quad \text{[Equation 26]}$$
$$= \eta \times (R_2 + r_0) \times I_{2L} \times I_{2L}$$

In Equation 26, $W_{2L}$ is received power when the induced current is $I_{2L}$.

Meanwhile, letting $I_{2H}$ be the induced current of the power receiving coil 220 when foreign matter is detected, a supply power $W_{1H}$ necessary to generate the induced current $I_{2H}$ is calculated from the following Equation 27.

$$W_{1H} = \eta \times W_{2H} \quad \text{[Equation 27]}$$
$$= \eta \times (R_2 + r_2) \times I_{2H} \times I_{2H}$$

In Equation 27, $W_{2H}$ is received power when the induced current is $I_{2H}$.

The amount of control $\Delta W$ is calculated from the following Equation 28 on the basis of Equation 26 and Equation 27. Incidentally, the power feeding efficiency assumed by the power receiving device 200 may be different from an actual value, or the power receiving device 200 may not be able to obtain the power feeding efficiency itself. Accordingly, the power receiving device 200 may transmit a ratio between the received power $W_{2H}$ and the amount of control $\Delta W$ ($\Delta W/W_{2H}$) or a value of $W_{2H} - W_{2L}$ to a power feeding device 100 in place of the amount of control 1W. It suffices for the power feeding device 100 to convert the received value into the amount of control $\Delta W$ on the basis of Equations 26 to 28, and control an amount of fed power.

$$\Delta W = W_{1H} - W_{1L} \quad \text{[Equation 28]}$$

[Example of Operation of Charging Device]

Figure 29:
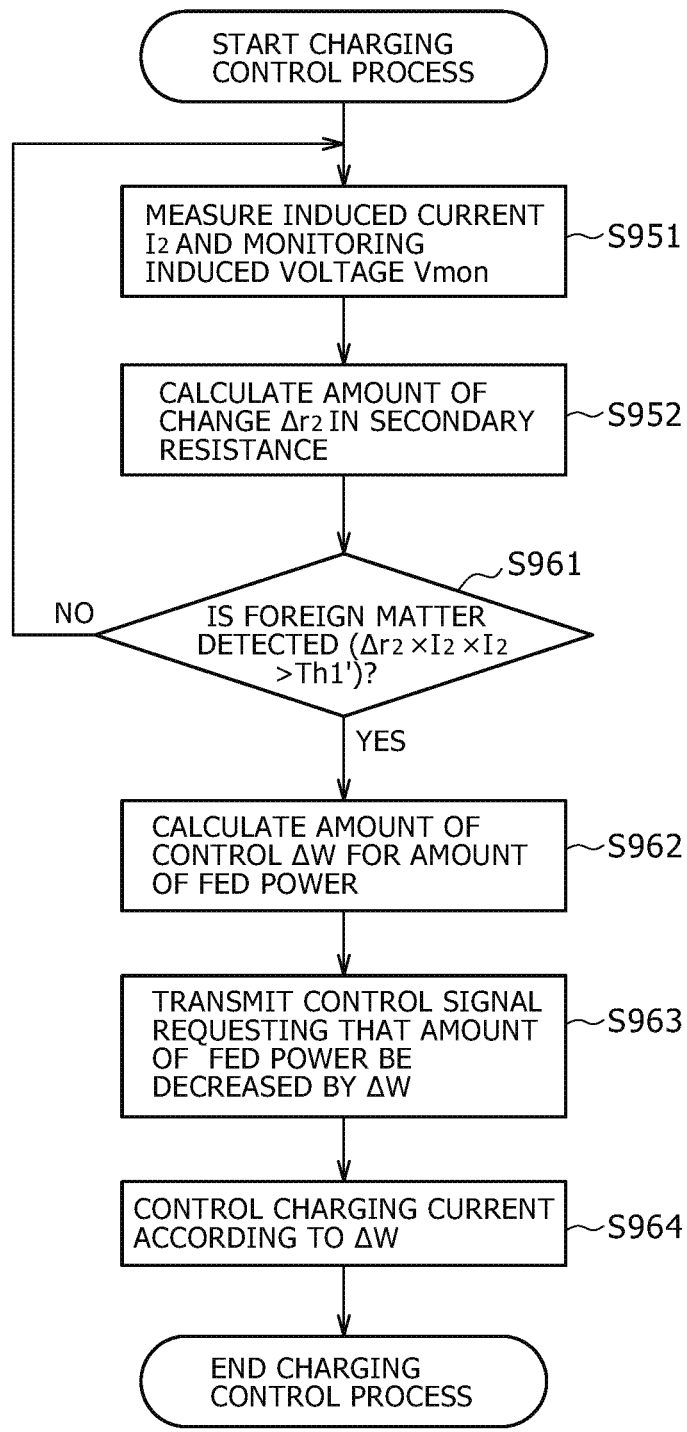
FIG. 29 is a flowchart of an example of a charging control process in the fourth embodiment.

FIG. 29 is a flowchart of an example of a charging control process in the fourth embodiment. The charging control process in the fourth embodiment is different from that of the third embodiment in that the charging control process in the fourth embodiment performs steps S962 to S964 in place of step S955. When foreign matter is detected (step S961: Yes), the power receiving device 200 calculates an amount of control $\Delta W$ for an amount of fed power from Equation 28 (step S962). The power receiving device 200 transmits a control signal requesting that the amount of fed power be reduced by the amount of control $\Delta W$ (step S963). The power receiving device 200 controls a charging current according to the amount of control $\Delta W$ (step S964). Incidentally, when the power receiving device 200 can deal with the foreign matter by controlling the charging current at the time of detection of the foreign matter, the power receiving device 200 does not need to transmit the control signal to the power feeding device 100.

Figure 30:
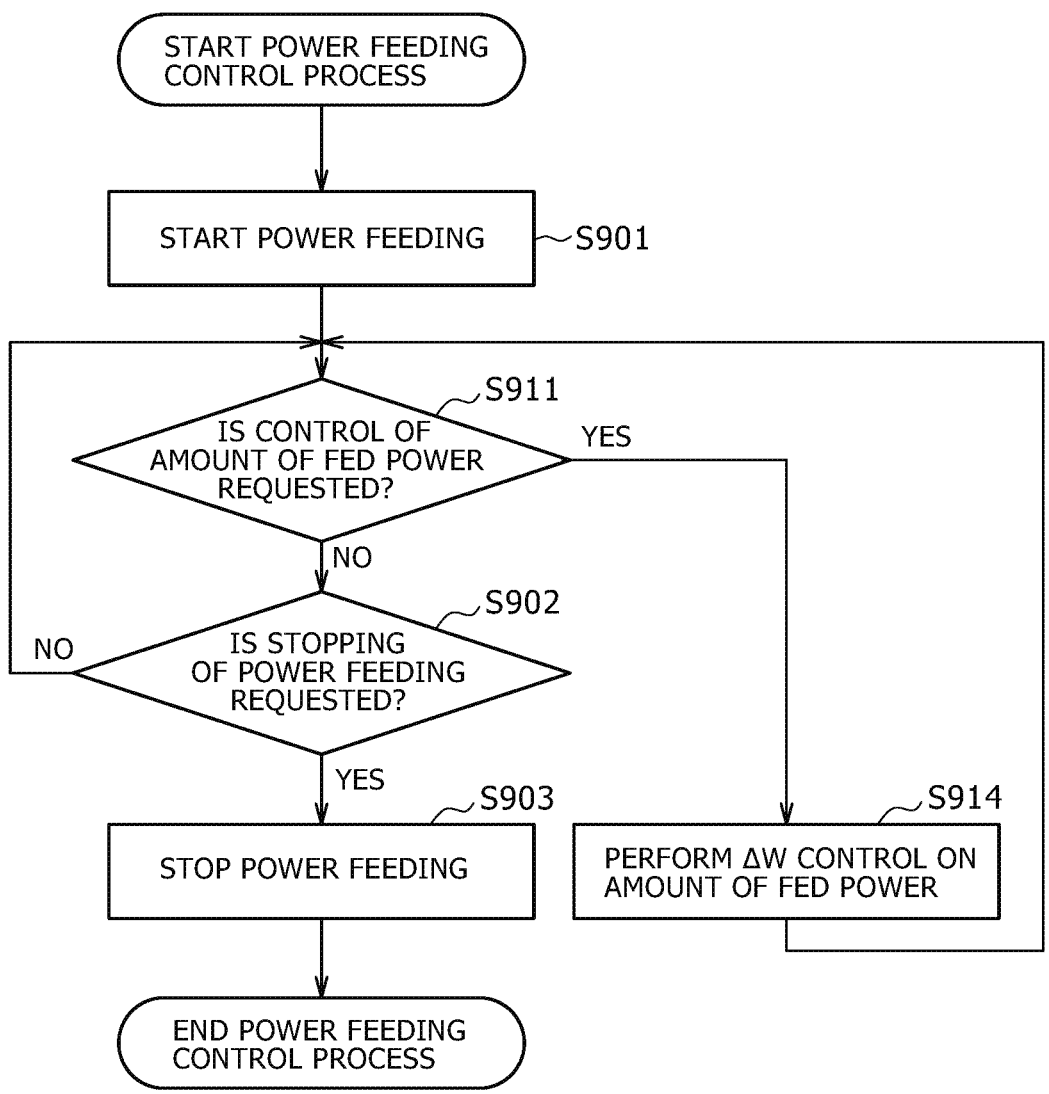
FIG. 30 is a flowchart of an example of a power feeding control process in the fourth embodiment.

FIG. 30 is a flowchart of an example of a power feeding control process in the fourth embodiment. The power feeding control process in the fourth embodiment is different from that of the first embodiment in that the power feeding control process in the fourth embodiment further performs step S911 and step S914.

After starting power feeding (step S901), the power feeding device 100 determines whether control of the amount of fed power is requested on the basis of a control signal (step S911). When the control is requested (step S911: Yes), the power feeding device 100 performs $\Delta W$ control of the amount of fed power according to the control signal (step S914). The power feeding device 100 then returns to step S911.

When the control is not requested (step S911: No), the power feeding device 100 performs the process from step S902 on down.

Thus, according to the fourth embodiment of the present technology, the power receiving device 200 can detect foreign matter, and obtain an amount of control for an amount of power. The noncontact power feeding system can therefore continue power feeding with an appropriate amount of power even when foreign matter is detected.

5. Fifth Embodiment

[Example of Configuration of Noncontact Power Feeding System]

Figure 31:
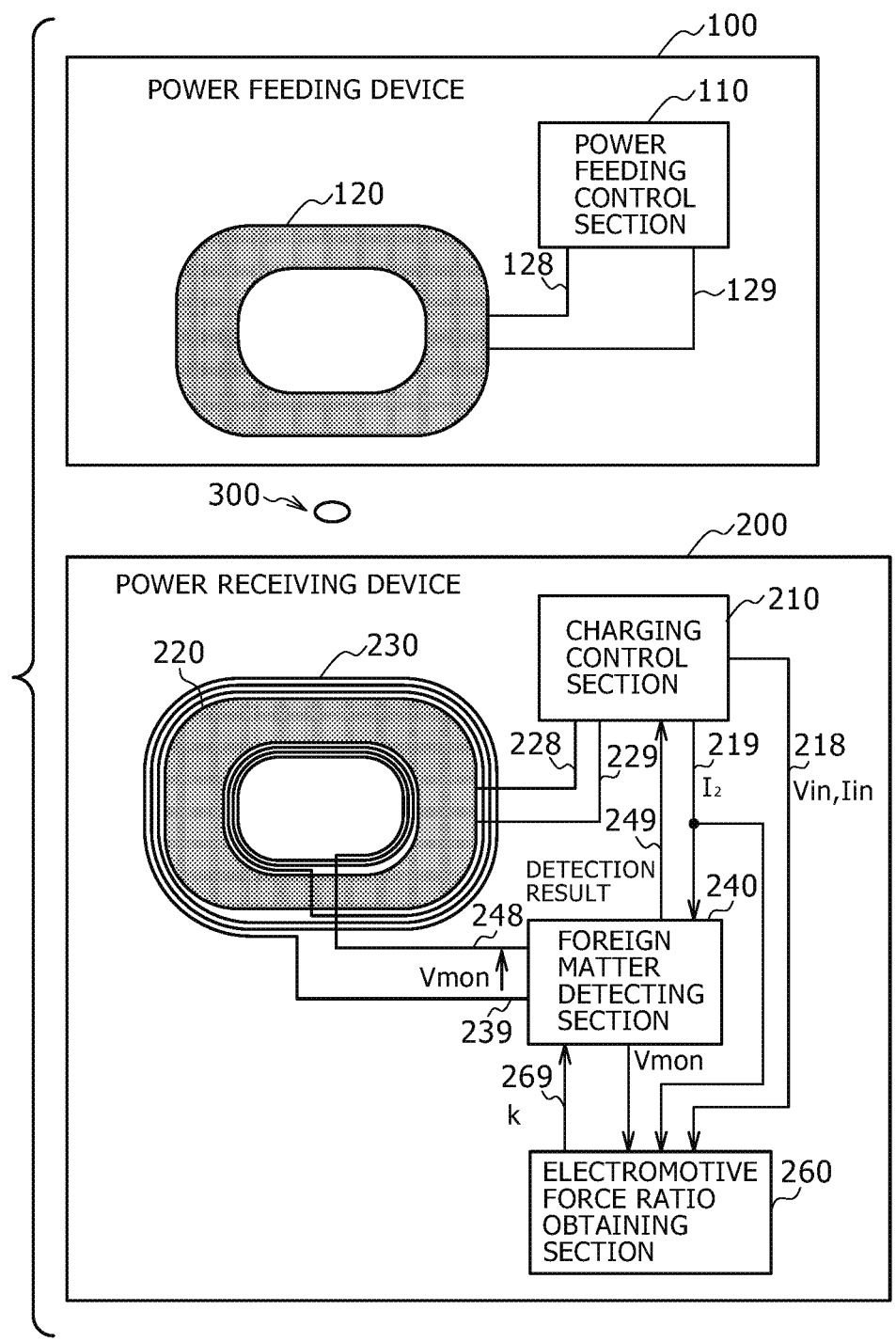
FIG. 31 is a general view of an example of configuration of a noncontact power feeding system in a fifth embodiment.

FIG. 31 is a general view of an example of configuration of a noncontact power feeding system in a fifth embodiment. In the first embodiment, impedance is calculated on an assumption that the ratio between the induced voltage $V_{21}$ of the power receiving coil 220 and the induced voltage $V_{31}$ of the measuring coil 230 (which ratio will hereinafter be referred to as an "electromotive force ratio") coincides with the turns ratio between these coils. However, in actuality, the electromotive force ratio k ($=V_{21}/V_{31}$) may not coincide with the turns ratio due to variations in characteristics of the coils at a time of manufacturing, positional displacements, and the like. The fifth embodiment is different from the first embodiment in that a power receiving device 200 obtains an accurate value of the electromotive force ratio k in advance before foreign matter detection. Specifically, the noncontact power feeding system in the fifth embodiment is different from that of the first embodiment in that the noncontact power feeding system in the fifth embodiment further includes an electromotive force ratio obtaining section 260.

In addition, a charging control section 210 in the fifth embodiment outputs an input voltage Vin, an input current Iin, and a secondary current $I_2$ to the electromotive force ratio obtaining section 260 via signal lines 218 and 219. The input voltage Vin is the voltage of the input terminal of a charging control circuit 213. The input current Iin is a current flowing through the charging control circuit 213. In addition, a foreign matter detecting section 240 in the fifth embodiment outputs a monitoring induced voltage Vmon to the electromotive force ratio obtaining section 260.

The electromotive force ratio obtaining section 260 calculates a load resistance $R_2$ from the input voltage Vin and the input current Iin. The electromotive force ratio obtaining section 260 obtains at least two sets each of which includes the monitoring induced voltage Vmon, the secondary current $I_2$, and the load resistance $R_2$. The electromotive force ratio obtaining section 260 generates simultaneous linear equations by substituting the values of the respective sets into the following Equation 29, for example, and solves the simultaneous linear equations. The electromotive force ratio obtaining section 260 thereby calculates the value of the electromotive force ratio k. Incidentally, the electromotive force ratio obtaining section 260 may calculate an optimum value of the electromotive force ratio k using a method of least squares. In addition, the electromotive force ratio k is calculated at an arbitrary time such as a time of factory shipment, a time of repair, or the like before power feeding is started.

$$r_2 = \text{Re}\{k \times (\dot{V}_{mon}/\dot{I}_2)\} - R_2 \quad \text{[Equation 29]}$$

Equation 29 is obtained by replacing "$N_2/N_3$" in Equation 2 with the electromotive force ratio k. Equation 2 assumes that the electromotive force ratio k coincides with "$N_2/N_3$." However, as described above, the electromotive force ratio k may not coincide with "$N_2/N_3$." It is therefore desirable to calculate an accurate value of the electromotive force ratio k by substituting the monitoring induced voltage Vmon, the secondary current $I_2$, and the load resistance $R_2$ in each set into Equation 29. The electromotive force ratio obtaining section 260 outputs the calculated electromotive force ratio k to the foreign matter detecting section 240. The foreign matter detecting section 240 calculates an amount of change $\Delta r_2$ in secondary resistance using Equation 29 on the basis of the electromotive force ratio k.

Incidentally, while the electromotive force ratio obtaining section 260 is disposed within the power receiving device 200, the electromotive force ratio obtaining section 260 can be disposed on the outside of the power receiving device 200. In addition, the power receiving device 200 in the fifth embodiment can be configured without the foreign matter detecting section 240 when obtaining the electromotive force ratio.

[Example of Configuration of Charging Control Section]

Figure 32:
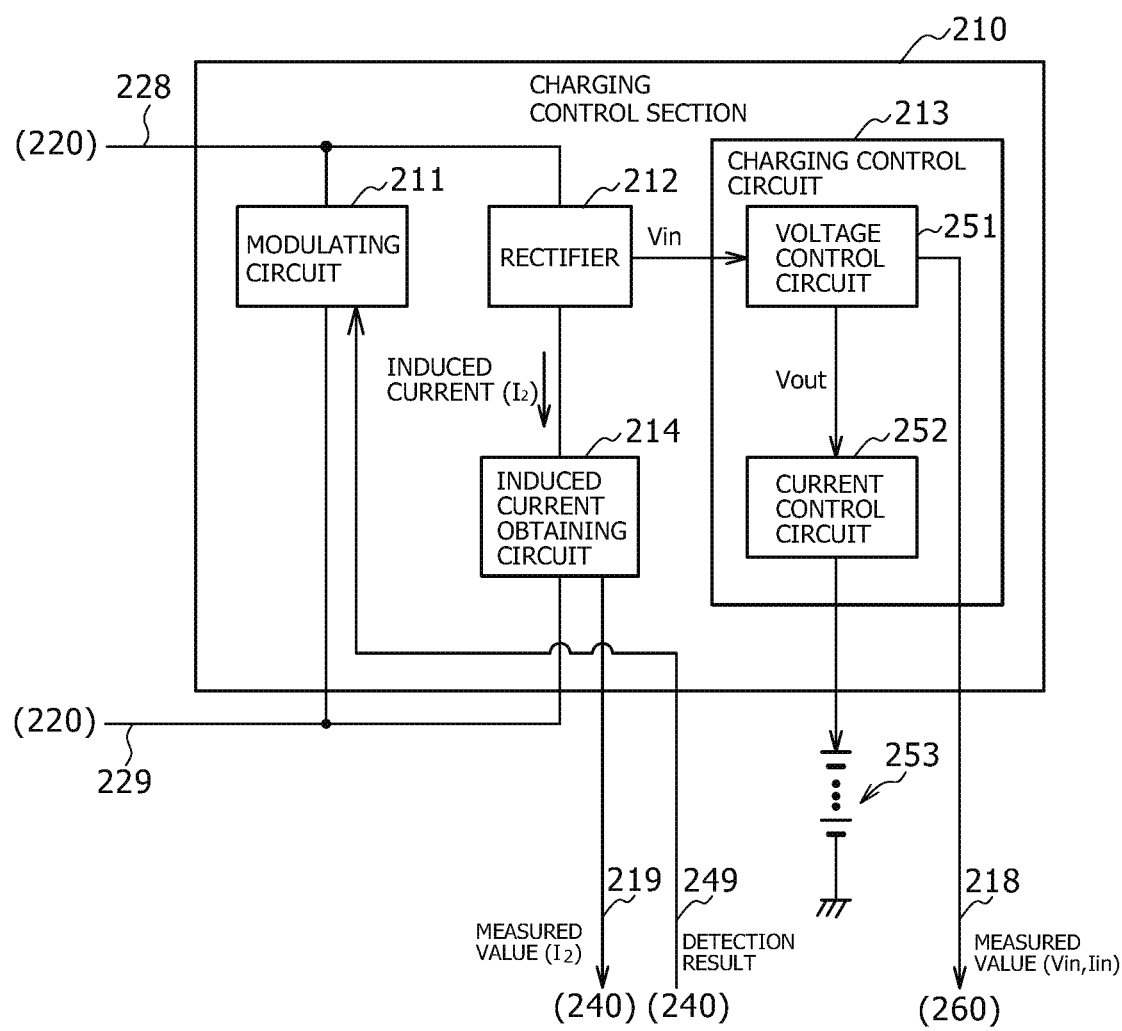
FIG. 32 is a block diagram showing an example of configuration of a charging control section in the fifth embodiment.

FIG. 32 is a block diagram showing an example of configuration of the charging control section 210 in the fifth embodiment. The charging control circuit 213 in the fifth embodiment includes a voltage control circuit 251 and a current control circuit 252. In addition, the charging control circuit 213 is connected with a secondary battery 253.

The voltage control circuit 251 for example controls a direct-current voltage using a series regulator for controlling an output voltage to a certain value. In addition, the voltage control circuit 251 for example measures the voltage and current of the input terminal of the series regulator as the input voltage Vin and the input current Iin, and outputs the measured values of the input voltage Vin and the input current Iin to the electromotive force ratio obtaining section 260. The current control circuit 252 charges the secondary battery 253 by supplying power to the secondary battery 253, and controls a charging current. The charging current is controlled according to the characteristics of the secondary battery 253, a charging time, and the like.

Incidentally, in order to measure a plurality of input voltages Vin and input currents Iin of different values, a modulating circuit 211 may output a control signal requesting a change in amount of supply power to the power feeding device 100 at a time of measurement of the electromotive force ratio. The plurality of input voltages Vin and input currents Iin are thereby measured efficiently.

[Example of Configuration of Electromotive Force Ratio Obtaining Section]

Figure 33:
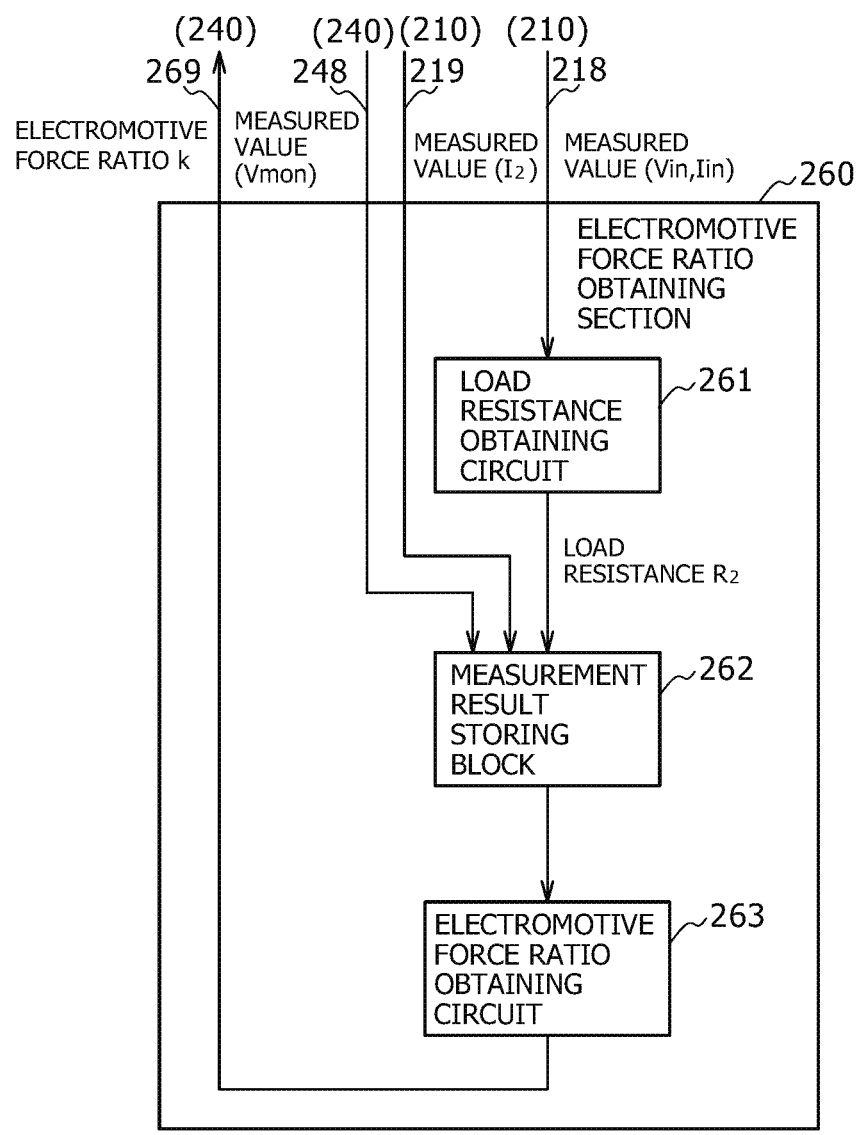
FIG. 33 is a block diagram showing an example of configuration of an electromotive force ratio obtaining section in the fifth embodiment.

FIG. 33 is a block diagram showing an example of configuration of the electromotive force ratio obtaining section 260 in the fifth embodiment. The electromotive force ratio obtaining section 260 includes a load resistance obtaining circuit 261, a measurement result storing block 262, and an electromotive force ratio obtaining circuit 263.

The load resistance obtaining circuit 261 obtains the load resistance $R_2$. The load resistance obtaining circuit 261 receives the input voltage Vin and the input current Iin from the charging control section 210. The load resistance obtaining circuit 261 then calculates the resistance of the series regulator from the output voltage Vout of the series regulator which output voltage Vout is obtained in advance, the input voltage Vin, and the input current Iin. The load resistance obtaining circuit 261 calculates the load resistance $R_2$ of a load as a whole by adding together the resistance of the series regulator and the resistance of the load other than the series regulator, which resistance is obtained in advance. The load resistance obtaining circuit 261 stores the calculated load resistance $R_2$ in the measurement result storing block 262.

The measurement result storing block 262 in the fifth embodiment stores a plurality of sets each of which includes the monitoring induced voltage Vmon, the secondary current $I_2$, and the load resistance $R_2$. The electromotive force ratio obtaining circuit 263 obtains the electromotive force ratio k from the sets of the measured values and Equation 29. The electromotive force ratio obtaining circuit 263 outputs the calculated electromotive force ratio k to a secondary resistance change amount obtaining circuit 242 in the foreign matter detecting section 240. Incidentally, the measurement result storing block 262 is an example of a storing section described in claims.

Incidentally, while the electromotive force ratio obtaining section 260 is configured to obtain a plurality of load resistances $R_2$ from a plurality of input voltages Vin and input currents Iin, the electromotive force ratio obtaining section 260 is not limited to this configuration as long as the electromotive force ratio obtaining section 260 can obtain a plurality of load resistances $R_2$. For example, the power receiving device 200 may further include a connection control section for performing control to additionally connect the load to the charging control section 210. In this configuration, when an instruction to start measuring the electromotive force ratio is given by an operation of an operator or the like, the connection control section connects the load in series with or in parallel with the charging control section 210, and outputs a signal providing a notification that the load is connected to the electromotive force ratio obtaining section 260. The load resistance $R_2$ before and after the connection and the monitoring induced voltage Vmon and the secondary current $I_2$ before the connection are stored in the measurement result storing block 262 in advance. The electromotive force ratio obtaining section 260 obtains the monitoring induced voltage Vmon and the secondary current $I_2$ after the connection after receiving the notification that the load is connected, and calculates the electromotive force ratio k from the monitoring induced voltage Vmon, the secondary current $I_2$, and the load resistance $R_2$ before and after the connection.

Figure 34:
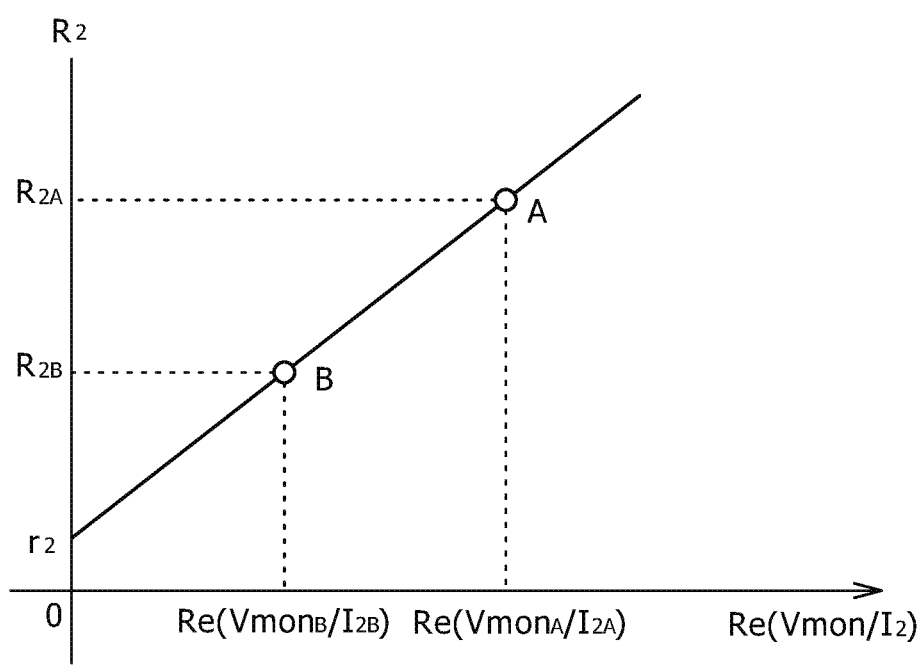
FIG. 34 is a graph showing an example of relation between a monitoring induced voltage, an induced current, and a secondary resistance in the fifth embodiment.

FIG. 34 is a graph showing an example of relation between the monitoring induced voltage Vmon, the induced current $I_2$, and the load resistance $R_2$ in the fifth embodiment. In FIG. 34, an axis of ordinates indicates "$R_2$," and an axis of abscissas indicates "Re(Vmon/$I_2$)." Point A is a measurement point plotted on the basis of a load resistance $R_{2A}$, a monitoring induced voltage $Vmon_A$, and an induced current $I_{2A}$ measured at a received power WA. Point B is a measurement point plotted on the basis of a load resistance $R_{2B}$, a monitoring induced voltage $Vmon_B$, and an induced current $I_{2B}$ measured at a received power WB. The slope of a straight line connecting point A and point B corresponds to the electromotive force ratio k in Equation 29. In addition, the intercept of the straight line corresponds to the secondary resistance $r_2$. Incidentally, because measurement errors may occur, the electromotive force ratio k may be obtained by using a method of least squares for obtaining the electromotive force ratio k that minimizes a sum E of squares of a difference $d_x$ between a load resistance $R_{2X}$ obtained from each measurement point and a load resistance $R_{2X}'$ obtained by Equation 29 from a monitoring induced voltage $Vmon_X$ and an induced current $I_{2X}$ at each measurement point.

Thus, according to the fifth embodiment of the present technology, the power receiving device 200 can obtain an accurate value of the electromotive force ratio k from the monitoring induced voltage Vmon, the current $I_2$, and the load resistance $R_2$. Therefore foreign matter is detected more correctly.

6. Sixth Embodiment

[Example of Configuration of Foreign Matter Detecting Section]

Figure 35:
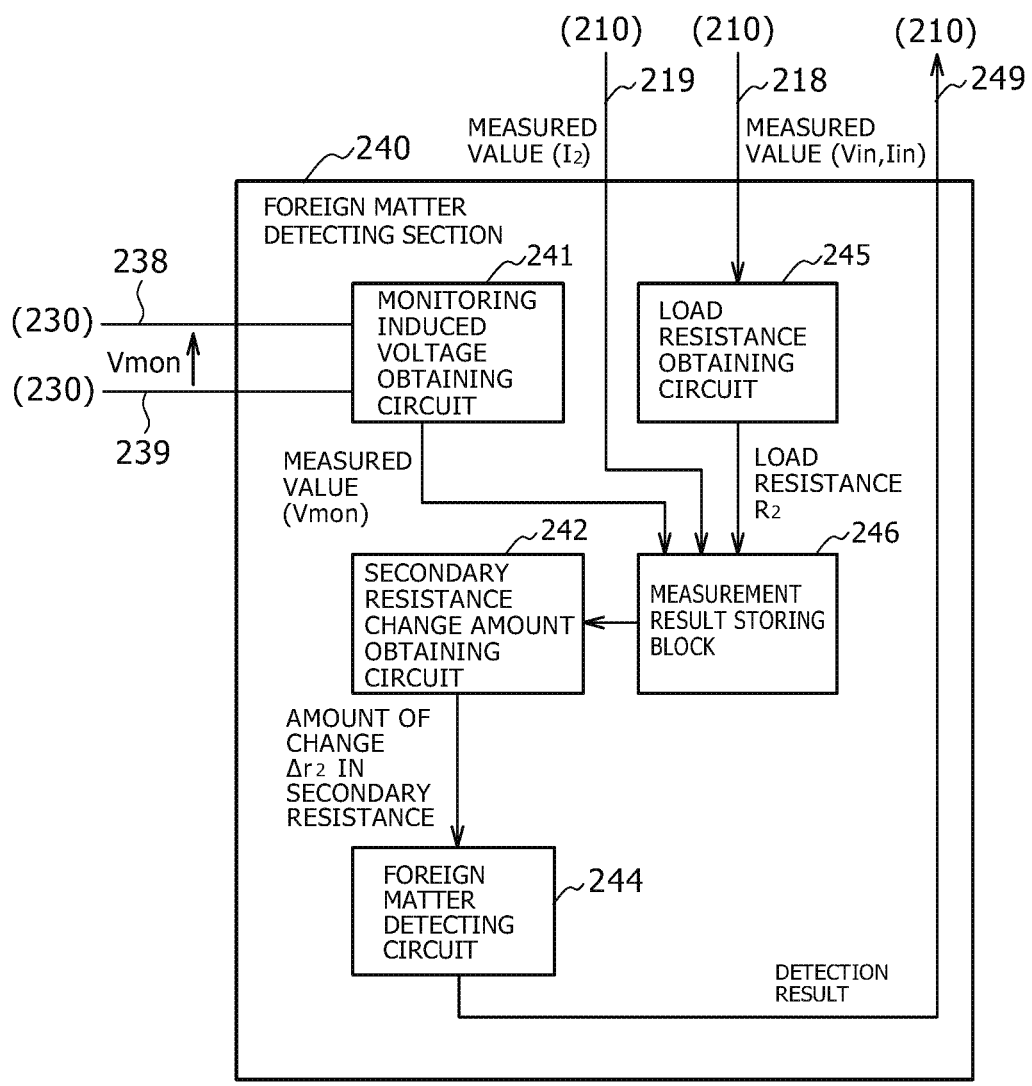
FIG. 35 is a block diagram showing an example of configuration of a foreign matter detecting section in a sixth embodiment.

FIG. 35 is a block diagram showing an example of configuration of a foreign matter detecting section 240 in a sixth embodiment. In the first embodiment, the foreign matter detecting section 240 calculates impedance supposing that the electromotive force ratio k is constant. However, as described in the fifth embodiment, the electromotive force ratio k is not necessarily constant. The foreign matter detecting section 240 in the sixth embodiment is different from that of the first embodiment in that the foreign matter detecting section 240 in the sixth embodiment calculates an amount of change $\Delta r_2$ in secondary resistance without using the electromotive force ratio k. A charging control section 210 in the sixth embodiment has a similar configuration to that of the fifth embodiment. The charging control section 210 in the sixth embodiment measures an input voltage Vin and an input current Iin during charging, and outputs the measured values of the input voltage Vin and the input current Iin to the foreign matter detecting section 240. In addition, the foreign matter detecting section 240 in the sixth embodiment is different from that of the first embodiment in that the foreign matter detecting section 240 in the sixth embodiment includes a load resistance obtaining circuit 245 and a measurement result storing block 246, and does not include the secondary inductance change amount obtaining circuit 243.

Incidentally, in order to measure a plurality of input voltages Vin and input currents Iin of different values, the charging control section 210 in the sixth embodiment may transmit a control signal requesting a change in amount of supply power to a power feeding device 100 during charging. The plurality of input voltages Vin and input currents Iin are thereby measured efficiently.

The configuration of the load resistance obtaining circuit 245 is similar to that of the load resistance obtaining circuit 261 in the fifth embodiment. In addition, the configuration of the measurement result storing block 246 is similar to that of the measurement result storing block 262 in the fifth embodiment. A secondary resistance change amount obtaining circuit 242 in the sixth embodiment obtains the amount of change $r_2$ in the secondary resistance from measurement results. In FIG. 34, as described above, a secondary resistance $r_2$ is obtained by substituting at least two sets of measurement results into Equation 29 even when the electromotive force ratio k is unknown. Specifically, the intercept of the straight line illustrated in FIG. 35 is equal to the secondary resistance $r_2$. The secondary resistance change amount obtaining circuit 242 calculates the amount of change $\Delta r_2$ in the secondary resistance from the obtained secondary resistance $r_2$ using Equation 3, and outputs the amount of change $\Delta r_2$ in the secondary resistance.

Thus, according to the sixth embodiment of the present technology, the power receiving device 200 can obtain an accurate amount of change in impedance from the monitoring induced voltage Vmon, the current $I_2$, and the load resistance $R_2$. Therefore foreign matter is detected more correctly even when the value of the electromotive force ratio k varies.

It is to be noted that the foregoing embodiments represent an example for embodying the present technology, and that items in the embodiments have respective corresponding relations to specific inventive items in claims. Similarly, specific inventive items in claims have respective corresponding relations to items given the same names as the specific inventive items in the embodiments of the present technology. However, the present technology is not limited to the embodiments, and can be embodied by making various modifications to the embodiments without departing from the spirit of the present technology.

Incidentally, the present technology can also adopt the following constitutions.

(1) A power receiving device comprising:
a measuring coil having a measuring coil wire, a number of concentric turns of the measuring coil wire being around a common axis; and
a power receiving coil having a power receiving coil wire, a number of concentric turns of the power receiving coil wire being around said common axis,
wherein said power receiving coil is configured to be inductively coupled to said measuring coil, at least one of the concentric turns of the measuring coil wire being closer to said common axis than each of the concentric turns of the power receiving coil wire.

(2) A power receiving device according to (1), wherein at least one of the concentric turns of the power receiving coil wire is closer to said common axis than a different one of the concentric turns of the measuring coil wire.

(3) A power receiving device according to (2), wherein said different one of the turns of the measuring coil wire is farther from said common axis than said each of the turns of the power receiving coil wire.

(4) A power receiving device according to (1), wherein said number of concentric turns of the measuring coil wire differs from said number of concentric turns of the power receiving coil wire.

(5) A power receiving device according to (1), wherein said number of concentric turns of the measuring coil wire is less than said number of concentric turns of the power receiving coil wire.

(6) A power receiving device according to (1), wherein said measuring coil is in physical contact with said power receiving coil.

(7) A power receiving device according to (1), wherein said measuring coil is coplanar with said power receiving coil.

(8) A power receiving device according to (1), wherein said measuring coil and said power receiving coil are on different planes.

(9) A power receiving device according to (8), wherein said different planes are parallel planes.

(10) A power receiving device according to (1), wherein each of the concentric turns of the measuring coil wire is a loop of the measuring coil wire, said each of the concentric turns of the power receiving coil wire being a loop of the power receiving coil wire.

(11) A power receiving device according to (10), wherein said each of the concentric turns of the measuring coil wire is wound around a center of the measuring coil, said each of the concentric turns of the power receiving coil wire being wound around a center of the power receiving coil.

(12) A power receiving device according to (1), wherein said power receiving coil is ohmically isolated from said measuring coil.

(13) A power feeding system comprising:
the power receiving device of (1); and
a power feeding device configured to receive a control signal from said power receiving device, said control signal instructing said power feeding device to adjust a power level of an electromagnetic wave emission.

(14) A power feeding system according to (13), wherein a power feeding coil in the power feeding device is configured to radiate said electromagnetic wave emission, said power receiving coil being configured to receive said electromagnetic wave emission.

(15) A power feeding system according to (13), wherein said control signal indicates an occurrence of a change in an impedance of the power receiving coil.

(16) A power receiving device according to (15), wherein a variance of current flowing through said measuring coil wire and a variance of current flowing through said power receiving coil wire are used to detect said change in the impedance.

(17) A power feeding system according to (15), wherein said change in the impedance indicates a presence or absence of conductive foreign matter in a pathway between said power feeding device and said power receiving device.

(18) A power feeding system according to (17), wherein said electromagnetic wave emission propagates along said pathway.

(19) A power receiving device comprising:
a power receiving coil configured to receive power fed from a power feeding device via a magnetic field;
a measuring coil having a center substantially coinciding with a center of the power receiving coil, and having a part wound on an inside of an outermost circumference of the power receiving coil, a number of turns of the part wound on the inside of the outermost circumference of the power receiving coil being at least one; and
a foreign matter detecting section configured to determine whether or not foreign matter is present in the magnetic field on a basis of measured values of the measuring coil and the power receiving coil.

(20) The power receiving device according to (19), wherein the measuring coil is a coil through which substantially no current flows.

(21) The power receiving device according to (19), wherein a number of turns of the measuring coil is different from a number of turns of the power receiving coil.

(22) The power receiving device according to (19), further comprising:
a voltage obtaining circuit configured to obtain an induced voltage of the measuring coil, the induced voltage of the measuring coil being generated by the magnetic field, as the measured value of the measuring coil; and
a current obtaining circuit configured to obtain an induced current of the power receiving coil, the induced current of the power receiving coil being generated by the magnetic field, as the measured value of the power receiving coil,
wherein the foreign matter detecting section obtains impedance of the power receiving coil from the induced voltage and the induced current, and determines whether or not the foreign matter is present on a basis of a change in the impedance.

(23) The power receiving device according to (22),
wherein the foreign matter detecting section determines that the foreign matter is present when an amount of change in the impedance is larger than a predetermined threshold value.

(24) The power receiving device according to (22),
wherein the impedance of the power receiving coil includes one of resistance and inductance of the power receiving coil.

(25) The power receiving device according to (22), further comprising:
a load resistance obtaining circuit configured to obtain resistance of a load connected to the power receiving coil as load resistance; and
a storing section configured to store at least two sets each of which includes the induced voltage of the measuring coil, the induced voltage of the measuring coil being generated by the magnetic field, the induced current of the power receiving coil, the induced current of the power receiving coil being generated by the magnetic field, and the load resistance,
wherein the foreign matter detecting section obtains the impedance from the induced voltage, the induced current, and the load resistance.

(26) The power receiving device according to (22), further comprising:
a power supply control section configured to control the power feeding device on a basis of a result of detection of the foreign matter.

(27) The power receiving device according to (26), further comprising:
a control amount determining section configured to determine an amount of control for the power on a basis of an amount of change in the impedance of the power receiving coil when it is determined in detection of the foreign matter that the foreign matter is present,
wherein the power supply control section controls the power feeding device according to the amount of control.

(28) The power receiving device according to (19), further comprising:
a charging control circuit configured to control a charging current according to a result of detection of the foreign matter.

(29) The power receiving device according to (19),
wherein the measuring coil has a part wound on the outermost circumference of the power receiving coil, a number of turns of the part wound on the outermost circumference of the power receiving coil being at least one.

(30) The power receiving device according to (19),
wherein the measuring coil has a part wound on an outside of the outermost circumference of the power receiving coil, a number of turns of the part wound on the outside of the outermost circumference of the power receiving coil being at least one.

(31) The power receiving device according to (19),
wherein the measuring coil has a part wound on an innermost circumference of the power receiving coil, a number of turns of the part wound on the innermost circumference of the power receiving coil being at least one.

(32) The power receiving device according to (19),
wherein the measuring coil has a part wound on an inside of the innermost circumference of the power receiving coil, a number of turns of the part wound on the inside of the innermost circumference of the power receiving coil being at least one.

(33) The power receiving device according to (19),
wherein the measured values are impedances of the measuring coil and the power receiving coil, and
the foreign matter detecting section determines whether or not the foreign matter is present in the magnetic field on a basis of a ratio of the impedance of the power receiving coil to the impedance of the measuring coil.

(34) The power receiving device according to (33), further comprising:
a first alternating voltage applying section configured to apply a first alternating voltage to the measuring coil,
wherein the foreign matter detecting section obtains the impedance of the measuring coil from a current produced in the measuring coil to which the first alternating voltage is applied and the first alternating voltage.

(35) The power receiving device according to (33), further comprising:
a second alternating voltage applying section configured to apply a second alternating voltage to the power receiving coil,
wherein the foreign matter detecting section obtains the impedance of the power receiving coil from a current produced in the power receiving coil to which the second alternating voltage is applied and the second alternating voltage.

(36) The power receiving device according to (33),
wherein the foreign matter detecting section determines that the foreign matter is present when the ratio is larger than a predetermined threshold value.

(37) A power feeding system comprising:
a power feeding device configured to supply power via a magnetic field;
a power receiving coil configured to receive the power fed from the power feeding device via the magnetic field;
a measuring coil having a center substantially coinciding with a center of the power receiving coil, and having a part wound on an inside of an outermost circumference of the power receiving coil, a number of turns of the part wound on the inside of the outermost circumference of the power receiving coil being at least one; and
a foreign matter detecting section configured to determine whether or not foreign matter is present in the magnetic field on a basis of measured values of the measuring coil and the power receiving coil.

The present disclosure contains subject matter related to that disclosed in Japanese Priority Patent Application JP 2012-112996 filed in the Japan Patent Office on May 17, 2012, the entire content of which is hereby incorporated by reference.

What is claimed is:
1. A foreign matter detector, comprising:
a voltage obtaining circuit configured to obtain a voltage value of a measuring coil;
a current obtaining circuit configured to obtain a current value of a power receiving coil;
an impedance obtaining circuit configured to obtain an impedance value of the power receiving coil based on the voltage value of the measuring coil and the current value of the power receiving coil; and
a foreign matter detecting circuit configured to:
compare the impedance value with a threshold impedance value; and
detect a foreign matter between a wireless power transmitting unit and a wireless power receiving unit based on the comparison.
2. The foreign matter detector according to claim 1, further comprising a resistance change amount obtaining circuit configured to obtain an amount of resistance change in the power receiving coil based on the voltage value of the measuring coil and the current value of the power receiving coil.

3. The foreign matter detector according to claim 2, further comprising an inductance change amount obtaining circuit configured to obtain an amount of inductance change in the power receiving coil based on the voltage value of the measuring coil and the current value of the power receiving coil.

4. The foreign matter detector according to claim 3, wherein the foreign matter detecting circuit is further configured to detect the foreign matter based on at least one of the amount of resistance change or the amount of inductance change.

5. The foreign matter detector according to claim 1, wherein the impedance value is obtained based on a variance of the voltage value and a variance of the current value.

6. The foreign matter detector according to claim 1, wherein the measuring coil is inductively coupled to the power receiving coil.

7. The foreign matter detector according to claim 1, wherein the measuring coil comprises a measuring coil wire, and a number of concentric turns of the measuring coil wire are around a common axis.

8. The foreign matter detector according to claim 7, wherein the power receiving coil comprises a power receiving coil wire, and a number of concentric turns of the power receiving coil wire are around the common axis.

9. The foreign matter detector according to claim 7, wherein at least a first concentric turn of the number of turns of the measuring coil wire is wound on an innermost circumference of the power receiving coil, and at least a second concentric turn of the number of turns of the measuring coil wire is wound on an outermost circumference of the power receiving coil.

10. A wireless power receiving device, comprising:

a coil; and a foreign matter detector, comprising:

a voltage obtaining circuit configured to obtain a voltage value of the coil;

an impedance obtaining circuit configured to obtain an impedance value of the coil based on the voltage value of the coil and a current value of the coil; and a foreign matter detecting circuit configured to:

compare the impedance value with a threshold impedance value; and detect a foreign matter between a wireless power transmitting device and the wireless power receiving device based on the comparison.

11. The wireless power receiving device according to claim 10, further comprising a resistance change amount obtaining circuit configured to obtain an amount of resistance change in the coil based on the voltage value and the current value.

12. The wireless power receiving device according to claim 11, further comprising an inductance change amount obtaining circuit configured to obtain an amount of inductance change in the coil based on the voltage value of the coil and the current value of the coil.

13. The wireless power receiving device according to claim 12, wherein the foreign matter detecting circuit is further configured to detect the foreign matter based on at least one of the amount of resistance change or the amount of inductance change.

14. The wireless power receiving device according to claim 10, wherein the impedance value is obtained based on a variance of the voltage value and a variance of the current value.

15. The wireless power receiving device according to claim 10, further comprising a current obtaining circuit configured to obtain the current value of the coil.

16. The wireless power receiving device according to claim 15, wherein the coil includes a measuring coil and a power receiving coil, the voltage obtaining circuit is further configured to obtain the voltage value of the measuring coil, and the current obtaining circuit configured to obtain the current value of the power receiving coil.

* * * * *